(12) United States Patent
Chen et al.

(10) Patent No.: US 10,768,394 B2
(45) Date of Patent: Sep. 8, 2020

(54) ELECTRONIC DEVICE

(71) Applicant: LARGAN PRECISION CO., LTD., Taichung (TW)

(72) Inventors: Hung-Shuo Chen, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 127 days.

(21) Appl. No.: 16/035,946

(22) Filed: Jul. 16, 2018

(65) Prior Publication Data

US 2019/0227268 A1 Jul. 25, 2019

(30) Foreign Application Priority Data

Jan. 22, 2018 (TW) .............................. 107102238 A

(51) Int. Cl.
| | |
|---|---|
| *G02B 13/08* | (2006.01) |
| *G02B 3/02* | (2006.01) |
| *G02B 13/00* | (2006.01) |
| *H04N 13/207* | (2018.01) |
| *H04N 13/254* | (2018.01) |
| *G02B 9/34* | (2006.01) |
| *G02B 27/00* | (2006.01) |
| *G02B 13/16* | (2006.01) |
| *G02B 27/01* | (2006.01) |

(52) U.S. Cl.
CPC ............. *G02B 13/004* (2013.01); *G02B 9/34* (2013.01); *G02B 13/008* (2013.01); *G02B 13/16* (2013.01); *G02B 27/0093* (2013.01); *H04N 13/207* (2018.05); *H04N 13/254* (2018.05); *G02B 2027/0187* (2013.01)

(58) Field of Classification Search
CPC ........ G02B 9/34; G02B 13/18; G02B 13/004; G02B 13/04; G02B 13/22; H04N 13/207; H04N 13/254
See application file for complete search history.

(56) References Cited

U.S. PATENT DOCUMENTS

| | | |
|---|---|---|
| 4,699,477 A | 10/1987 | Clarke |
| 5,270,861 A | 12/1993 | Estelle |
| 5,270,867 A | 12/1993 | Estelle |
| 5,305,147 A | 4/1994 | Hasegawa et al. |
| 5,446,590 A | 8/1995 | Kikuchi |
| 5,999,332 A | 12/1999 | Ohno |

(Continued)

FOREIGN PATENT DOCUMENTS

| | | |
|---|---|---|
| CN | 204925493 U | 12/2015 |
| CN | 107092077 A | 8/2017 |

(Continued)

*Primary Examiner* — Alicia M Harrington
(74) *Attorney, Agent, or Firm* — McClure, Qualey & Rodack, LLP

(57) ABSTRACT

An electronic device includes at least one optical lens assembly. The optical lens assembly includes four lens elements. The four lens elements are, in order from an outside to an inside, a first lens element, a second lens element, a third lens element and a fourth lens element. The first lens element has an outside surface being concave in a paraxial region thereof and an inside surface being convex in a paraxial region thereof. The fourth lens element has an inside surface being convex in a paraxial region thereof.

28 Claims, 28 Drawing Sheets

(56) References Cited

U.S. PATENT DOCUMENTS

| | | | |
|---|---|---|---|
| 6,900,948 B2 * | 5/2005 | Sato | G02B 9/34 359/715 |
| 8,441,745 B2 | 5/2013 | Tang et al. | |
| 2007/0081258 A1 | 4/2007 | Huang | |
| 2015/0370039 A1 | 12/2015 | Bone | |
| 2018/0081154 A1 | 3/2018 | Cheng et al. | |
| 2018/0196222 A1 | 7/2018 | Bone et al. | |
| 2018/0196228 A1 | 7/2018 | Bone et al. | |
| 2018/0196229 A1 | 7/2018 | Bone et al. | |
| 2018/0196230 A1 | 7/2018 | Bone et al. | |
| 2018/0196231 A1 | 7/2018 | Bone et al. | |
| 2018/0307007 A1 | 10/2018 | Bone | |

FOREIGN PATENT DOCUMENTS

| | | |
|---|---|---|
| JP | S6358308 A | 3/1988 |
| JP | H05249372 A | 9/1993 |
| JP | H0894928 A | 4/1996 |
| JP | H1184229 A | 3/1999 |
| JP | 2000171697 A | 6/2000 |
| JP | 2004029554 A | 1/2004 |
| JP | 2004246165 A | 9/2004 |
| TW | 201830080 A | 8/2018 |

* cited by examiner

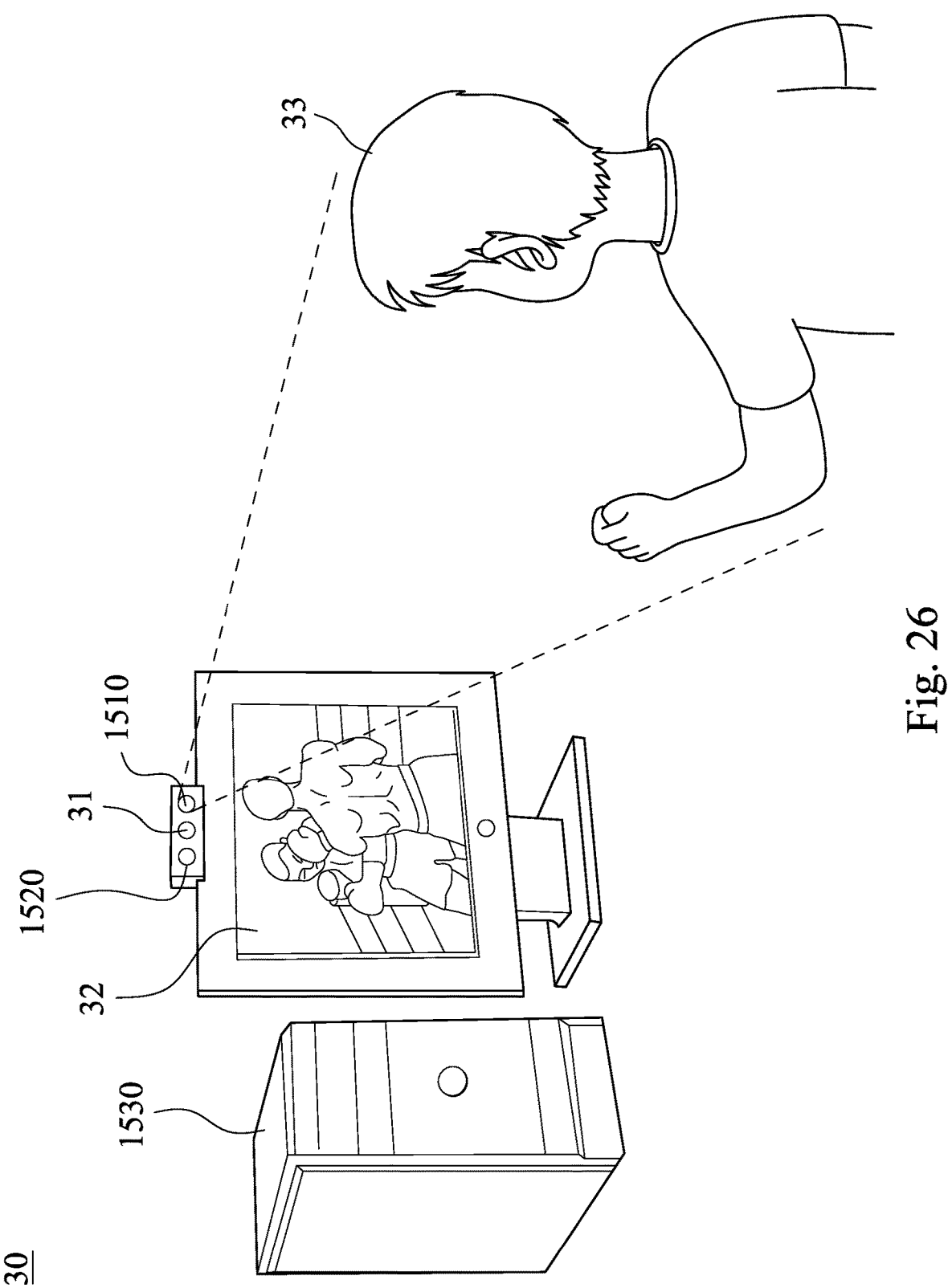

ELECTRONIC DEVICE

RELATED APPLICATIONS

This application claims priority to Taiwan Application Serial Number 107102238, filed Jan. 22, 2018, which is herein incorporated by reference.

BACKGROUND

Technical Field

The present disclosure relates to an electronic device. More particularly, the present disclosure relates to an electronic device with at least one optical lens assembly.

Description of Related Art

With developments of technologies, three-dimensional image capture technologies are increasingly mature and application range thereof is becoming wider. Also, two-dimensional image capture technologies can be adopted to achieve more applications. For example, information of depth of field can be added to two-dimensional images so as to compensate the deficiency thereof.

Nowadays, applications of three-dimensional image capture technologies are diverse, including electronic devices, such as face recognition systems, somatosensory game devices, augmented reality devices, driving assisting systems, various kinds of smart electronic products, multi-lens devices, wearable devices, digital cameras, identification systems, entertainment devices, sports devices and intelligent home assisting systems. The operating principle of three-dimensional image capture technologies is stated as follows. First, light of a light source with particular characteristics (such as specific wavelengths, patterns, periodicities, etc.) is projected onto an object, the light reflected from different positions of the object having different depths is received by a lens assembly, and then the change of the characteristics of the light caused by reflection is analyzed so as to obtain the distance between each position of the object and the lens assembly, and the three-dimensional structure of the object can be determined. Alternatively, the motion of the object can be judged by continuous photographing.

With the advance of technologies, the demands for precision are getting higher and higher, which requires a more precise projection ability and higher image quality. However, when three-dimensional image capture technologies are applied to portable electronic devices, it is difficult to enhance the precision due to the limitation of volume.

SUMMARY

According to one aspect of the present disclosure, an electronic device includes at least one optical lens assembly. The optical lens assembly includes four lens elements, and the four lens elements are, in order from an outside to an inside, a first lens element, a second lens element, a third lens element and a fourth lens element. The first lens element has an outside surface being concave in a paraxial region thereof and an inside surface being convex in a paraxial region thereof. The fourth lens element has an inside surface being convex in a paraxial region thereof. When a central thickness of the first lens element is CT1, a central thickness of the fourth lens element is CT4, a focal length of the first lens element is f1, a focal length of the second lens element is f2, a focal length of the third lens element is f3, and a focal length of the fourth lens element is f4, the following conditions are satisfied:

$$0 < CT1/CT4 < 2.7; \text{ and}$$

$$|f3/f1| + |f3/f2| + |f3/f4| < 0.85.$$

According to another aspect of the present disclosure, an electronic device includes at least one optical lens assembly. The optical lens assembly includes four lens elements, and the four lens elements are, in order from an outside to an inside, a first lens element, a second lens element, a third lens element and a fourth lens element. The first lens element has an outside to surface being concave in a paraxial region thereof and an inside surface being convex in a paraxial region thereof. The fourth lens element has an outside surface being concave in a paraxial region thereof. When a central thickness of the first lens element is CT1, a central thickness of the fourth lens element is CT4, a focal length of the optical lens assembly is f, a focal length of the first is lens element is f1, and a focal length of the second lens element is f2, the following conditions are satisfied:

$$0 < CT1/CT4 < 0.62; \text{ and}$$

$$|f/f1| + |f/f2| < 1.25.$$

According to yet another aspect of the present disclosure, an electronic device includes at least one optical lens assembly. The optical lens assembly includes four lens elements, and the four lens elements are, in order from an outside to an inside, a first lens element, a second lens element, a third lens element and a fourth lens element. The first lens element has an outside surface being concave in a paraxial region thereof and an inside surface being convex in a paraxial region thereof. The third lens element has positive refractive power. When a focal length of the first lens element is f1, a focal length of the second lens element is f2, and a focal length of the third lens element is f3, a focal length of the fourth lens element is f4, the following condition is satisfied:

$$|f3/f1| + |f3/f2| + |f3/f4| \leq 0.69.$$

BRIEF DESCRIPTION OF THE DRAWINGS

The present disclosure can be more fully understood by reading the following detailed description of the embodiments, with reference made to the accompanying drawings as follows:

FIG. 26 is a schematic view of an electronic device according to the 14th embodiment of the present disclosure.

DETAILED DESCRIPTION

Figure 1:
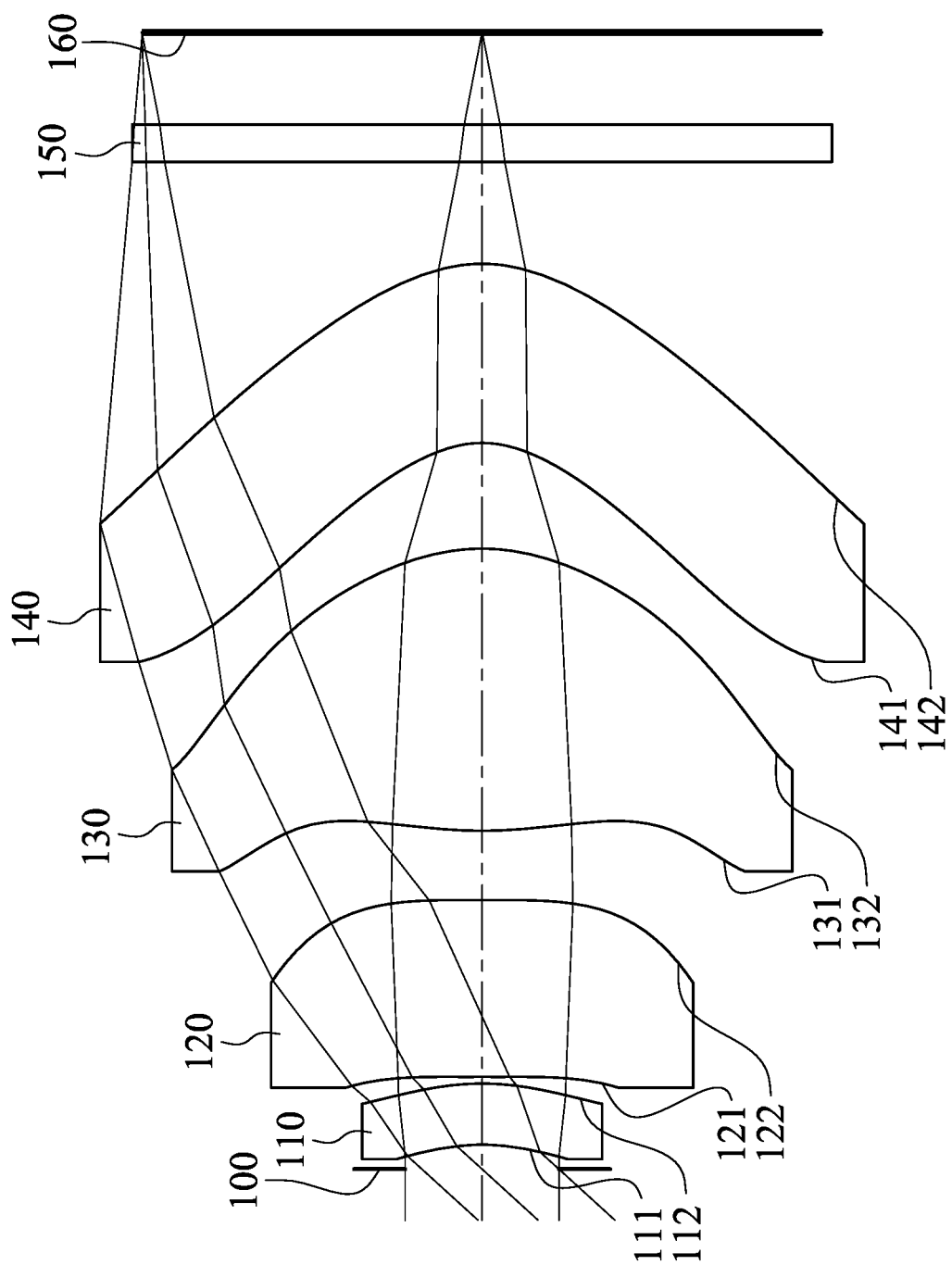
FIG. 1 is a schematic view of an electronic device according to the 1st embodiment of the present disclosure.

An electronic device includes at least one optical lens assembly. With adjustment of surface shapes of lens elements of the optical lens assembly and coordination between components thereof, a projection ability with high precision and high image quality can be provided, and the compactness can be maintained. The electronic device can be applied to an infrared band, and can be adapted to three-dimensional image capturing technologies.

The optical lens assembly can include four lens elements. The four lens elements are, in order from an outside to an inside, a first lens element, a second lens element, a third lens element and a fourth lens element.

The first lens element has an outside surface being concave in a paraxial region thereof, so that a probability of surface scraping during assembling process can be reduced, which can enhance the yield rate of assembling. Also, the illumination in the image periphery can be maintained when a wider field of view is provided, and the light distribution can be more evenly when the optical lens assembly is applied to a projection apparatus. The first lens element has an inside surface being convex in a paraxial region thereof. Therefore, the path of light in the periphery region can be adjusted so as to reduce surface inflections, and generations of stray light can be reduced thereby.

The third lens element can have positive refractive power. Therefore, positive refractive power required by the compactness of the optical lens assembly can be provided. An outside surface of the third lens element can include at least one concave shape from a paraxial region thereof to an off-axis region thereof, which is favorable for reducing surface reflection of light so as to enhance illumination and reduce stray light. Preferably, the third lens element can have the outside surface being convex in the paraxial region thereof and including at least one concave shape in the off-axis region thereof. Therefore, the effects of increasing illumination and reducing stray light can be enhanced, and field curvature can be corrected. The third lens element can have an inside surface being convex in a paraxial region thereof. Therefore, refractive power of the third lens element can be adjusted so as to achieve compactness of the optical lens assembly and reduce the incident angle or exiting angle of light on an inside conjugation surface. When the incident angle or exiting angle of light on the inside conjugation surface is smaller, the projection ability of light source can be enhanced when the optical lens assembly is applied to a projection apparatus, and response efficiency of image sensor can be enhanced when the optical lens assembly is applied to an image capturing apparatus or a receiving apparatus.

The fourth lens element can have an outside surface being concave in a paraxial region thereof. Therefore, an excessive curvature of the outside surface of the fourth lens element for correcting off-axis aberrations can be is prevented so as to reduce the molding difficulty, and the yield rate can also be enhanced. The fourth lens element can have an inside surface being convex in a paraxial region thereof. Therefore, the converging ability for the light in a peripheral region can be enhanced by adjusting the path of light in the peripheral region, and the relative illumination in the periphery of the image can be enhanced thereby.

When a central thickness of the first lens element is CT1, and a central thickness of the fourth lens element is CT4, the following condition can be satisfied: $0 < CT1/CT4 < 2.7$. Therefore, it is favorable for balancing the lengths and distributions of refractive power of the front end and the back end of the optical lens assembly so as to reduce the total track length. Preferably, the following condition can be satisfied: $0 < CT1/CT4 < 1.8$. More preferably, the following condition can be satisfied: $0 < CT1/CT4 < 1.0$. More preferably, the following condition can be satisfied: $0 < CT1/CT4 < 0.62$. Alternatively, the following condition can be satisfied: $0.10 < CT1/CT4$. Therefore, the reduction of yield rate caused by an excessively thin central thickness of the first lens element can be avoided, and the difficulty of reducing volume due to an excessively thick central thickness of the fourth lens element can also be avoided.

When a focal length of the first lens element is f1, a focal length of the second lens element is f2, a focal length of the third lens element is f3, and a focal length of the fourth lens element is f4, the following condition can be satisfied: |f3/f1|+|f3/f2|+|f3/f4|<1.5. Therefore, the main refractive power of the optical lens assembly can be concentrated towards the third lens element, which allows the rest lens elements to have the ability for correcting off-axis aberrations while maintain proper curvatures of surfaces, so that the molding difficulty can be reduced, and the yield rate can be enhanced thereby. Preferably, the following condition can be satisfied: |f3/f1|+|f3/f2|+|f3/f4|<0.85. More preferably, the following condition can be satisfied: |f3/f1|+|f3/f2|+|f3/f4|≤0.69.

When a focal length of the optical lens assembly is f, the focal length of the first lens element is f1, and the focal length of the second lens element is f2, the following condition can be satisfied: |f/f1|+|f/f2|<1.25. Therefore, the magnitude of refractive power of the front end of the optical lens assembly can be properly adjusted, so that the optical lens assembly can be adapted to the design of wider field of view. Preferably, the following condition can be satisfied: |f/f1|+|f/f2|<1.00. More preferably, the following condition can be satisfied: |f/f1|+|f/f2|<0.60.

When a measurement is made in accordance with a reference wavelength as a d-line, an Abbe number of the second lens element is Vd2, an Abbe number of the third lens element is Vd3, and an Abbe number of the fourth lens element is Vd4, the following condition can be satisfied: 3.0<(Vd2+Vd3)/Vd4<10. Therefore, aberrations can be corrected and illumination can be enhanced by arranging the distribution of materials of the optical lens assembly. Preferably, the following condition can be satisfied: 4.0<(Vd2+Vd3)/Vd4<8.0. In detail, the Abbe numbers of Vd2, Vd3 and Vd4 are calculated by Vd=(Nd−1)/(NF−NC), wherein Nd is the refractive index measured with a wavelength as helium d-line (587.6 nm), NF is the refractive index measured with a wavelength as hydrogen F-line (486.1 nm), and NC is the refractive index measured with a wavelength as hydrogen C-line (656.3 nm).

When the measurement is made in accordance with the reference wavelength as the d-line, and the Abbe number of the fourth lens element is Vd4, the following condition can be satisfied: 10.0<Vd4<23.0. Therefore, the fourth lens element can be provided with proper refractive power for correcting off-axis aberrations by arranging a material thereof. The calculation method of the Abbe number of Vd4 is mentioned above, and is not described herein.

When an axial distance between the outside surface of the first lens element and an inside surface of the second lens element is Dr1r4, and an axial distance between the outside surface of the third lens element and the inside surface of the fourth lens element is Dr5r8, the following condition can be satisfied: 1.35<Dr5r8/Dr1r4<10.0. Therefore, the lengths of the front end and the back end of the optical lens assembly can be adjusted so as to reduce the total track length. Preferably, the following condition can be satisfied: 1.75<Dr5r8/Dr1r4<6.50.

When an axial distance between the third lens element and the fourth lens element is T34, and the central thickness of the fourth lens element is CT4, the following condition can be satisfied: 0.10<T34/CT4<4.0. Therefore, a proper central thickness of the fourth lens element can be maintained, and astigmatism can be corrected by the consociation of the fourth lens element and the third lens element. Preferably, the following condition can be satisfied: 0.35<T34/CT4<1.1.

When an axial distance between the second lens element and the third lens element is T23, the axial distance between the third lens element and the fourth lens element is T34, and an axial distance between the outside surface of the first lens element and the inside surface of the fourth lens element is TD, the following condition can be satisfied: 1.75<TD/(T23+T34)<15.0. Therefore, sufficient axial distances between the lens elements can be provided so as to correct off-axis aberrations, and the compactness of the optical lens assembly can be maintained.

When the axial distance between the outside surface of the first lens element and the inside surface of the fourth lens element is TD, and an axial distance between the inside surface of the fourth lens element and the inside conjugation surface of the optical lens assembly is BL, the following condition can be satisfied: 2.5<TD/BL<9.0. Therefore, the ratio of axial distances between the lens elements and central thickness of the lens elements to the back focal length of the optical lens assembly can be properly arranged, so that off-axis aberrations can be corrected, the incident angle or exiting angle of light on the inside conjugation surface can be reduced while a short total track length can be maintained.

When a curvature radius of the inside surface of the fourth lens element is R8, and the focal length of the optical lens assembly is f, the following condition can be satisfied: −0.74<R8/f<0. Therefore, the incident angle or exiting angle of light on the inside conjugation surface can be reduced by adjusting the surface shape of the fourth lens element and the focal length of the optical lens assembly. Preferably, the following condition can be satisfied: −0.50<R8/f<0.

When the focal length of the first lens element is f1, and a curvature radius of the outside surface of the first lens element is R1, the following condition can be satisfied: 5.7<|f1/R1|. Therefore, the balance of increasing is the field of view and reducing the volume can be obtained by adjusting the focal length and the surface shape of the first lens element.

When the focal length of the optical lens assembly is f, the focal length of the first lens element is f1, the focal length of the second lens element is f2, the focal length of the third lens element is f3, the focal length of the fourth lens element is f4, and a focal length of i-th lens element is fi, at least one of the lens elements can satisfy the following condition: |f/fi|<0.15, wherein i=1, 2, 3 or 4. Therefore, the functionality for correcting off-axis aberrations of the optical lens assembly can be enhanced, and the light in each field of view can be favorably adjusted. When the optical lens assembly is applied to a projection apparatus, the light distribution can be more evenly. When the optical lens assembly is applied to a receiving apparatus or an image capturing apparatus, the sharpness of the image can be enhanced.

When an axial distance between the outside surface of the first lens element and the inside conjugation surface of the optical lens assembly is TL, and a maximum radius of an optical effective region of the inside conjugation surface of the optical lens assembly is YI, the following condition can be satisfied: 1.0<TL/YI<4.0. Therefore, the balance of reducing the total track length and increasing the area of the inside conjugation surface can be obtained.

When an f-number of the optical lens assembly is Fno, the following condition can be satisfied: 1.0<Fno<3.0. Therefore, the optical lens assembly can be provided with sufficient illumination.

When a maximum radius of an optical effective region of the outside surface of the first lens element is Y11, and a maximum radius of an optical effective region of the inside surface of the fourth lens element is Y42, the following condition can be satisfied: $2.0 < Y42/Y11 < 5.0$. Therefore, the volume can be reduced by adjusting outer diameters of the front end and the back end of the optical lens assembly.

The optical lens assembly can be applied to an infrared band within a wavelength ranged from 750 nm to 1500 nm. Therefore, the interference from background light can be reduced so as to obtain better projection or image quality. Also, the optical lens assembly can be applied to both of a visible light band and the infrared band. Therefore, the application range of the optical lens assembly can be enlarged, and the required number of the optical lens assembly can be reduced so as to satisfy the requirement of compactness.

When the curvature radius of the inside surface of the fourth lens element is R8, and the maximum radius of the optical effective region of the inside surface of the fourth lens element is Y42, the following condition can be satisfied: $-1.0 < R8/Y42 < 0$. Therefore, the illumination of the image can be enhanced by arranging the surface shape of the fourth lens element.

In the four lens elements, at least one of the lens elements is made of a plastic material and has at least one surface including at least one inflection point. Therefore, the cost and the volume of the optical lens assembly can be effectively reduced, and aberrations can be corrected. Preferably, the fourth lens element is made of a plastic material and has at least one surface including at least one inflection point. Therefore, it enables the lens element located at the inner side of the optical lens assembly to have a larger surface shape change, which is favorable for correcting off-axis aberrations and further reducing the volume of the optical lens assembly.

When the maximum radius of the optical effective region of the inside conjugation surface of the optical lens assembly is YI, and the maximum radius of the optical effective region of the inside surface of the fourth lens element is Y42, the following condition can be satisfied: $0.50 < YI/Y42 < 1.1$. Therefore, the balance of increasing the area of the inside conjugation surface and reducing the volume can be obtained.

There is an air gap between optical effective regions of every adjacent lens elements of the four lens elements. Therefore, the design for surface shape of each lens element can be more flexible, which is favorable for reducing volume and correcting aberrations. Moreover, the assembling complexity can be simplified so as to enhance the yield rate. Specifically, each of the first through fourth lens elements is a single and non-cemented lens element, every two lens elements adjacent to each other are not cemented, and there is a space between the two lens elements. Moreover, the manufacturing process of the cemented lenses is more complex than the non-cemented lenses. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the optical to lens assembly. Therefore, according to the optical lens assembly of the present disclosure, an air gap between optical effective regions of every two of the first lens element, the second lens element, the third lens element and the fourth lens element that are adjacent to each other avoids the problem generated by the cemented lens elements.

When a half of a maximum field of view of the optical lens assembly is HFOV, the following condition can be satisfied: $15.0$ degrees $< HFOV < 60.0$ degrees. Therefore, the field of view of the optical lens assembly is proper for enlarging the application range, and the difficulty of reducing volume due to an excessively large or excessively small field of view can be prevented.

When the axial distance between the outside surface of the first lens element and the inside surface of the fourth lens element is TD, the following condition can be satisfied: $1.0$ mm $< TD < 5.0$ mm. Therefore, the total track length of the optical lens assembly can be reduced, and the yield rate can be maintained.

The optical lens assembly can further include an aperture stop disposed at an outside of the second lens element. When an axial distance between the aperture stop and the inside conjugation surface of the optical lens assembly is SL, and the axial distance between the outside surface of the first lens element and the inside conjugation surface of the optical lens assembly is TL, the following condition can be satisfied: $0.70 < SL/TL < 1.1$. Therefore, the incident angle or exiting angle of light of wide field of view on the inside conjugation surface can be reduced by adjusting the position of the aperture stop.

When a curvature radius of the outside surface of the fourth lens element is R7, and a maximum radius of an optical effective region of the outside surface of the fourth lens element is Y41, the following condition can be satisfied: $-1.0 < R7/Y41 < 0$. Therefore, it is favorable for correcting aberrations, such as coma, by adjusting the surface shape of the fourth lens element.

When the central thickness of the first lens element is CT1, and the curvature radius of the outside surface of the first lens element is R1, the following condition can be satisfied: $-1.0 < CT1/R1 \leq 0$. Therefore, interferences between light of different fields of view can be avoided, so that the projection ability or the sharpness of image can be enhanced by adjusting the surface shape of the first lens element.

When the central thickness of the first lens element is CT1, a curvature radius of the inside surface of the first lens element is R2, the following condition can be satisfied: $-1.0 < CT1/R2 \leq 0$. Therefore, surface reflections can be reduced by adjusting the surface shape of the first lens element, and the projection efficiency or imaging ability can be enhanced.

The electronic device can include a projection apparatus. The projection apparatus can include a projecting lens system and at least one light source, wherein the light source is disposed on an inside conjugation surface of the projecting lens system. The projecting lens system can be identical to or different from the optical lens assembly according to the present disclosure. Light of the light source can be projected onto an outside conjugation surface by the projecting lens system of the projection apparatus. Preferably, light of the light source can be within the infrared band (750 nm-1500 nm), and the projecting lens system of the projection apparatus can be applied to an infrared band.

The aforementioned projection apparatus can include a high directivity (low divergence) and a high intensity light source, wherein the light source can is be a laser, SLED, Micro-LED, RCLED, a vertical cavity surface emitting laser (VCSEL), etc., and the light source can be a single light source or multiple light sources disposed on the inside conjugation surface of the projecting lens system, so that high projection quality can be provided. When the light source of the projection apparatus according to the present disclosure is a VCSEL and disposed on the inside conjugation surface of the projecting lens system, it is favorable for providing the projection apparatus with a high directivity, a low divergence and a high intensity light source by proper arrangement of the light source, so as to increase the illuminance of the outside conjugation surface of the projecting lens system.

The aforementioned light source can be composed by a laser array, which can be formed into a structured light through the projecting lens system of the projection apparatus, and projected on a sensed object. The structured light can utilize the structure, such as dot, spot or stripe, etc., but is not limited thereto.

The projection apparatus can include a diffraction element, a focus tunable component, a tunable aperture or a reflective element. With the arrangement of the diffraction element, it is favorable for projecting the light onto the projection surface more evenly or enlarging the projecting angle by to diffracting light so as to increase the projecting area of light. With the arrangement of the focus tunable component, it is favorable for adjusting the focal length of the system according to different environment factors, so that a clear image can be presented. With the arrangement of the tunable aperture, it is favorable for adjusting the amount of entering light or exiting light so as to is enlarge the application range. With the arrangement of the reflective element (such as prism, mirror, etc.), it is favorable for increasing the flexibility of space configuration. The diffraction element according to the present disclosure can be a diffuser, a raster or a combination thereof. The diffraction element can have a microstructure (can be, but is not limited to, a raster structure) formed on a surface thereof, which allows the scattered beam to copy the speckle pattern so as to enlarge the projecting angle.

The electronic device can include a sensing module, which can include a projection apparatus and a receiving apparatus. The projection apparatus can be identical to the aforementioned projection apparatus, and is not repeated herein. The receiving apparatus can include an imaging lens system and an image sensor, wherein the image sensor is disposed on an inside conjugation surface of the imaging lens system. In the sensing module, light of the light source of the projection apparatus can be projected on a sensed object by the projecting lens system then is received by the receiving apparatus after a reflection, and is imaged on the image sensor by the imaging lens system. The received information can be calculated by the processor so as to obtain the relative distance of each portion of the sensed object and further obtain the 3D-shaped variation on the surface of the sensed object. The imaging lens system can be identical to or different from the optical lens assembly according to the present disclosure.

The imaging lens system of the receiving apparatus can be applied to an infrared band, wherein the image sensor can be utilized for detecting the light within the infrared band. The receiving apparatus can further include other element with filter function.

The electronic device can include an image capturing apparatus, which can include an image capturing lens assembly and an image sensor, wherein the image sensor is disposed on an inside conjugation surface of the image capturing lens assembly. The image capturing apparatus can be utilized to photographing. Light can be imaged on the image sensor by the image capturing lens assembly. The image capturing lens assembly can be identical to or different from the optical lens assembly according to the present disclosure.

According to the electronic device of the present disclosure, the outside refers to outside of mechanism, the inside refers to inside of mechanism. Taking the imaging lens system as an example, the inside direction refers to an image-side direction, the inside surface refers to an image-side surface, the outside direction refers to an object-side direction, the outside surface refers to an object-side surface. Taking the projecting lens system as an example, the inside direction is a light source direction, that is, a reduction side, the inside surface is a light incident surface, the outside direction is a projection direction, that is, a magnification side, the outside surface is a light exiting surface. The inside conjugation surface is located on the focus surface inside of the mechanism, that is, the image surface of the imaging lens system, and the conjugation surface of the reduction side of the projecting lens system. YI represents the maximum radius of the optical effective region of the inside conjugation surface in the optical lens assembly, that is, the maximum image height of the imaging lens system, and the maximum radius of the light source of the projecting lens system.

According to the electronic device of the present disclosure, the electronic device can further include but not limited to a control unit, a display, a storage unit, a random access memory unit (RAM) or a combination thereof.

According to the electronic device of the present disclosure, the optical lens assembly can be applied to the visible light band, the infrared band or both of the infrared band and the visible light band.

According to the optical lens assembly, projection apparatus, receiving apparatus, sensing module, image capturing apparatus and the electronic device of the present disclosure, unless otherwise specified, each of the parameter values can be determined according to the operation wavelength. When the operation wavelength is in the visible light band (for example, the main wavelength band thereof ranged from 350 nm to 750 nm), each of the parameter values can be calculated according to the wavelength of the d-line (587.6 nm). When the operation wavelength is in the near infrared band (for example, the main wavelength band thereof ranged from 750 nm to 1500 nm), each of the parameter values can be calculated according to the wavelength of 940 nm.

According to the optical lens assembly of the present disclosure, the value of Fno is calculated according to the focal length and the aperture size corresponding to the inside conjugation surface.

According to the optical lens assembly of the present disclosure, the lens elements thereof can be made of either glass or plastic material. When the lens elements are made of glass material, the refractive power distribution of the optical lens assembly may be more flexible. The glass lens element can either be made by grinding or molding. When the lens elements are made of plastic material, the manufacturing cost can be effectively reduced. Furthermore, surfaces of each lens element can be arranged to be aspheric (ASP), which allows for more controllable variables for eliminating the aberration thereof, the required number of the lens elements can be decreased, and the total track length of the optical lens assembly can be effectively reduced. The aspheric surfaces may be formed by plastic injection molding or glass molding.

According to the optical lens assembly of the present disclosure, when a lens surface is aspheric, which refers that the lens surface has an aspheric shape throughout its optical effective region, or a portion(s) thereof.

According to the optical lens assembly of the present disclosure, each of an outside surface and an inside surface of a lens element has a paraxial region and an off-axis region. The paraxial region refers to the region of the surface where light rays travel close to the optical axis, and the off-axis region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the optical lens assembly of the present disclosure, the refractive power of a lens element being positive or negative or the focal length of the lens element may refer to the refractive power or the focal length in the paraxial region of the lens element.

According to the optical lens assembly of the present disclosure, the optical lens assembly can include at least one stop, such as an aperture stop, a glare stop or a field stop. Therefore, the stray light can be eliminated, and the image quality can be improved.

According to the optical lens assembly of the present disclosure, the inside conjugation surface of the optical lens assembly, based on the corresponding image sensor or light source, can be flat or curved. In particular, the inside conjugation surface can be a concave curved surface facing towards the outside. According to the optical lens assembly of the present disclosure, at least one correcting element (such as a field flattener) can be selectively disposed between the lens element closest to the inside conjugation surface of the optical lens assembly and the inside conjugation surface so as to correct the image (such as the field curvature). Properties of the correcting element, such as curvature, thickness, refractive index, position, surface shape (convex/concave, spherical/aspheric/diffractive/Fresnel etc.) can be adjusted according to the requirements of the apparatus. In general, the correcting element is preferably a thin plano-concave element having a concave surface toward the outside and is disposed close to the inside conjugation surface.

According to the optical lens assembly of the present disclosure, an aperture stop can be configured as a front stop or a middle stop. A front stop disposed between an outside conjugation surface and the first lens element can provide a longer distance between an exit pupil of the optical lens assembly and the inside conjugation surface, and thereby obtains a telecentric effect and improves the image-sensing efficiency of the image sensor, such as CCD or CMOS, or improves the projective efficiency. A middle stop disposed between the first lens element and the inside conjugation surface is favorable for enlarging the field of view of the optical lens assembly and thereby provides a wider field of view for the same.

According to the optical lens assembly of the present disclosure, an is inflection point is a point on the lens surface where its curvature changes from positive to negative (or from negative to positive).

Each of the aforementioned features of the electronic device and the optical lens assembly can be utilized in various combinations for achieving the corresponding effects.

According to the above description of the present disclosure, the following specific embodiments are provided for further explanation.

1st Embodiment

Figure 2:
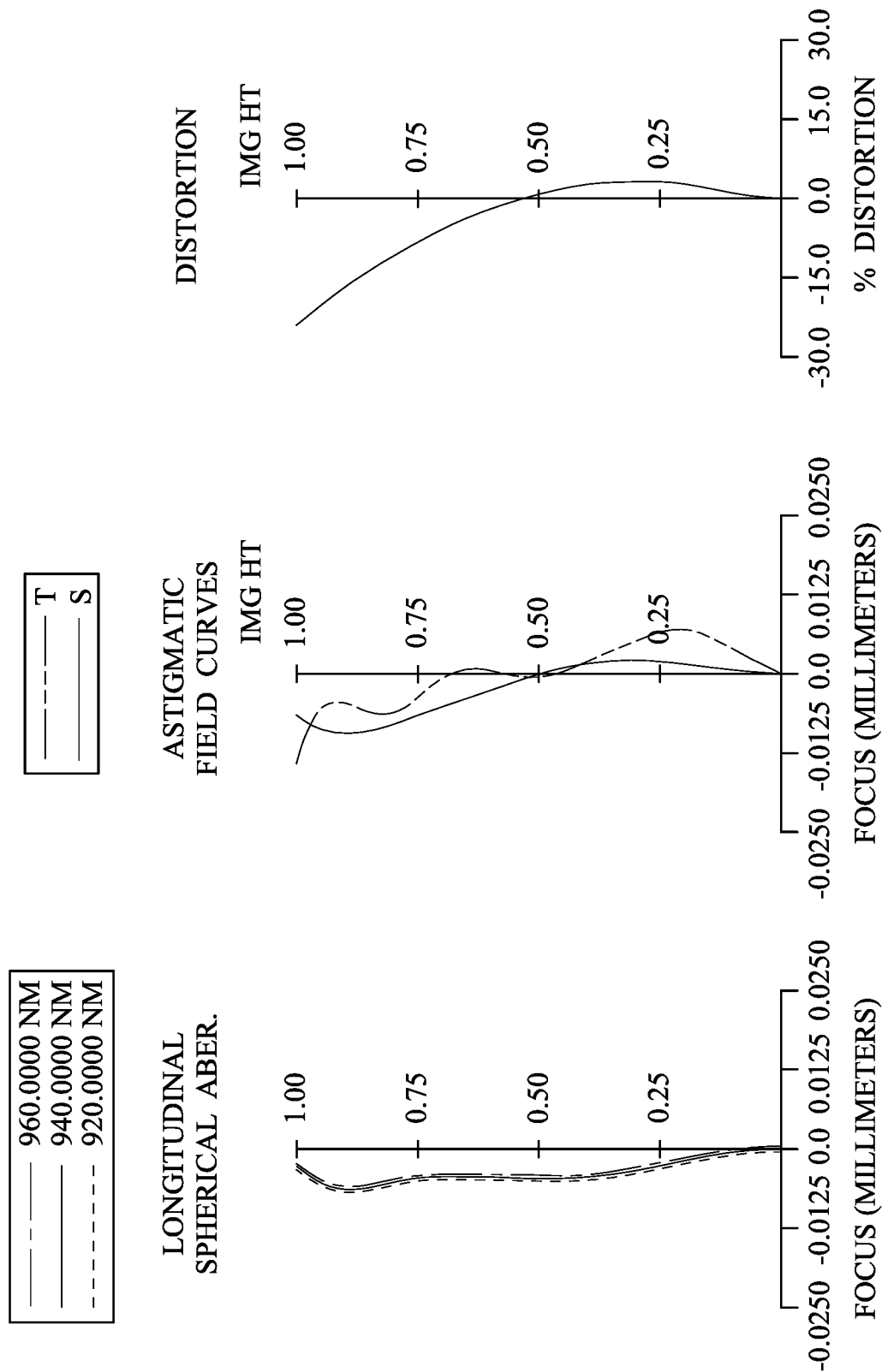
FIG. 2 shows spherical aberration curves, astigmatic field curves and a distortion curve of the electronic device according to the 1st embodiment.

FIG. 1 is a schematic view of an electronic device according to the 1st embodiment of the present disclosure. FIG. 2 shows spherical aberration curves, astigmatic field curves and a distortion curve of the electronic device according to the 1st embodiment. In FIG. 1, the electronic device includes an optical lens assembly (its reference numeral is omitted), wherein the optical lens assembly includes, in order from an outside to an inside, an aperture stop 100, a first lens element 110, a second lens element 120, a third lens element 130, a fourth lens element 140, a filter 150 and an inside conjugation surface 160. The optical lens assembly includes four lens elements (110, 120, 130 and 140) without additional one or more lens elements inserted between the first lens element 110 and the fourth lens element 140, and there is an air gap between optical effective regions of every adjacent lens elements of the first lens element 110 to the fourth lens element 140.

Figure 23:
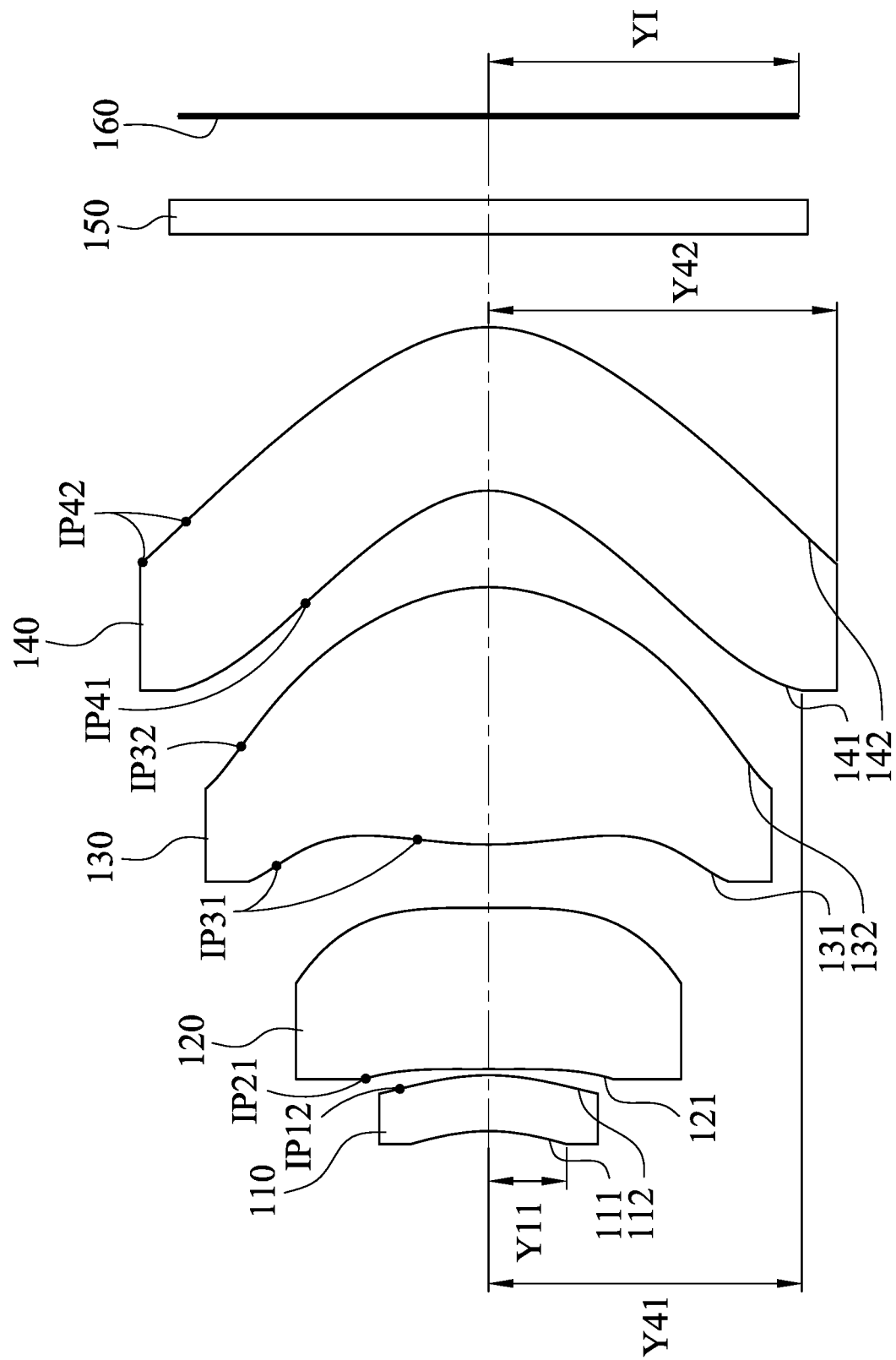
FIG. 23 is a schematic view showing parameters of Y11, Y41, Y42 and YI and inflection points of the electronic device according to the 1st embodiment in FIG. 1.

The first lens element 110 with negative refractive power has an outside surface 111 being concave in a paraxial region thereof and an inside surface 112 being convex in a paraxial region thereof. The first lens element 110 is made of a glass material, and has the outside surface 111 and the inside surface 112 being both aspheric. Furthermore, the inside surface 112 of the first lens element 110 includes an inflection point IP12 (as shown in FIG. 23; the inflection points of other embodiments can refer to FIG. 23 and the definition of the inflection point mentioned above, and are not drawn according to each embodiment, respectively).

The second lens element 120 has an outside surface 121 being planar in a paraxial region thereof and an inside surface 122 being planar in a paraxial region thereof. The second lens element 120 is made of a plastic material, and has the outside surface 121 and the inside surface 122 being both aspheric. Furthermore, the outside surface 121 of the second lens element 120 includes an inflection point IP21 (as shown in FIG. 23).

The third lens element 130 with positive refractive power has an outside surface 131 being convex in a paraxial region thereof and an inside surface 132 being convex in a paraxial region thereof. The third lens element 130 is made of a plastic material, and has the outside surface 131 and the inside surface 132 being both aspheric. Furthermore, the outside surface 131 of the third lens element 130 includes two inflection points IP31, and the inside surface 132 of the third lens element 130 includes an inflection point IP32 (as shown in FIG. 23). Moreover, the outside surface 131 of the third lens element 130 includes at least one concave shape from the paraxial region thereof to an off-axis region thereof.

The fourth lens element 140 with positive refractive power has an outside surface 141 being concave in a paraxial region thereof and an inside surface 142 being convex in a paraxial region thereof. The fourth lens element 140 is made of a plastic material, and has the outside surface 141 and the inside surface 142 being both aspheric. Furthermore, the outside surface 141 of the fourth lens element 140 includes an inflection point IP41, and the inside surface 142 of the fourth lens element 140 includes two inflection points IP42 (as shown in FIG. 23).

The filter 150 is made of a glass material and located between the fourth lens element 140 and the inside conjugation surface 160, and will not affect the focal length of the optical lens assembly.

The equation of the aspheric surface profiles of the aforementioned lens elements of the 1st embodiment is expressed as follows:

$$X(Y) = (Y^2/R)/(1 + \operatorname{sqrt}(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical lens assembly according to the 1st embodiment, when a focal length of the optical lens assembly is f, an f-number of the optical lens assembly is Fno, and a half of a maximum field of view of the optical lens assembly is HFOV, these parameters have the following values: f=1.20 mm; Fno=2.65; and HFOV=47.7 degrees.

In the optical lens assembly according to the 1st embodiment, when a measurement is made in accordance with a reference wavelength as a d-line, an Abbe number of the second lens element 120 is Vd2, an Abbe number of the third lens element 130 is Vd3, and an Abbe number of the fourth lens element 140 is Vd4, the following conditions are satisfied: (Vd2+Vd3)/Vd4=5.49; and Vd4=20.4.

In the optical lens assembly according to the 1st embodiment, when a central thickness of the first lens element 110 is CT1, and a central thickness of the fourth lens element 140 is CT4, the following condition is satisfied: CT1/CT4=0.34.

In the optical lens assembly according to the 1st embodiment, when the central thickness of the first lens element 110 is CT1, and a curvature radius of the outside surface 111 of the first lens element 110 is R1, the following condition is satisfied: CT1/R1=−0.28.

In the optical lens assembly according to the 1st embodiment, when the central thickness of the first lens element 110 is CT1, and a curvature radius of the inside surface 112 of the first lens element 110 is R2, the following condition is satisfied: CT1/R2=−0.23.

In the optical lens assembly according to the 1st embodiment, when an axial distance between the outside surface 111 of the first lens element 110 and the inside surface 122 of the second lens element 120 is Dr1r4, and an axial distance between the outside surface 131 of the third lens element 130 and the inside surface 142 of the fourth lens element 140 is Dr5r8, the following condition is satisfied: Dr5r8/Dr1r4=2.32.

In the optical lens assembly according to the 1st embodiment, when an axial distance between the aperture stop 100 and the inside conjugation surface 160 of the optical lens assembly is SL, and an axial distance between the outside surface 111 of the first lens element 110 and the inside conjugation surface 160 of the optical lens assembly is TL, the following condition is satisfied: SL/TL=1.02.

In the optical lens assembly according to the 1st embodiment, when an axial distance between the third lens element 130 and the fourth lens element 140 is T34, and the central thickness of the fourth lens element 140 is CT4, the following condition is satisfied: T34/CT4=0.59.

In the optical lens assembly according to the 1st embodiment, when an axial distance between the outside surface 111 of the first lens element 110 and the inside surface 142 of the fourth lens element 140 is TD, the following condition is satisfied: TD=2.59 mm.

In the optical lens assembly according to the 1st embodiment, when the axial distance between the outside surface 111 of the first lens element 110 and the inside surface 142 of the fourth lens element 140 is TD, and an axial distance between the inside surface 142 of the fourth lens element 140 and the inside conjugation surface 160 of the optical lens assembly is BL, the following condition is satisfied: TD/BL=3.81.

In the optical lens assembly according to the 1st embodiment, when the axial distance between the outside surface 111 of the first lens element 110 and the inside surface 142 of the fourth lens element 140 is TD, an axial distance between the second lens element 120 and the third lens element 130 is T23, and the axial distance between the third lens element 130 and the fourth lens element 140 is T34, the following condition is satisfied: TD/(T23+T34)=5.03.

FIG. 23 is a schematic view showing parameters of Y11, Y41, Y42 and YI and inflection points of the electronic device according to the 1st embodiment in FIG. 1, and the related parameters and inflection points of other embodiments can refer to FIG. 23 and are not drawn according to each embodiment, respectively. In the optical lens assembly according to the 1st embodiment, when the axial distance between the outside surface 111 of the first lens element 110 and the inside conjugation surface 160 of the optical lens assembly is TL, and a maximum radius of an optical effective region of the inside conjugation surface 160 of the optical lens assembly is YI, the following condition is satisfied: TL/YI=3.27.

Please refer to FIG. 23. In the optical lens assembly according to the 1st embodiment, when a curvature radius of the outside surface 141 of the fourth lens element 140 is R7, and a maximum radius of an optical effective region of the outside surface 141 of the fourth lens element 140 is Y41, the following condition is satisfied: R7/Y41=−0.31.

In the optical lens assembly according to the 1st embodiment, when a to curvature radius of the inside surface 142 of the fourth lens element 140 is R8, and the focal length of the optical lens assembly is f, the following condition is satisfied: R8/f=−0.38.

Please refer to FIG. 23. In the optical lens assembly according to the 1st embodiment, when the curvature radius of the inside surface 142 of the fourth lens element 140 is R8, and a maximum radius of an optical effective region of the inside surface 142 of the fourth lens element 140 is Y42, the following condition is satisfied: R8/Y42=−0.41.

In the optical lens assembly according to the 1st embodiment, when the focal length of the optical lens assembly is f, a focal length of the first lens element 110 is f1, a focal length of the second lens element 120 is f2, a focal length of the third lens element 130 is f3, and a focal length of the fourth lens element 140 is f4, the following conditions are satisfied: |f/f1|=0.09; |f/f1|+|f/f2|=0.09; |f/f2|=0.00; |f/f3|=1.33; and |f/f4|=0.32.

In the optical lens assembly according to the 1st embodiment, when the focal length of the first lens element 110 is f1, and the curvature radius of the outside surface 111 of the first lens element 110 is R1, the following condition is satisfied: |f1/R1|=19.91.

In the optical lens assembly according to the 1st embodiment, when the focal length of the first lens element 110 is f1, the focal length of the second lens element 120 is f2, the focal length of the third lens element 130 is f3, and the focal length of the fourth lens element 140 is f4, the following condition is satisfied: |f3/f1|+|f3/f2|+|f3/f4|=0.31.

Please refer to FIG. 23. In the optical lens assembly according to the 1st embodiment, when a maximum radius of an optical effective region of the to outside surface 111 of the first lens element 110 is Y11, and the maximum radius of the optical effective region of the inside surface 142 of the fourth lens element 140 is Y42, the following condition is satisfied: Y42/Y11=4.46.

Please refer to FIG. 23. In the optical lens assembly according to the 1st embodiment, when the maximum radius of the optical effective region of the inside conjugation surface 160 of the optical lens assembly is YI, and the maximum radius of the optical effective region of the inside surface 142 of the fourth lens element 140 is Y42, the following condition is satisfied: YI/Y42=0.89.

The detailed optical data of the 1st embodiment are shown in Table 1 and the aspheric surface data are shown in Table 2 below.

TABLE 1

1st Embodiment
f = 1.20 mm, Fno = 2.65, HFOV = 47.7 deg.

| Surface # | | Curvature Radius | | Thickness | Material | Index | Abbe # | Focal Length |
|---|---|---|---|---|---|---|---|---|
| 0 | Outside conjugation surface | Plano | | 400.000 | | | | |
| 1 | Ape. Stop | Plano | | 0.072 | | | | |
| 2 | Lens 1 | −0.638 | ASP | 0.180 | Glass | 1.642 | 36.9 | −12.69 |
| 3 | | −0.768 | ASP | 0.020 | | | | |
| 4 | Lens 2 | ∞ | ASP | 0.520 | Plastic | 1.535 | 56.0 | ∞ |
| 5 | | ∞ | ASP | 0.204 | | | | |
| 6 | Lens 3 | 1.353 | ASP | 0.830 | Plastic | 1.535 | 56.0 | 0.91 |
| 7 | | −0.593 | ASP | 0.311 | | | | |
| 8 | Lens 4 | −0.312 | ASP | 0.527 | Plastic | 1.634 | 20.4 | 3.74 |
| 9 | | −0.457 | ASP | 0.300 | | | | |
| 10 | Filter | Plano | | 0.110 | Glass | 1.508 | 64.2 | — |
| 11 | | Plano | | 0.271 | | | | |
| 12 | Inside conjugation surface | Plano | | — | | | | |

Reference wavelength is 940.0 nm (infrared).
Effective radius of Surface 9 is 1.123 mm.

TABLE 2

Aspheric Coefficients

| Surface # | 2 | 3 | 4 | 5 |
|---|---|---|---|---|
| k= | −1.5934E+00 | 6.3325E−01 | 0.0000E+00 | 0.0000E+00 |
| A4= | 2.0576E+00 | 2.0685E+00 | −9.5333E−01 | −2.3180E+00 |
| A6= | −1.9967E+01 | −2.3657E+00 | −2.7144E+00 | 5.7458E+00 |
| A8= | 3.2911E+02 | −1.3088E+01 | 3.9972E+00 | −2.6980E+01 |
| A10= | −2.3884E+03 | 1.8912E+02 | −9.6471E+01 | 9.2027E+01 |
| A12= | | | 6.5550E+02 | −1.9147E+02 |
| A14= | | | | 1.6722E+02 |

| Surface # | 6 | 7 | 8 | 9 |
|---|---|---|---|---|
| k= | −1.4508E+01 | −9.4236E−01 | −2.0910E+00 | −2.0867E+00 |
| A4= | −6.7729E−01 | 7.8335E−01 | −1.4826E−01 | 5.5292E−02 |
| A6= | 3.4758E−02 | −2.5546E+00 | −5.1964E−01 | −3.3233E−01 |
| A8= | −4.5521E+00 | 4.0701E+00 | 2.4971E+00 | 5.3272E−01 |
| A10= | 1.0236E+01 | −4.4452E+00 | −3.1848E+00 | −3.1919E−01 |
| A12= | −3.3344E+00 | 3.0431E+00 | 1.8624E+00 | −1.1253E−01 |
| A14= | −2.4191E+00 | −6.6135E−01 | −4.3592E−01 | 2.2694E−01 |
| A16= | | | | −7.4784E−02 |

In Table 1, the detailed optical data of the 1st embodiment in FIG. 1 are stated, wherein the curvature radii, the thicknesses and the focal lengths are shown in millimeters (mm), and measurements of Abbe numbers are made in accordance with the reference wavelength as the d-line. Surface numbers 0-12 represent the surfaces sequentially arranged from the outside to the inside along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
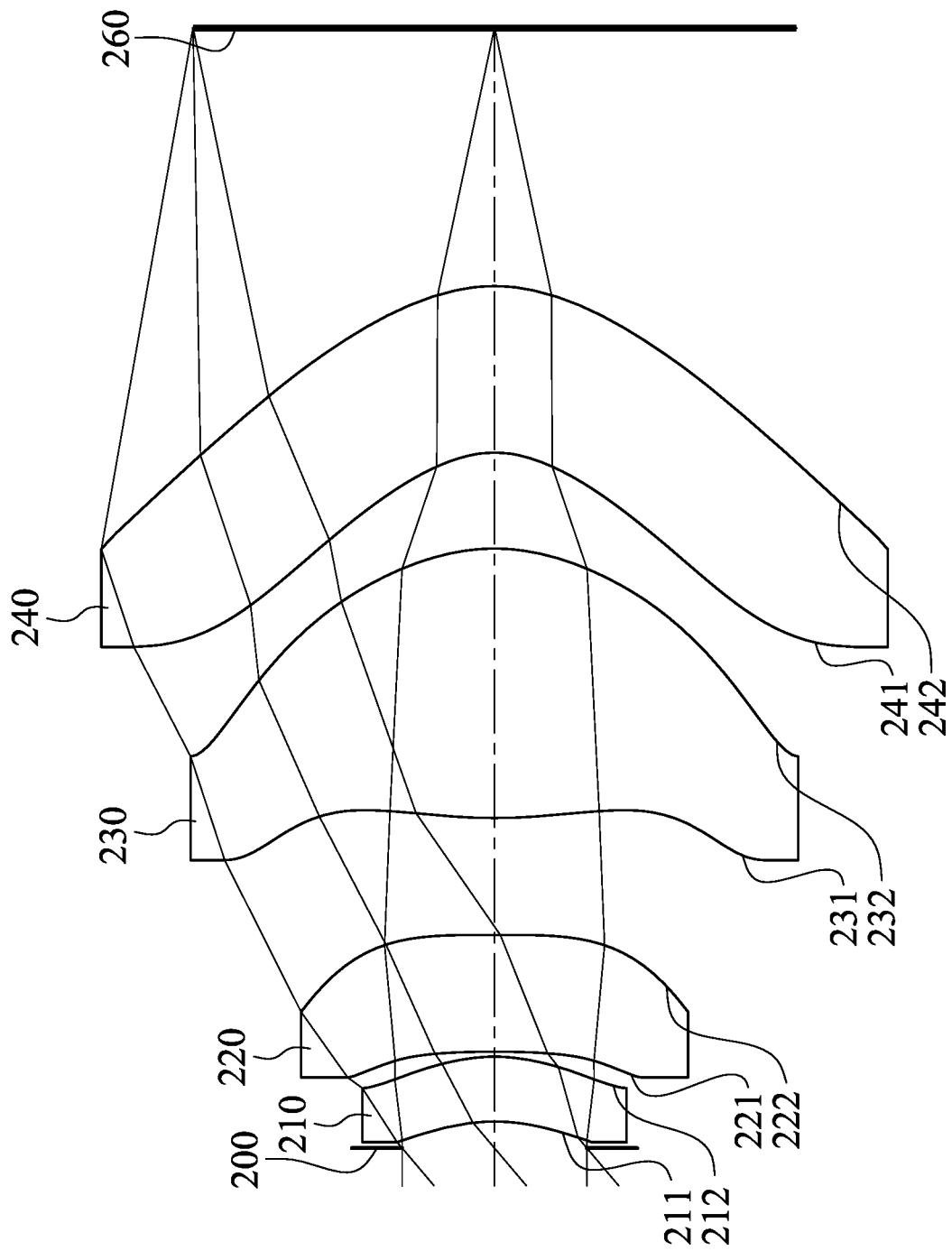
FIG. 3 is a schematic view of an electronic device according to the 2nd embodiment of the present disclosure.
Figure 4:
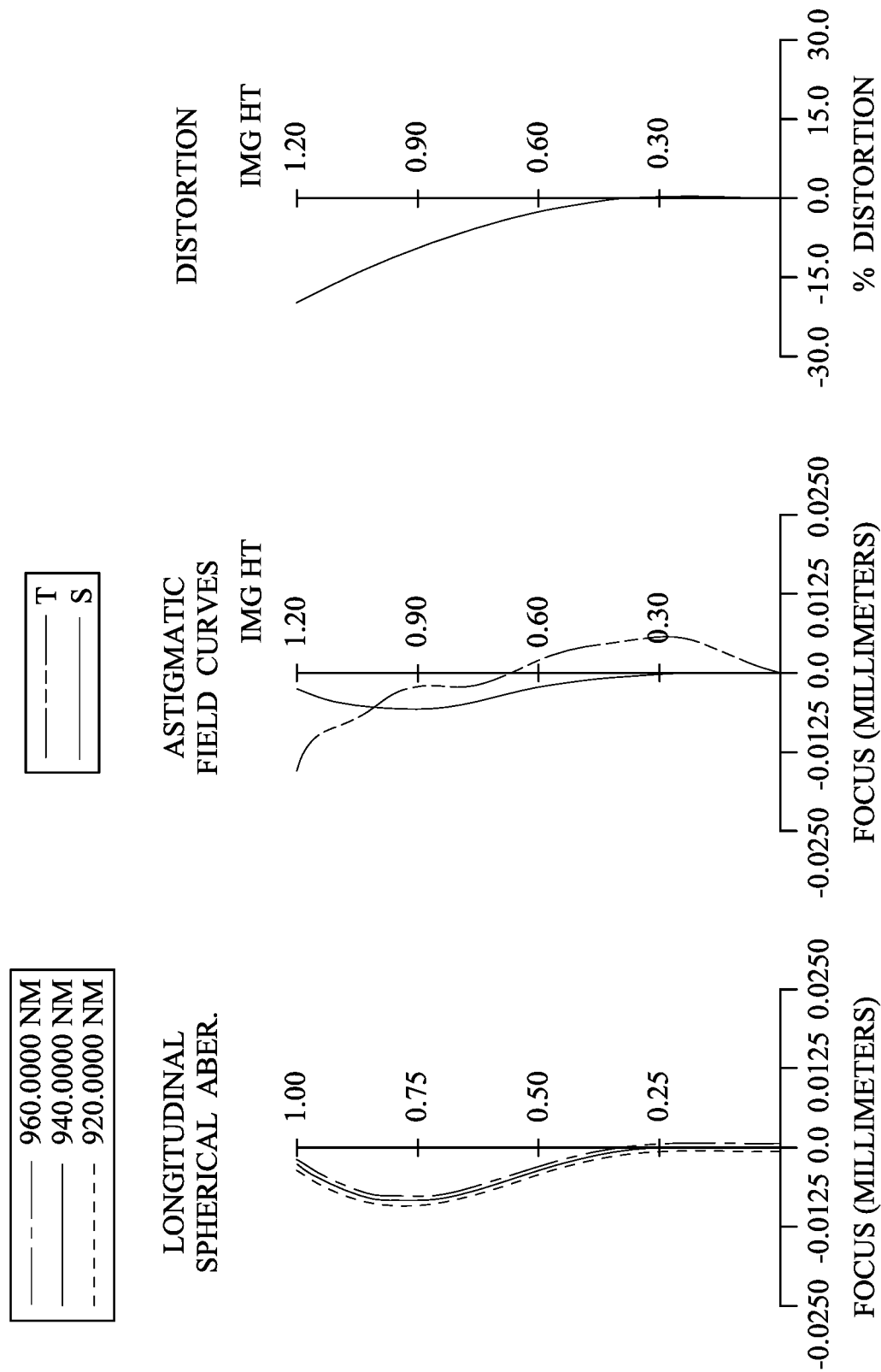
FIG. 4 shows spherical aberration curves, astigmatic field curves and a distortion curve of the electronic device according to the 2nd embodiment.

FIG. 3 is a schematic view of an electronic device according to the 2nd embodiment of the present disclosure. FIG. 4 shows spherical aberration curves, astigmatic field curves and a distortion curve of the electronic device according to the 2nd embodiment. In FIG. 3, the electronic device includes an optical lens assembly (its reference numeral is omitted), wherein the optical lens assembly includes, in order from an outside to an inside, an aperture stop 200, a first lens element 210, a second lens element 220, a third lens element 230, a fourth lens element 240 and an inside conjugation surface 260. The optical lens assembly includes four lens elements (210, 220, 230 and 240) without additional one or more lens elements inserted between the first lens element 210 and the fourth lens element 240, and there is an air gap between optical effective regions of every adjacent lens elements of the first lens element 210 to the fourth lens element 240.

The first lens element 210 with positive refractive power has an outside surface 211 being concave in a paraxial region thereof and an inside surface 212 being convex in a paraxial region thereof. The first lens element 210 is made of a plastic material, and has the outside surface 211 and the inside surface 212 being both aspheric. Furthermore, the inside surface 212 of the first lens element 210 includes an inflection point.

The second lens element 220 with negative refractive power has an outside surface 221 being concave in a paraxial region thereof and an inside surface 222 being convex in a paraxial region thereof. The second lens element 220 is made of a plastic material, and has the outside surface 221 and the inside surface 222 being both aspheric. Furthermore, the outside surface 221 of the second lens element 220 includes an inflection point, and the inside surface 222 of the second lens element 220 includes an inflection point.

The third lens element 230 with positive refractive power has an outside surface 231 being convex in a paraxial region thereof and an inside surface 232 being convex in a paraxial region thereof. The third lens element 230 is made of a plastic material, and has the outside surface 231 and the inside surface 232 being both aspheric. Furthermore, the outside surface 231 of the third lens element 230 includes two inflection points, and the inside surface 232 of the third lens element 230 includes an inflection point. Moreover, the outside surface 231 of the third lens element 230 includes at least one concave shape from the paraxial region thereof to an off-axis region thereof.

The fourth lens element 240 with negative refractive power has an outside surface 241 being concave in a paraxial region thereof and an inside surface 242 being convex in a paraxial region thereof. The fourth lens element 240 is made of a plastic material, and has the outside surface 241 and the inside surface 242 being both aspheric. Furthermore, the outside surface 241 of the fourth lens element 240 includes two inflection points.

The detailed optical data of the 2nd embodiment are shown in Table 3 and the aspheric surface data are shown in Table 4 below.

TABLE 3

2nd Embodiment
f = 1.77 mm, Fno = 2.40, HFOV = 40.3 deg.

| Surface # | | Curvature Radius | | Thickness | Material | Index | Abbe # | Focal Length |
|---|---|---|---|---|---|---|---|---|
| 0 | Outside conjugation surface | Plano | | 400.000 | | | | |
| 1 | Ape. Stop | Plano | | 0.106 | | | | |
| 2 | Lens 1 | −0.743 | ASP | 0.258 | Plastic | 1.536 | 56.1 | 8.93 |
| 3 | | −0.721 | ASP | 0.020 | | | | |
| 4 | Lens 2 | −4.722 | ASP | 0.465 | Plastic | 1.535 | 56.0 | −9.09 |
| 5 | | −165.404 | ASP | 0.466 | | | | |
| 6 | Lens 3 | 2.176 | ASP | 1.073 | Plastic | 1.535 | 56.0 | 1.24 |
| 7 | | −0.792 | ASP | 0.382 | | | | |
| 8 | Lens 4 | −0.444 | ASP | 0.663 | Plastic | 1.641 | 19.5 | −83.93 |
| 9 | | −0.708 | ASP | 1.028 | | | | |
| 10 | Inside conjugation surface | Plano | | — | | | | |

Reference wavelength is 940.0 nm (infrared).

TABLE 4

Aspheric Coefficients

| Surface # | 2 | 3 | 4 | 5 |
|---|---|---|---|---|
| k= | −1.9064E+00 | 1.3395E−01 | 4.0453E+01 | 3.6754E+01 |
| A4= | 7.6687E−01 | 1.3211E+00 | −7.4880E−01 | −1.4123E+00 |
| A6= | −2.0549E+00 | −1.0519E+00 | 5.3914E+00 | 2.7207E+00 |
| A8= | 5.1191E+00 | −6.5383E−01 | −6.6464E+00 | −8.0971E+00 |
| A10= | −1.7353E+00 | 2.1768E+01 | 2.0922E+01 | 1.7277E+01 |
| A12= | | | 1.0879E+00 | −2.2501E+01 |
| A14= | | | | 1.3091E+01 |

| Surface # | 6 | 7 | 8 | 9 |
|---|---|---|---|---|
| k= | −2.6001E+00 | −8.9424E−01 | −2.1969E+00 | −2.1112E+00 |
| A4= | −3.8430E−01 | 4.0381E−01 | −2.6884E−02 | 2.1469E−02 |
| A6= | −4.6968E−02 | −8.2229E−01 | −2.8301E−01 | −1.1032E−01 |
| A8= | −8.0994E−02 | 8.2164E−01 | 6.1671E−01 | 1.1482E−01 |
| A10= | −4.3946E−01 | −4.7579E−01 | −4.4992E−01 | −5.2335E−02 |
| A12= | 1.0367E+00 | 1.1659E−01 | 1.5039E−01 | 7.6263E−03 |
| A14= | −4.5248E−01 | 1.0679E−02 | −1.9699E−02 | 2.0020E−03 |
| A16= | | | | −6.1907E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.77 | TL/YI | 3.63 |
| Fno | 2.40 | R7/Y41 | −0.31 |
| HFOV [deg.] | 40.3 | R8/f | −0.40 |
| (Vd2 + Vd3)/Vd4 | 5.76 | R8/Y42 | −0.45 |
| Vd4 | 19.5 | \|f/f1\| | 0.20 |
| CT1/CT4 | 0.39 | \|f/f1\| + \|f/f2\| | 0.39 |
| CT1/R1 | −0.35 | \|f/f2\| | 0.19 |
| CT1/R2 | −0.36 | \|f/f3\| | 1.42 |
| Dr5r8/Dr1r4 | 2.85 | \|f/f4\| | 0.02 |
| SL/TL | 1.02 | \|f1/R1\| | 12.01 |
| T34/CT4 | 0.58 | \|f3/f1\| + \|f3/f2\| + \|f3/f4\| | 0.29 |
| TD [mm] | 3.33 | Y42/Y11 | 4.04 |
| TD/BL | 3.24 | YI/Y42 | 0.77 |
| TD/(T23 + T34) | 3.92 | | |

3rd Embodiment

Figure 5:
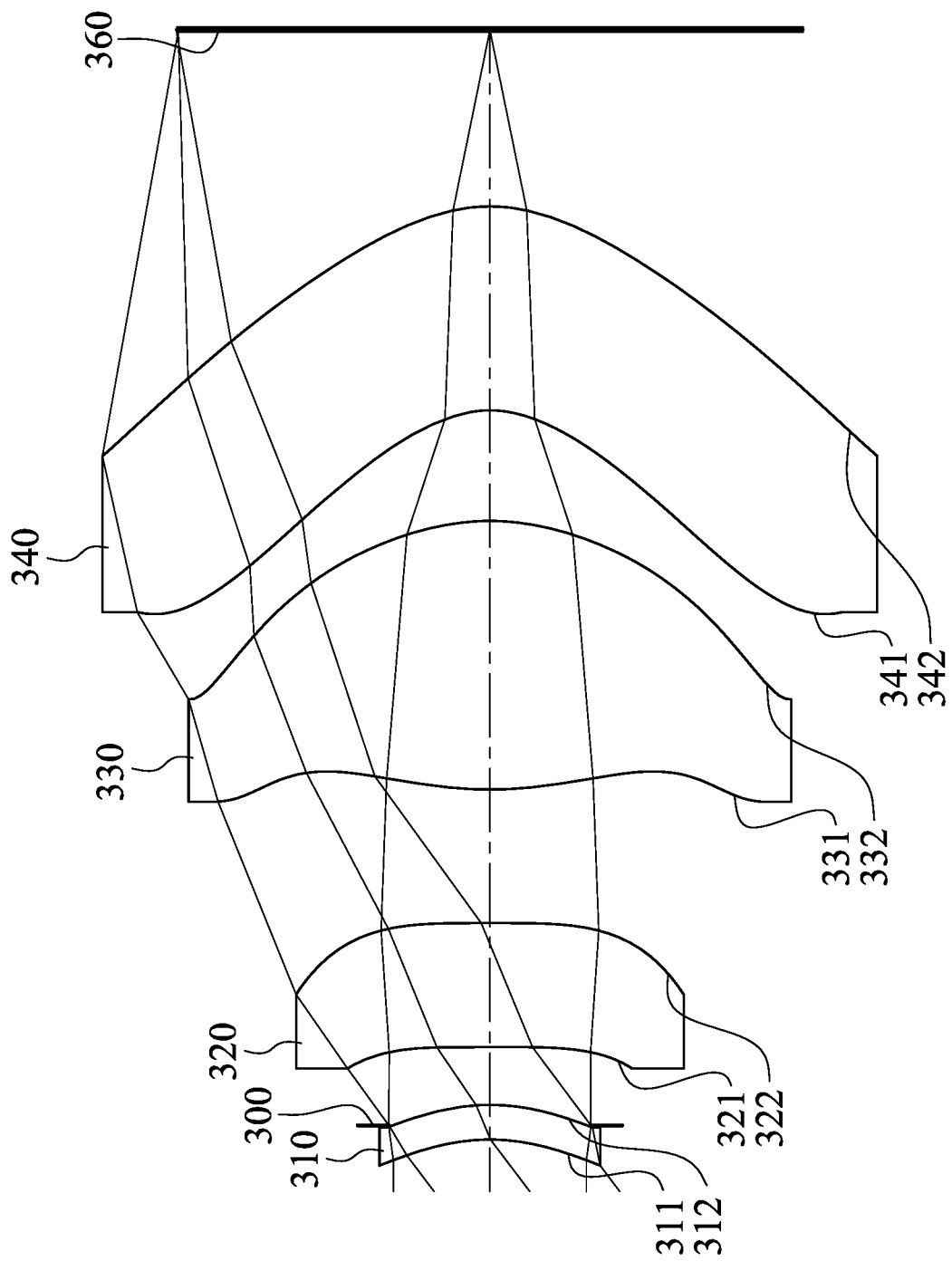
FIG. 5 is a schematic view of an electronic device according to the 3rd embodiment of the present disclosure.
Figure 6:
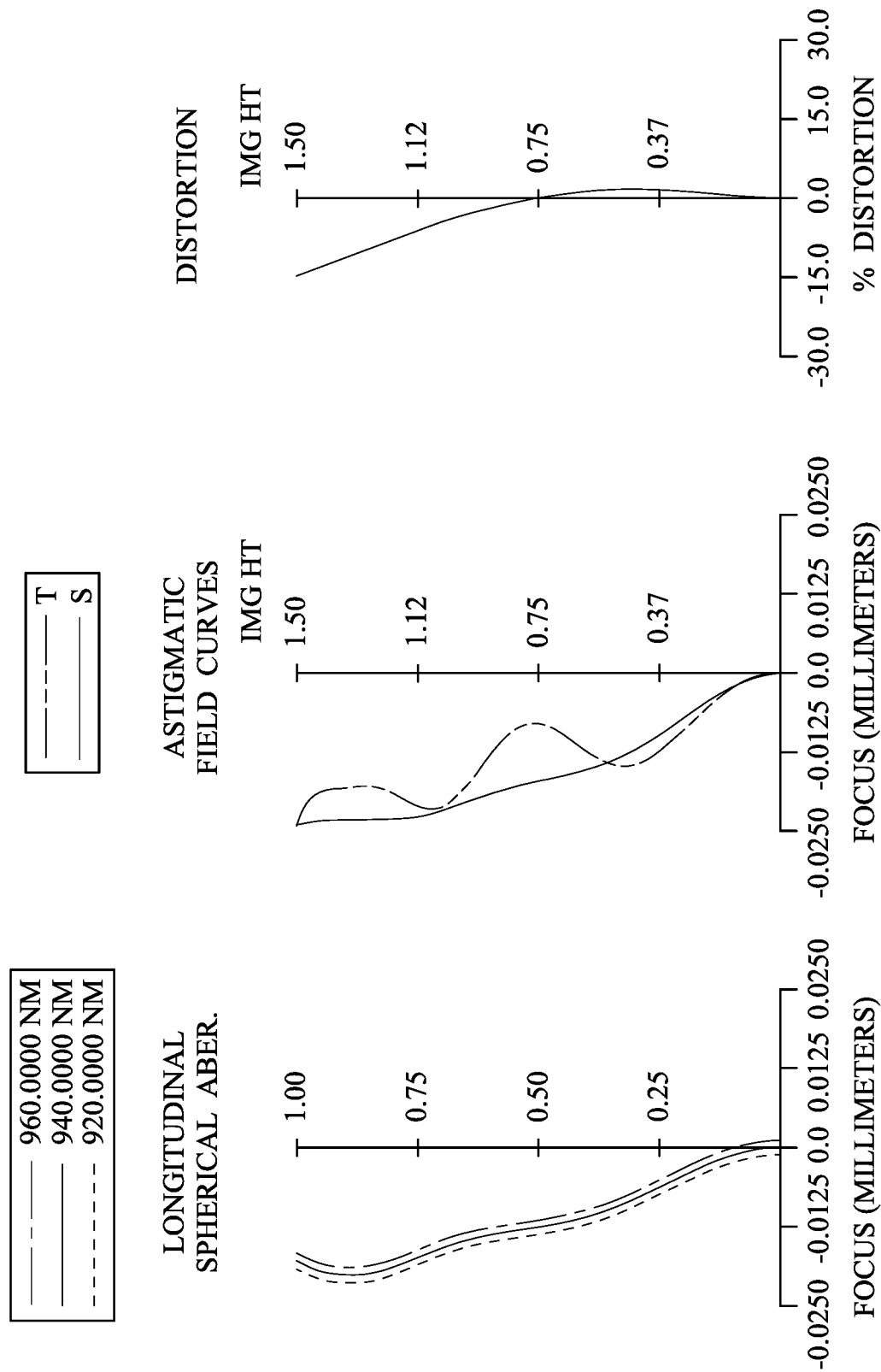
FIG. 6 shows spherical aberration curves, astigmatic field curves and a distortion curve of the electronic device according to the 3rd embodiment.

FIG. 5 is a schematic view of an electronic device according to the 3rd embodiment of the present disclosure. FIG. 6 shows spherical aberration curves, astigmatic field curves and a distortion curve of the electronic device according to the 3rd embodiment. In FIG. 5, the electronic device includes an optical lens assembly (its reference numeral is omitted), wherein the optical lens assembly includes, in order from an outside to an inside, a first lens element 310, an aperture stop 300, a second lens element 320, a third lens element 330, a fourth lens element 340 and an inside conjugation surface 360. The optical lens assembly includes four lens elements (310, 320, 330 and 340) without additional one or more lens elements inserted between the first lens element 310 and the fourth lens element 340, and there is an air gap between optical effective regions of every adjacent lens elements of the first lens element 310 to the fourth lens element 340.

The first lens element 310 with positive refractive power has an outside surface 311 being concave in a paraxial region thereof and an inside surface 312 being convex in a paraxial region thereof. The first lens element 310 is made of a plastic material, and has the outside surface 311 and the inside surface 312 being both aspheric.

The second lens element 320 with negative refractive power has an outside surface 321 being concave in a paraxial region thereof and an inside surface 322 being concave in a paraxial region thereof. The second lens element 320 is made of a glass material, and has the outside surface 321 and the inside surface 322 being both aspheric. Furthermore, the inside surface 322 of the second lens element 320 includes an inflection point.

The third lens element 330 with positive refractive power has an outside surface 331 being convex in a paraxial region thereof and an inside surface 332 being convex in a paraxial region thereof. The third lens element 330 is made of a plastic material, and has the outside surface 331 and the inside surface 332 being both aspheric. Furthermore, the outside surface 331 of the third lens element 330 includes two inflection points, and the inside surface 332 of the third lens element 330 includes an inflection point. Moreover, the outside surface 331 of the third lens element 330 includes at least one concave shape from the paraxial region thereof to an off-axis region thereof.

The fourth lens element 340 with positive refractive power has an outside surface 341 being concave in a paraxial region thereof and an inside surface 342 being convex in a paraxial region thereof. The fourth lens element 340 is made of a plastic material, and has the outside surface 341 and the inside surface 342 being both aspheric. Furthermore, the outside surface 341 of the fourth lens element 340 includes an inflection point, and the inside surface 342 of the fourth lens element 340 includes two inflection points.

The detailed optical data of the 3rd embodiment are shown in Table 5 and the aspheric surface data are shown in Table 6 below.

TABLE 5

3rd Embodiment
f = 2.33 mm, Fno = 2.50, HFOV = 37.1 deg.

| Surface # | | Curvature Radius | | Thickness | Material | Index | Abbe # | Focal Length |
|---|---|---|---|---|---|---|---|---|
| 0 | Outside conjugation surface | Plano | | 400.000 | | | | |
| 1 | Lens 1 | −0.969 | ASP | 0.167 | Plastic | 1.564 | 30.2 | 107.18 |
| 2 | | −1.013 | ASP | −0.099 | | | | |
| 3 | Ape. Stop | Plano | | 0.378 | | | | |
| 4 | Lens 2 | −66.506 | ASP | 0.597 | Glass | 1.534 | 62.9 | −91.88 |
| 5 | | 187.496 | ASP | 0.644 | | | | |
| 6 | Lens 3 | 1.914 | ASP | 1.294 | Plastic | 1.535 | 56.0 | 1.58 |
| 7 | | −1.152 | ASP | 0.533 | | | | |
| 8 | Lens 4 | −0.533 | ASP | 0.983 | Plastic | 1.618 | 22.5 | 6.13 |
| 9 | | −0.796 | ASP | 0.853 | | | | |
| 10 | Inside conjugation surface | Plano | | — | | | | |

Reference wavelength is 940.0 nm (infrared).

TABLE 6

Aspheric Coefficients

| Surface # | 1 | 2 | 4 | 5 |
|---|---|---|---|---|
| k= | −1.7127E+00 | 1.2562E+00 | 5.3533E+01 | −9.9000E+01 |
| A4= | 1.5343E−01 | 4.1382E−01 | −4.3869E−01 | −5.7129E−01 |
| A6= | 9.8776E−02 | 7.1032E−01 | 1.0544E−01 | 5.1366E−01 |
| A8= | −3.8615E−01 | −1.1958E+00 | 5.8565E−01 | −1.1070E+00 |
| A10= | 6.2660E−01 | 3.9484E+00 | −3.9238E+00 | 1.8482E+00 |
| A12= | | | 4.3460E+00 | −1.9529E+00 |
| A14= | | | | 8.1758E−01 |

| Surface # | 6 | 7 | 8 | 9 |
|---|---|---|---|---|
| k= | −3.3123E+00 | −8.3870E−01 | −2.0421E+00 | −2.2389E+00 |
| A4= | −1.2180E−01 | 1.6798E−01 | 2.6292E−03 | 1.8461E−02 |
| A6= | −9.4496E−02 | −2.2911E−01 | −1.1546E−01 | −2.6747E−02 |
| A8= | 1.6148E−01 | 1.1702E−01 | 1.5383E−01 | 1.5007E−02 |
| A10= | −2.9314E−01 | −1.3902E−02 | −7.8205E−02 | −4.8637E−03 |
| A12= | 2.1982E−01 | −1.4116E−02 | 1.9236E−02 | 5.9645E−04 |
| A14= | −5.1148E−02 | 5.5634E−03 | −1.8698E−03 | 7.3573E−05 |
| A16= | | | | −1.7674E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.33 | TL/YI | 3.57 |
| Fno | 2.50 | R7/Y41 | −0.31 |
| HFOV [deg.] | 37.1 | R8/f | −0.34 |
| (Vd2 + Vd3)/Vd4 | 5.29 | R8/Y42 | −0.43 |
| Vd4 | 22.5 | |f/f1| | 0.02 |
| CT1/CT4 | 0.17 | |f/f1| + |f/f2| | 0.05 |
| CT1/R1 | −0.17 | |f/f2| | 0.03 |
| CT1/R2 | −0.16 | |f/f3| | 1.48 |
| Dr5r8/Dr1r4 | 2.69 | |f/f4| | 0.38 |
| SL/TL | 0.99 | |f1/R1| | 110.63 |
| T34/CT4 | 0.54 | |f3/f1| + |f3/f2| + |f3/f4| | 0.29 |
| TD [mm] | 4.50 | Y42/Y11 | 3.51 |
| TD/BL | 5.27 | YI/Y42 | 0.80 |
| TD/(T23 + T34) | 3.82 | | |

4th Embodiment

Figure 7:
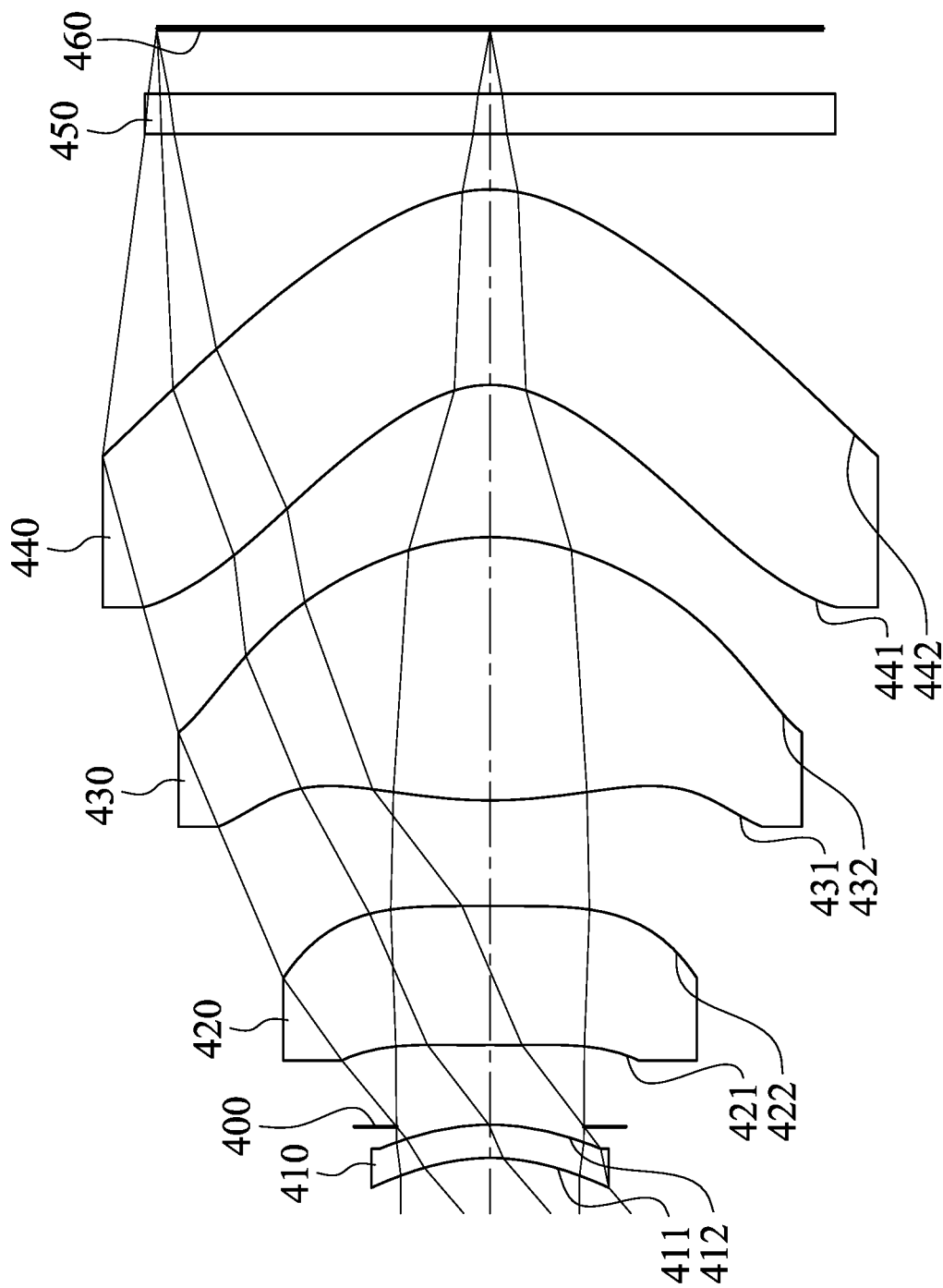
FIG. 7 is a schematic view of an electronic device according to the 4th embodiment of the present disclosure.
Figure 8:
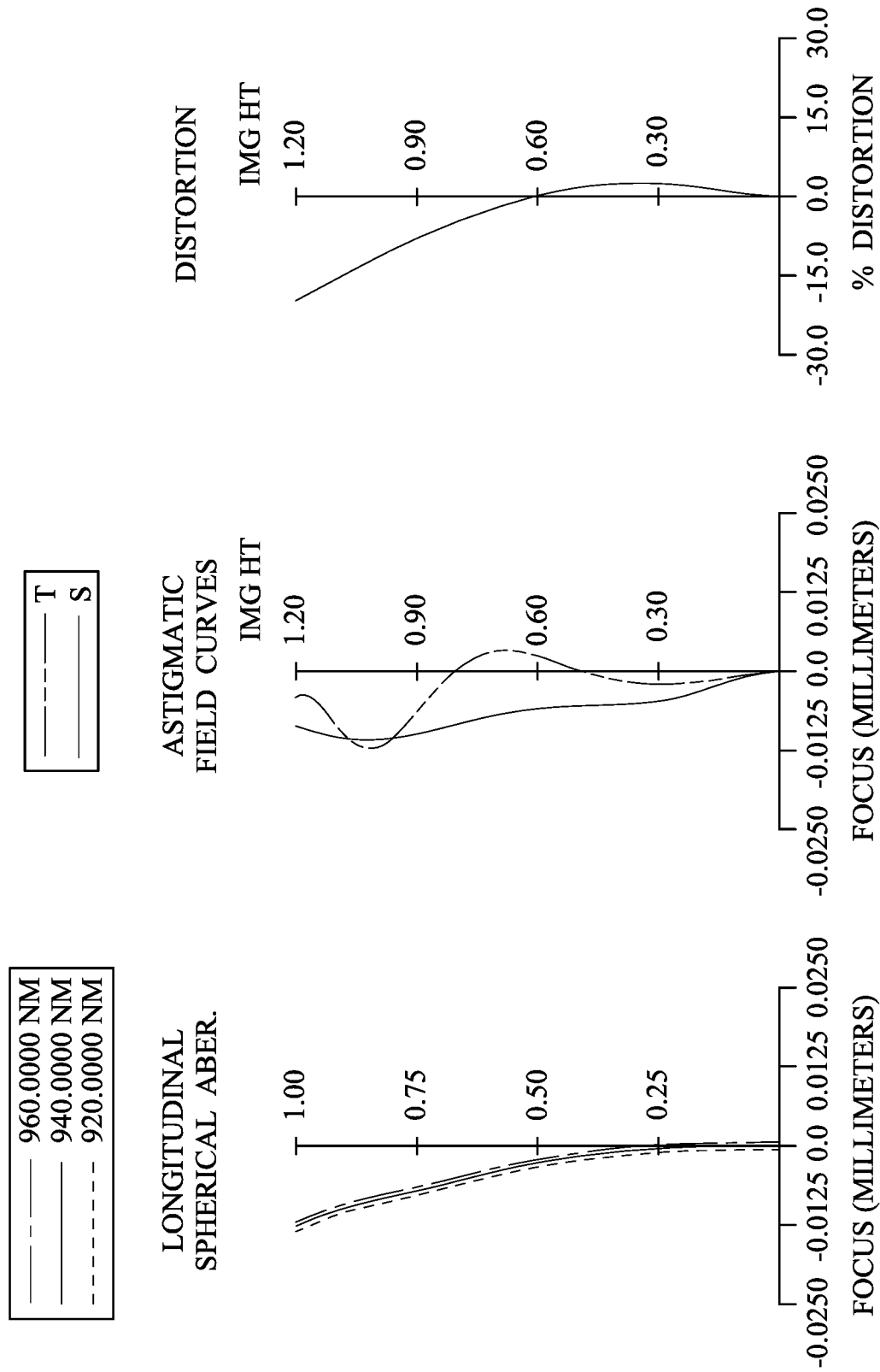
FIG. 8 shows spherical aberration curves, astigmatic field curves and a distortion curve of the electronic device according to the 4th embodiment.

FIG. 7 is a schematic view of an electronic device according to the 4th embodiment of the present disclosure. FIG. 8 shows spherical aberration curves, astigmatic field curves and a distortion curve of the electronic device according to the 4th embodiment. In FIG. 7, the electronic device includes an optical lens assembly (its reference numeral is omitted), wherein the optical lens to assembly includes, in order from an outside to an inside, a first lens element 410, an aperture stop 400, a second lens element 420, a third lens element 430, a fourth lens element 440, a filter 450 and an inside conjugation surface 460. The optical lens assembly includes four lens elements (410, 420, 430 and 440) without additional one or more lens elements inserted between the first lens is element 410 and the fourth lens element 440, and there is an air gap between optical effective regions of every adjacent lens elements of the first lens element 410 to the fourth lens element 440.

The first lens element 410 with negative refractive power has an outside surface 411 being concave in a paraxial region thereof and an inside surface 412 being convex in a paraxial region thereof. The first lens element 410 is made of a plastic material, and has the outside surface 411 and the inside surface 412 being both aspheric.

The second lens element 420 with positive refractive power has an outside surface 421 being convex in a paraxial region thereof and an inside surface 422 being concave in a paraxial region thereof. The second lens element 420 is made of a plastic material, and has the outside surface 421 and the inside surface 422 being both aspheric. Furthermore, the outside surface 421 of the second lens element 420 includes an inflection point, and the inside surface 422 of the second lens element 420 includes an inflection point.

The third lens element 430 with positive refractive power has an outside surface 431 being convex in a paraxial region thereof and an inside surface 432 being convex in a paraxial region thereof. The third lens element 430 is made of a plastic material, and has the outside surface 431 and the inside surface 432 being both aspheric. Furthermore, the outside surface 431 of the third lens element 430 includes two inflection points, and the inside surface 432 of the third lens element 430 includes an inflection point. Moreover, the outside surface 431 of the third lens element 430 includes at least one concave shape from the paraxial region thereof to an off-axis region thereof.

The fourth lens element 440 with positive refractive power has an outside surface 441 being concave in a paraxial region thereof and an inside surface 442 being convex in a paraxial region thereof. The fourth lens element 440 is made of a plastic material, and has the outside surface 441 and the inside surface 442 being both aspheric. Furthermore, the outside surface 441 of the fourth lens element 440 includes an inflection point, and the inside surface 442 of the fourth lens element 440 includes an inflection point.

The filter 450 is made of a glass material and located between the fourth lens element 440 and the inside conjugation surface 460, and will not affect the focal length of the optical lens assembly.

The detailed optical data of the 4th embodiment are shown in Table 7 and the aspheric surface data are shown in Table 8 below.

TABLE 7

4th Embodiment
f = 1.74 mm, Fno = 2.70, HFOV = 40.7 deg.

| Surface # | | Curvature Radius | | Thickness | Material | Index | Abbe # | Focal Length |
|---|---|---|---|---|---|---|---|---|
| 0 | Outside conjugation surface | Plano | | 600.000 | | | | |
| 1 | Lens 1 | −0.776 | ASP | 0.120 | Plastic | 1.536 | 56.1 | −24.22 |
| 2 | | −0.870 | ASP | −0.007 | | | | |
| 3 | Ape. Stop | Plano | | 0.294 | | | | |
| 4 | Lens 2 | 10.850 | ASP | 0.501 | Plastic | 1.535 | 56.0 | 29.11 |
| 5 | | 35.155 | ASP | 0.381 | | | | |
| 6 | Lens 3 | 1.735 | ASP | 0.949 | Plastic | 1.535 | 56.0 | 1.25 |
| 7 | | −0.876 | ASP | 0.549 | | | | |
| 8 | Lens 4 | −0.398 | ASP | 0.704 | Plastic | 1.641 | 19.5 | 2.56 |
| 9 | | −0.541 | ASP | 0.200 | | | | |
| 10 | Filter | Plano | | 0.145 | Glass | 1.508 | 64.2 | — |
| 11 | | Plano | | 0.236 | | | | |
| 12 | Inside conjugation surface | Plano | | — | | | | |

Reference wavelength is 940.0 nm (infrared).

TABLE 8

Aspheric Coefficients

| Surface # | 1 | 2 | 4 | 5 |
|---|---|---|---|---|
| k= | −1.4350E+00 | 1.9065E+00 | −9.9000E+01 | 9.9000E+01 |
| A4= | 1.7680E−01 | 6.3051E−01 | −7.9687E−01 | −8.9991E−01 |
| A6= | 2.2325E−01 | 2.0420E+00 | 8.4971E−01 | 3.2153E−01 |
| A8= | 1.1147E+00 | −5.6833E−01 | −6.3142E+00 | −4.1934E−01 |
| A10= | −7.7108E+00 | 1.7468E+01 | 1.4203E+01 | 6.2073E−01 |
| A12= | | | −1.5388E+01 | −2.9717E+00 |
| A14= | | | | 3.0037E+00 |

| Surface # | 6 | 7 | 8 | 9 |
|---|---|---|---|---|
| k= | −3.5813E+00 | −8.7001E−01 | −2.0199E+00 | −2.1072E+00 |
| A4= | −2.4479E−01 | 3.3148E−01 | 4.0613E−03 | 1.1601E−01 |
| A6= | −3.9865E−01 | −6.6283E−01 | −3.9208E−01 | −3.4945E−01 |
| A8= | 9.3729E−01 | 6.0103E−01 | 8.3666E−01 | 4.2894E−01 |
| A10= | −2.7521E+00 | −4.3042E−01 | −6.4258E−01 | −2.9948E−01 |
| A12= | 3.4968E+00 | 2.1949E−01 | 2.2323E−01 | 1.2170E−01 |
| A14= | −1.3853E+00 | −3.3253E−02 | −2.9004E−02 | −2.6193E−02 |
| A16= | | | | 2.2607E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.74 | TL/YI | 3.39 |
| Fno | 2.70 | R7/Y41 | −0.32 |
| HFOV [deg.] | 40.7 | R8/f | −0.31 |
| (Vd2 + Vd3)/Vd4 | 5.76 | R8/Y42 | −0.39 |
| Vd4 | 19.5 | \|f/f1\| | 0.07 |
| CT1/CT4 | 0.17 | \|f/f1\| + \|f/f2\| | 0.13 |
| CT1/R1 | −0.15 | \|f/f2\| | 0.06 |
| CT1/R2 | −0.14 | \|f/f3\| | 1.40 |
| Dr5r8/Dr1r4 | 2.43 | \|f/f4\| | 0.68 |
| SL/TL | 0.97 | \|f1/R1\| | 31.22 |
| T34/CT4 | 0.78 | \|f3/f1\| + \|f3/f2\| + \|f3/f4\| | 0.58 |
| TD [mm] | 3.49 | Y42/Y11 | 3.27 |
| TD/BL | 6.01 | YI/Y42 | 0.86 |
| TD/(T23 + T34) | 3.75 | | |

5th Embodiment

Figure 9:
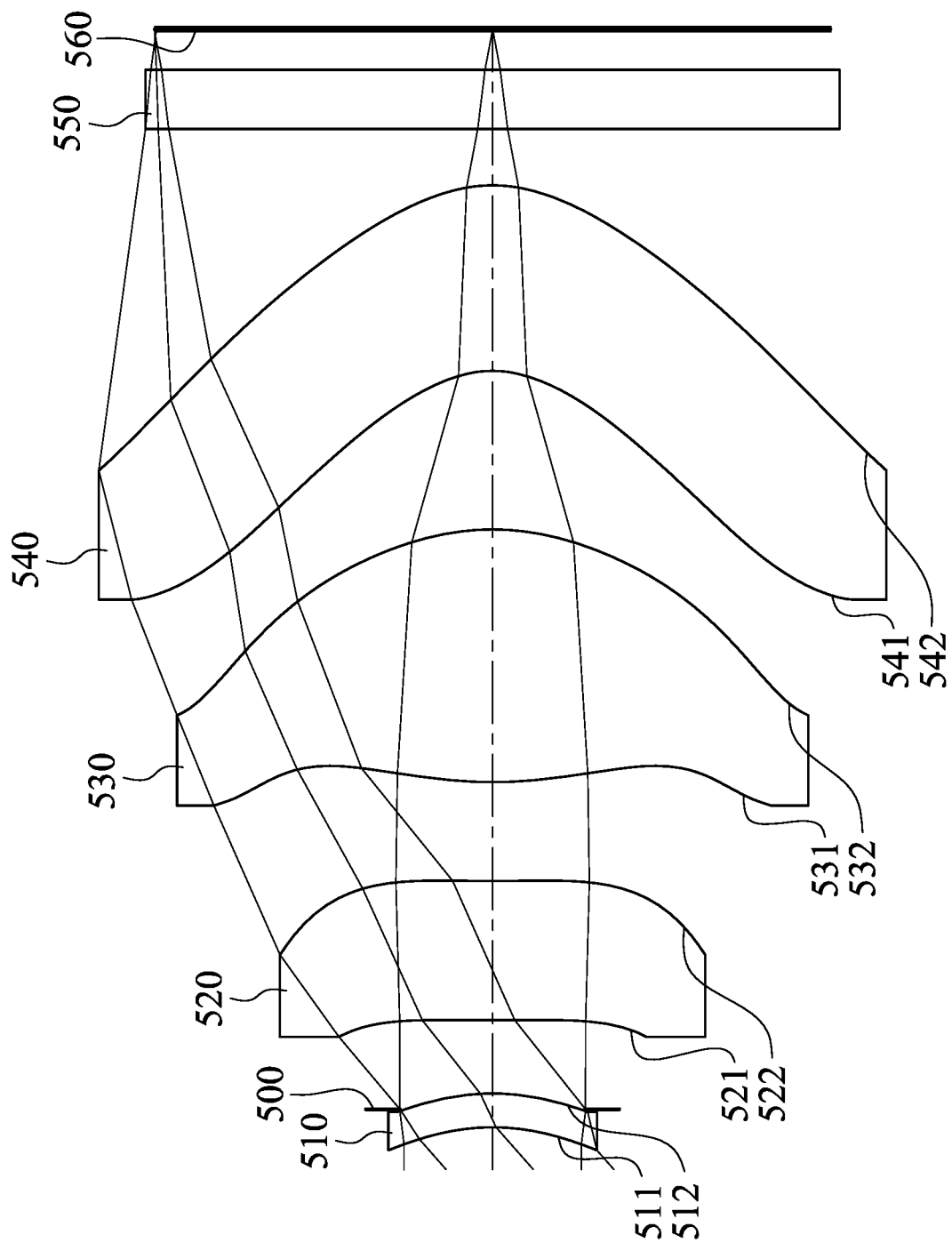
FIG. 9 is a schematic view of an electronic device according to the 5th embodiment of the present disclosure.
Figure 10:
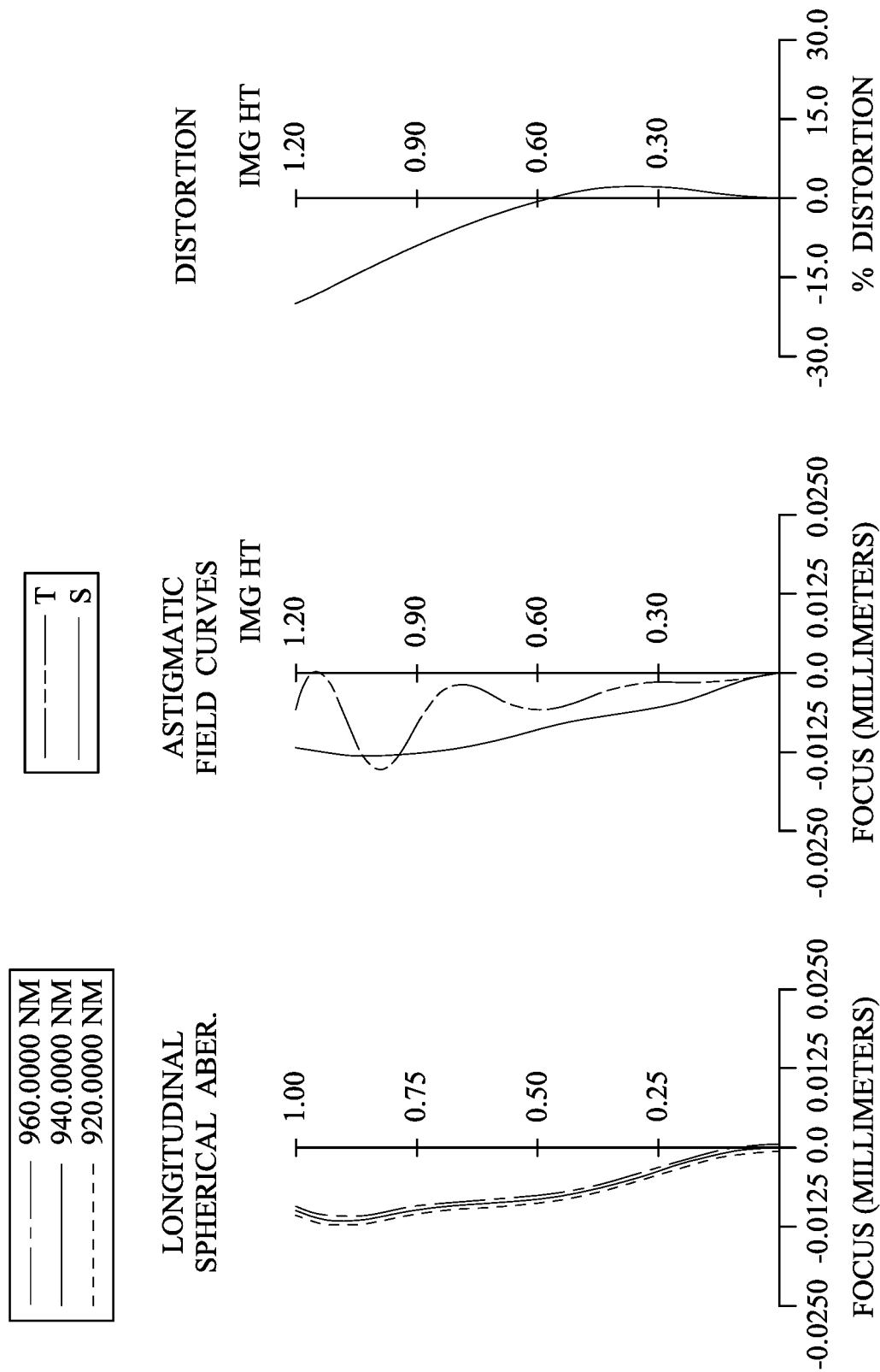
FIG. 10 shows spherical aberration curves, astigmatic field curves and a distortion curve of the electronic device according to the 5th embodiment.

FIG. 9 is a schematic view of an electronic device according to the 5th embodiment of the present disclosure. FIG. 10 shows spherical aberration curves, astigmatic field curves and a distortion curve of the electronic device according to the 5th embodiment. In FIG. 9, the electronic device includes an optical lens assembly (its reference numeral is omitted), wherein the optical lens assembly includes, in order from an outside to an inside, a first lens element 510, an aperture stop 500, a second lens element 520, a third lens element 530, a fourth lens element 540, a filter 550 and an inside conjugation surface 560. The optical lens assembly includes four lens elements (510, 520, 530 and 540) without additional one or more lens elements inserted between the first lens element 510 and the fourth lens element 540, and there is an air gap between optical effective regions of every adjacent lens elements of the first lens element 510 to the fourth lens element 540.

The first lens element 510 with negative refractive power has an outside surface 511 being concave in a paraxial region thereof and an inside surface 512 being convex in a paraxial region thereof. The first lens element 510 is made of a plastic material, and has the outside surface 511 and the inside surface 512 being both aspheric.

The second lens element 520 with negative refractive power has an outside surface 521 being convex in a paraxial region thereof and an inside surface 522 being concave in a paraxial region thereof. The second lens element 520 is made of a plastic material, and has the outside surface 521 and the inside surface 522 being both aspheric. Furthermore, the outside surface 521 of the second lens element 520 includes an inflection point, and the inside surface 522 of the second lens element 520 includes an inflection point.

The third lens element 530 with positive refractive power has an outside surface 531 being convex in a paraxial region thereof and an inside surface 532 being convex in a paraxial region thereof. The third lens element 530 is made of a plastic material, and has the outside surface 531 and the inside surface 532 being both aspheric. Furthermore, the outside surface 531 of the third lens element 530 includes three inflection points, and the inside surface 532 of the third lens element 530 includes an inflection point. Moreover, the outside surface 531 of the third lens element 530 includes at least one concave shape from the paraxial region thereof to an off-axis region thereof.

The fourth lens element 540 with positive refractive power has an outside surface 541 being concave in a paraxial region thereof and an inside surface 542 being convex in a paraxial region thereof. The fourth lens element 540 is made of a plastic material, and has the outside surface 541 and the inside surface 542 being both aspheric. Furthermore, the outside surface 541 of the fourth lens element 540 includes an inflection point, and the inside surface 542 of the fourth lens element 540 includes an inflection point.

The filter 550 is made of a glass material and located between the fourth lens element 540 and the inside conjugation surface 560, and will not affect the focal length of the optical lens assembly.

The detailed optical data of the 5th embodiment are shown in Table 9 and the aspheric surface data are shown in Table 10 below.

TABLE 9

5th Embodiment
f = 1.70 mm, Fno = 2.70, HFOV = 41.4 deg.

| Surface # | | Curvature Radius | | Thickness | Material | Index | Abbe # | Focal Length |
|---|---|---|---|---|---|---|---|---|
| 0 | Outside conjugation surface | Plano | | 600.000 | | | | |
| 1 | Lens 1 | −0.771 | ASP | 0.120 | Plastic | 1.536 | 56.1 | −105.57 |
| 2 | | −0.825 | ASP | −0.056 | | | | |
| 3 | Ape. Stop | Plano | | 0.316 | | | | |
| 4 | Lens 2 | 10.820 | ASP | 0.495 | Plastic | 1.535 | 56.0 | −54.50 |
| 5 | | 7.766 | ASP | 0.351 | | | | |
| 6 | Lens 3 | 1.585 | ASP | 0.897 | Plastic | 1.535 | 56.0 | 1.21 |
| 7 | | −0.875 | ASP | 0.563 | | | | |
| 8 | Lens 4 | −0.395 | ASP | 0.659 | Plastic | 1.641 | 19.5 | 2.49 |
| 9 | | −0.523 | ASP | 0.200 | | | | |
| 10 | Filter | Plano | | 0.210 | Glass | 1.508 | 64.2 | — |
| 11 | | Plano | | 0.145 | | | | |
| 12 | Inside conjugation surface | Plano | | — | | | | |

Reference wavelength is 940.0 nm (infrared).

TABLE 10

Aspheric Coefficients

| Surface # | 1 | 2 | 4 | 5 |
|---|---|---|---|---|
| k= | −1.5177E+00 | 1.6628E+00 | 6.8668E+01 | 5.4220E+01 |
| A4= | 2.4095E−01 | 7.5995E−01 | −7.5576E−01 | −1.0648E+00 |
| A6= | −1.8414E−01 | 2.8482E+00 | 4.2595E−01 | 1.3593E+00 |
| A8= | 2.1840E+00 | −1.1923E+01 | −1.5681E+00 | −5.8229E+00 |
| A10= | −5.7365E+00 | 7.0186E+01 | −1.0346E+01 | 1.6048E+01 |
| A12= | | | 2.6924E+01 | −2.6310E+01 |
| A14= | | | | 1.7342E+01 |

| Surface # | 6 | 7 | 8 | 9 |
|---|---|---|---|---|
| k= | −3.8643E+00 | −8.6129E−01 | −1.9970E+00 | −2.0020E+00 |
| A4= | −2.8901E−01 | 3.1314E−01 | −1.3272E−01 | 1.5638E−01 |
| A6= | −2.6326E−01 | −7.4667E−01 | 2.8005E−02 | −5.2412E−01 |
| A8= | 1.0344E+00 | 1.2241E+00 | 1.6360E−01 | 7.1035E−01 |
| A10= | −4.1468E+00 | −1.7880E+00 | −5.0256E−02 | −5.3613E−01 |

TABLE 10-continued

| Aspheric Coefficients | | | | |
|---|---|---|---|---|
| A12= | 5.6967E+00 | 1.4349E+00 | −3.6392E−02 | 2.2361E−01 |
| A14= | −2.3759E+00 | −4.0608E−01 | 1.5280E−02 | −4.5118E−02 |
| A16= | | | | 3.0422E−03 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.70 | TL/YI | 3.25 |
| Fno | 2.70 | R7/Y41 | −0.31 |
| HFOV [deg.] | 41.4 | R8/f | −0.31 |
| (Vd2 + Vd3)/Vd4 | 5.76 | R8/Y42 | −0.37 |
| Vd4 | 19.5 | \|f/f1\| | 0.02 |
| CT1/CT4 | 0.18 | \|f/f1\| + \|f/f2\| | 0.05 |
| CT1/R1 | −0.16 | \|f/f2\| | 0.03 |
| CT1/R2 | −0.15 | \|f/f3\| | 1.41 |
| Dr5r8/Dr1r4 | 2.42 | \|f/f4\| | 0.68 |
| SL/TL | 0.98 | \|f1/R1\| | 136.85 |
| T34/CT4 | 0.85 | \|f3/f1\| + \|f3/f2\| + \|f3/f4\| | 0.52 |
| TD [mm] | 3.35 | Y42/Y11 | 3.78 |
| TD/BL | 6.03 | YI/Y42 | 0.86 |
| TD/(T23 + T34) | 3.66 | | |

6th Embodiment

Figure 11:
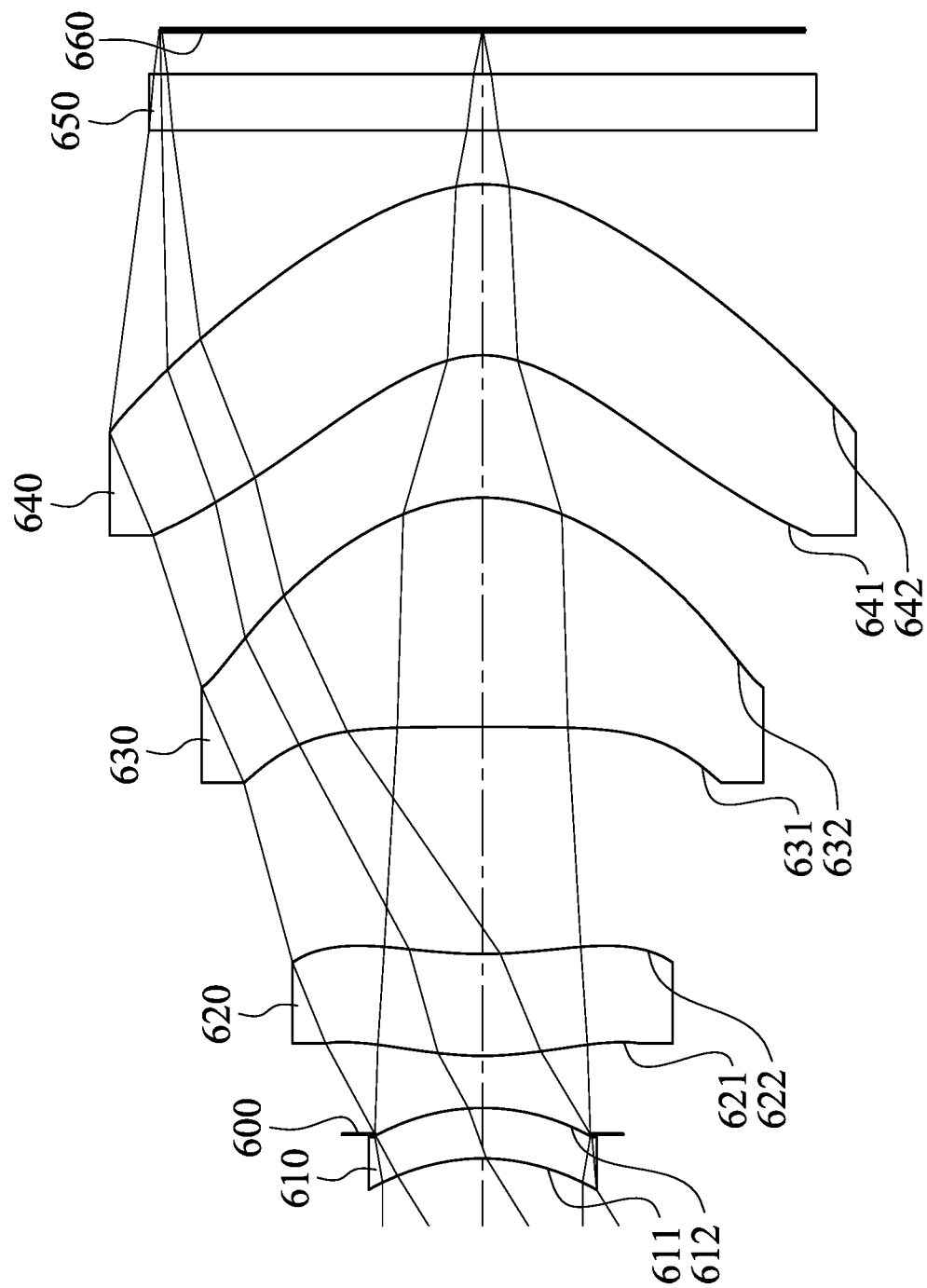
FIG. 11 is a schematic view of an electronic device according to the 6th embodiment of the present disclosure.
Figure 12:
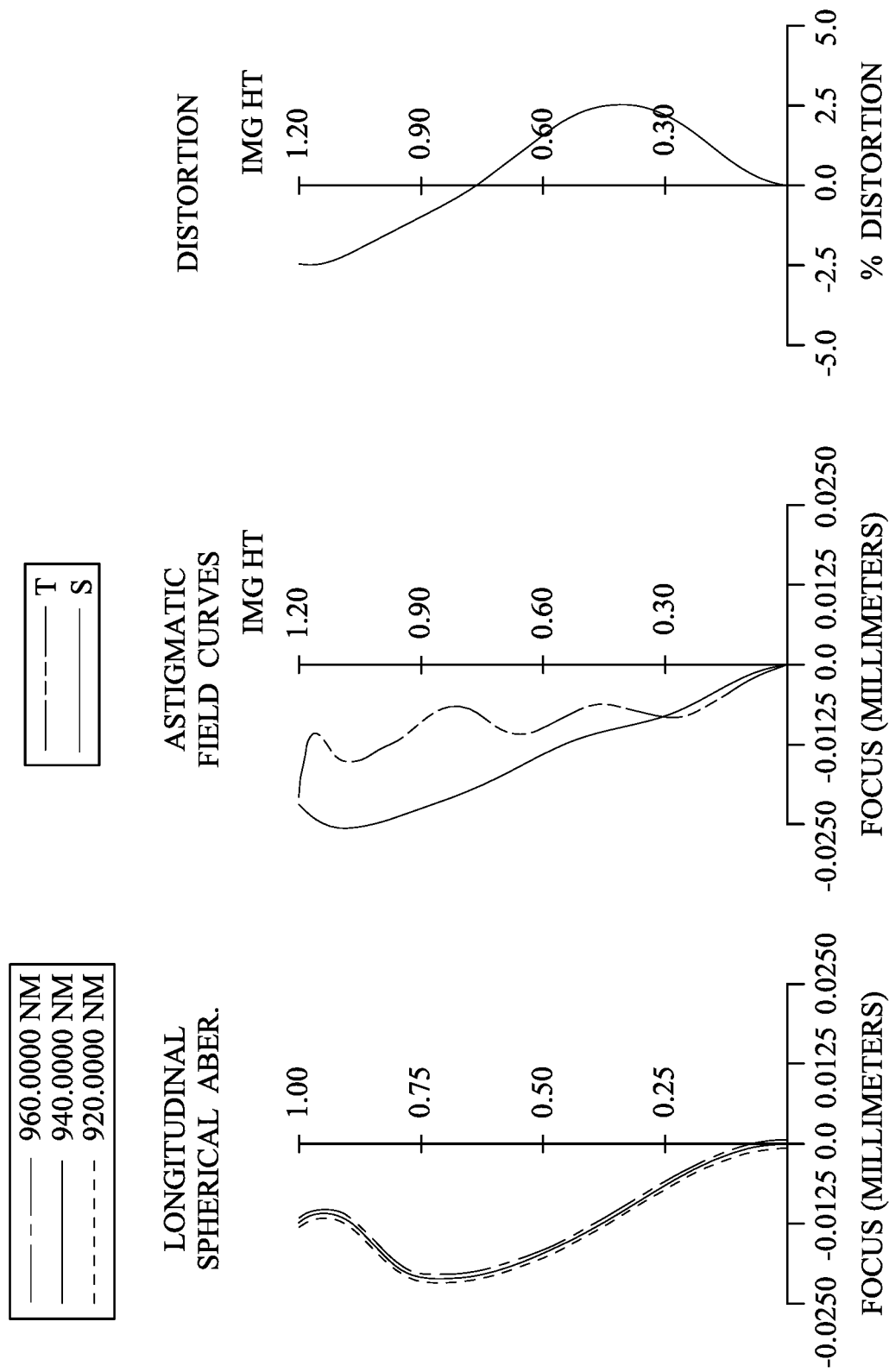
FIG. 12 shows spherical aberration curves, astigmatic field curves and a distortion curve of the electronic device according to the 6th embodiment.

FIG. 11 is a schematic view of an electronic device according to the 6th embodiment of the present disclosure. FIG. 12 shows spherical aberration curves, astigmatic field curves and a distortion curve of the electronic device according to the 6th embodiment. In FIG. 11, the electronic device includes an optical lens assembly (its reference numeral is omitted), wherein the optical lens assembly includes, in order from an outside to an inside, a first lens element 610, an aperture stop 600, a second lens element 620, a third lens element 630, a fourth lens element 640, a filter 650 and an inside conjugation surface 660. The optical lens assembly includes four lens elements (610, 620, 630 and 640) without additional one or more lens elements inserted between the first lens element 610 and the fourth lens element 640, and there is an air gap between optical effective regions of every adjacent lens elements of the first lens element 610 to the fourth lens element 640.

The first lens element 610 with positive refractive power has an outside surface 611 being concave in a paraxial region thereof and an inside surface 612 being convex in a paraxial region thereof. The first lens element 610 is made of a plastic material, and has the outside surface 611 and the inside surface 612 being both aspheric.

The second lens element 620 with positive refractive power has an outside surface 621 being convex in a paraxial region thereof and an inside surface 622 being concave in a paraxial region thereof. The second lens element 620 is made of a plastic material, and has the outside surface 621 and the inside surface 622 being both aspheric. Furthermore, the outside surface 621 of the second lens element 620 includes an inflection point, and the inside surface 622 of the second lens element 620 includes an inflection point.

The third lens element 630 with positive refractive power has an outside surface 631 being concave in a paraxial region thereof and an inside surface 632 being convex in a paraxial region thereof. The third lens element 630 is made of a plastic material, and has the outside surface 631 and the inside surface 632 being both aspheric. Furthermore, the outside surface 631 of the third lens element 630 includes an inflection point, and the inside surface 632 of the third lens element 630 includes an inflection point.

The fourth lens element 640 with positive refractive power has an outside surface 641 being concave in a paraxial region thereof and an inside surface 642 being convex in a paraxial region thereof. The fourth lens element 640 is made of a plastic material, and has the outside surface 641 and the inside surface 642 being both aspheric. Furthermore, the outside surface 641 of the fourth lens element 640 includes two inflection points.

The filter 650 is made of a glass material and located between the fourth lens element 640 and the inside conjugation surface 660, and will not affect the focal length of the optical lens assembly.

The detailed optical data of the 6th embodiment are shown in Table 11 and the aspheric surface data are shown in Table 12 below.

TABLE 11

6th Embodiment
f = 1.98 mm, Fno = 2.65, HFOV = 32.0 deg.

| Surface # | | Curvature Radius | | Thickness | Material | Index | Abbe # | Focal Length |
|---|---|---|---|---|---|---|---|---|
| 0 | Outside conjugation surface | Plano | | 600.000 | | | | |
| 1 | Lens 1 | −0.761 | ASP | 0.188 | Plastic | 1.536 | 56.1 | 60.62 |
| 2 | | −0.808 | ASP | −0.098 | | | | |
| 3 | Ape. Stop | Plano | | 0.292 | | | | |
| 4 | Lens 2 | 1.295 | ASP | 0.379 | Plastic | 1.535 | 56.0 | 7.45 |
| 5 | | 1.722 | ASP | 0.845 | | | | |
| 6 | Lens 3 | −205.339 | ASP | 0.854 | Plastic | 1.535 | 56.0 | 1.27 |
| 7 | | −0.678 | ASP | 0.530 | | | | |

TABLE 11-continued

6th Embodiment
f = 1.98 mm, Fno = 2.65, HFOV = 32.0 deg.

| Surface # | | Curvature Radius | | Thickness | Material | Index | Abbe # | Focal Length |
|---|---|---|---|---|---|---|---|---|
| 8 | Lens 4 | −0.422 | ASP | 0.636 | Plastic | 1.641 | 19.5 | 4.52 |
| 9 | | −0.585 | ASP | 0.200 | | | | |
| 10 | Filter | Plano | | 0.210 | Glass | 1.508 | 64.2 | — |
| 11 | | Plano | | 0.164 | | | | |
| 12 | Inside conjugation surface | Plano | | — | | | | |

Reference wavelength is 940.0 nm (infrared).

TABLE 12

Aspheric Coefficients

| Surface # | 1 | 2 | 4 | 5 |
|---|---|---|---|---|
| k= | −9.9617E−01 | 1.5400E+00 | −7.9376E−01 | −3.2271E−01 |
| A4= | 4.0368E−01 | 4.7145E−01 | −8.3974E−01 | −7.6711E−01 |
| A6= | −4.1534E+00 | 3.9394E−01 | 1.1862E+00 | 1.0603E+00 |
| A8= | 1.8467E+01 | 1.3699E+00 | −8.1308E+00 | −7.5189E+00 |
| A10= | −3.8675E+01 | 3.3852E+01 | 3.0162E+01 | 2.6530E+01 |
| A12= | | | −4.1773E+01 | −4.3925E+01 |
| A14= | | | | 2.6208E+01 |

| Surface # | 6 | 7 | 8 | 9 |
|---|---|---|---|---|
| k= | −9.9000E+01 | −1.1029E+00 | −2.4038E+00 | −2.2404E+00 |
| A4= | −1.4974E−01 | 3.3158E−01 | 1.9315E−01 | 2.8737E−01 |
| A6= | −7.8681E−01 | −8.7435E−01 | −1.0786E+00 | −7.5416E−01 |
| A8= | 2.4010E+00 | 1.1076E+00 | 2.5757E+00 | 6.7568E−01 |
| A10= | −4.5235E+00 | −5.5435E−01 | −2.8155E+00 | −2.5164E−02 |
| A12= | 3.7649E+00 | −2.4296E−01 | 1.4601E+00 | −3.4224E+00 |
| A14= | −9.5684E−01 | 2.6674E−01 | −2.9147E−01 | 2.0577E−01 |
| A16= | | | | −3.7666E−02 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.98 | TL/YI | 3.50 |
| Fno | 2.65 | R7/Y41 | −0.34 |
| HFOV [deg.] | 32.0 | R8/f | −0.30 |
| (Vd2 + Vd3)/Vd4 | 5.76 | R8/Y42 | −0.42 |
| Vd4 | 19.5 | |f/f1| | 0.03 |
| CT1/CT4 | 0.30 | |f/f1| + |f/f2| | 0.30 |
| CT1/R1 | −0.25 | |f/f2| | 0.27 |
| CT1/R2 | −0.23 | |f/f3| | 1.56 |
| Dr5r8/Dr1r4 | 2.65 | |f/f4| | 0.44 |
| SL/TL | 0.98 | |f1/R1| | 79.64 |
| T34/CT4 | 0.83 | |f3/f1| + |f3/f2| + |f3/f4| | 0.47 |
| TD [mm] | 3.63 | Y42/Y11 | 3.27 |
| TD/BL | 6.32 | YI/Y42 | 0.86 |
| TD/(T23 + T34) | 2.64 | | |

7th Embodiment

Figure 13:
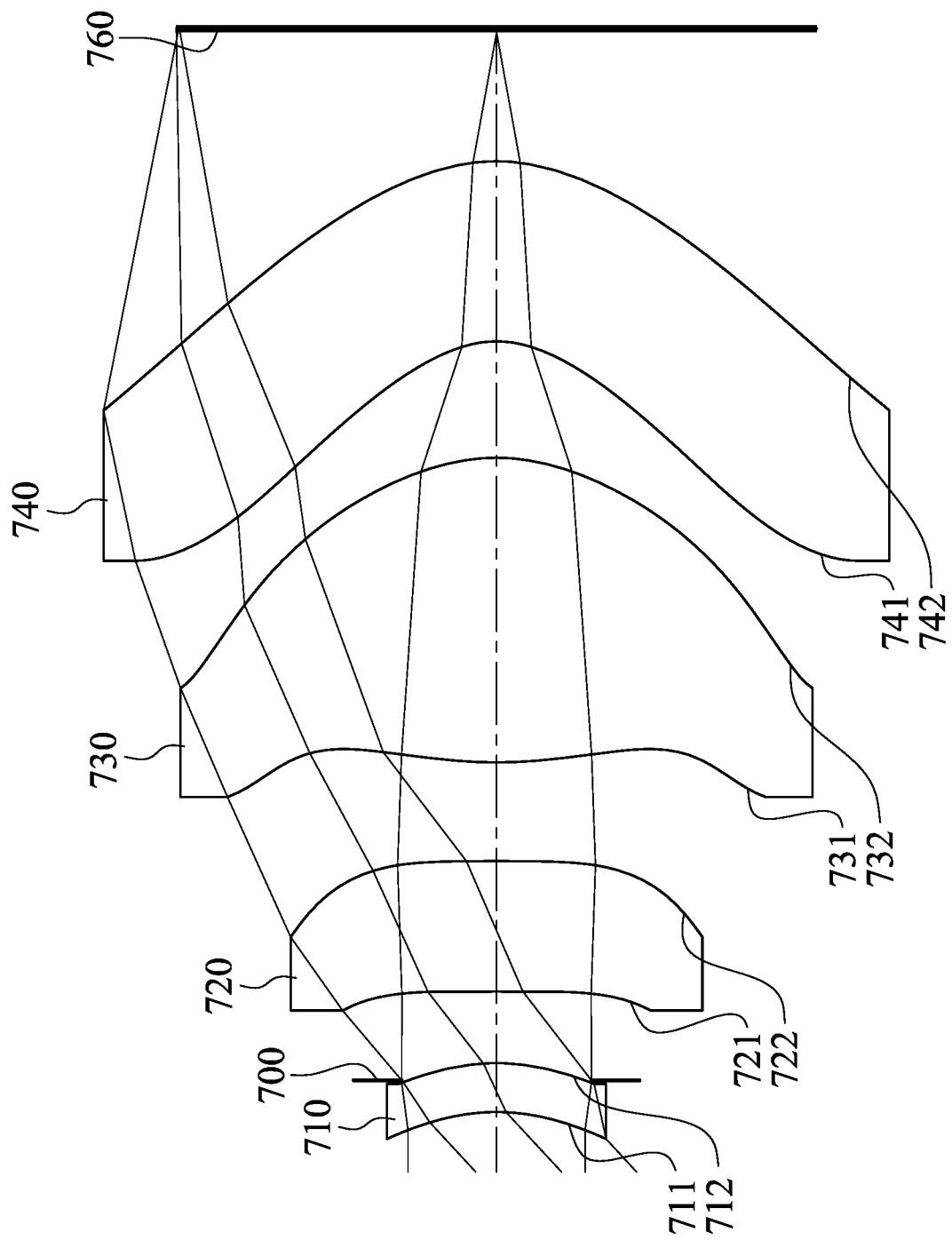
FIG. 13 is a schematic view of an electronic device according to the 7th embodiment of the present disclosure.
Figure 14:
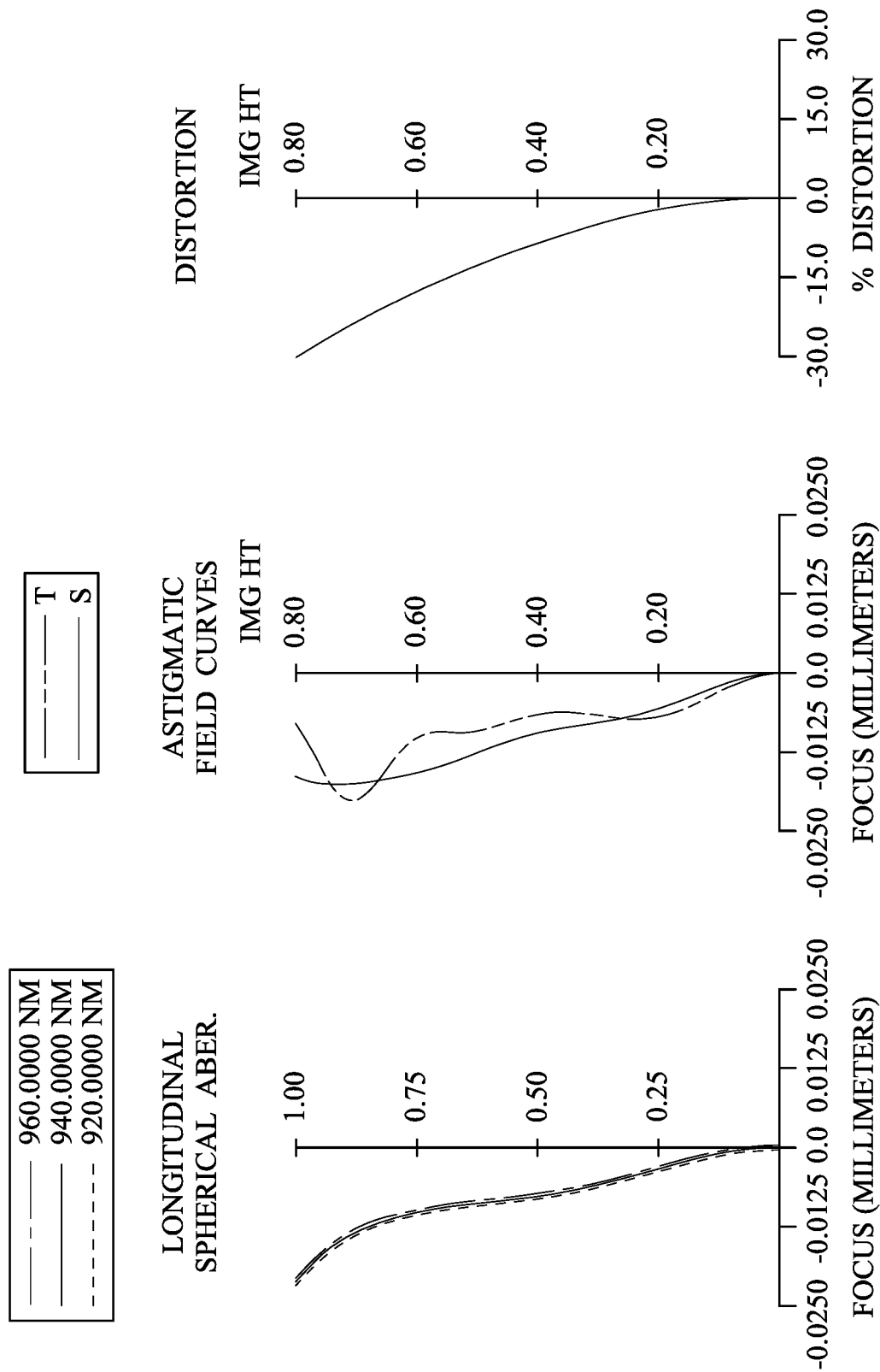
FIG. 14 shows spherical aberration curves, astigmatic field curves and a distortion curve of the electronic device according to the 7th embodiment.

FIG. 13 is a schematic view of an electronic device according to the 7th embodiment of the present disclosure. FIG. 14 shows spherical aberration curves, astigmatic field curves and a distortion curve of the electronic device to according to the 7th embodiment. In FIG. 13, the electronic device includes an optical lens assembly (its reference numeral is omitted), wherein the optical lens assembly includes, in order from an outside to an inside, a first lens element 710, an aperture stop 700, a second lens element 720, a third lens element 730, a fourth lens element 740 and an inside conjugation surface 760. The optical lens assembly includes four lens elements (710, 720, 730 and 740) without additional one or more lens elements inserted between the first lens element 710 and the fourth lens element 740, and there is an air gap between optical effective regions of every adjacent lens elements of the first lens element 710 to the fourth lens element 740.

The first lens element 710 with positive refractive power has an outside surface 711 being concave in a paraxial region thereof and an inside surface 712 being convex in a paraxial region thereof. The first lens element 710 is made of a plastic material, and has the outside surface 711 and the inside surface 712 being both aspheric.

The second lens element 720 with positive refractive power has an outside surface 721 being convex in a paraxial region thereof and an inside surface 722 being convex in a paraxial region thereof. The second lens element 720 is made of a plastic material, and has the outside surface 721 and the inside surface 722 being both aspheric. Furthermore, the outside surface 721 of the second lens element 720 includes two inflection points, and the inside surface 722 of the second lens element 720 includes an inflection point.

The third lens element 730 with positive refractive power has an outside surface 731 being convex in a paraxial region thereof and an inside surface 732 being convex in a paraxial region thereof. The third lens element 730 is made of a plastic material, and has the outside surface 731 and the inside surface 732 being both aspheric. Furthermore, the outside surface 731 of the third lens element 730 includes two inflection points, and the inside surface 732 of the third lens element 730 includes an inflection point. Moreover, the outside surface 731 of the third lens element 730 includes at least one concave shape from the paraxial region thereof to an off-axis region thereof.

The fourth lens element 740 with negative refractive power has an outside surface 741 being concave in a paraxial region thereof and an inside surface 742 being convex in a paraxial region thereof. The fourth lens element 740 is made of a plastic material, and has the outside surface 741 and the inside surface 742 being both aspheric. Furthermore, the outside surface 741 of the fourth lens element 740 includes an inflection point, and the inside surface 742 of the fourth lens element 740 includes two inflection points.

The detailed optical data of the 7th embodiment are shown in Table 13 and the aspheric surface data are shown in Table 14 below.

TABLE 13

7th Embodiment
f = 1.24 mm, Fno = 2.80, HFOV = 42.8 deg.

| Surface # | | Curvature Radius | | Thickness | Material | Index | Abbe # | Focal Length |
|---|---|---|---|---|---|---|---|---|
| 0 | Outside conjugation surface | Plano | | 400.000 | | | | |
| 1 | Lens 1 | −0.516 | ASP | 0.122 | Plastic | 1.536 | 56.1 | 40.62 |
| 2 | | −0.545 | ASP | −0.043 | | | | |
| 3 | Ape. Stop | Plano | | 0.222 | | | | |
| 4 | Lens 2 | 37.610 | ASP | 0.326 | Plastic | 1.535 | 56.0 | 35.65 |
| 5 | | −38.608 | ASP | 0.247 | | | | |
| 6 | Lens 3 | 1.212 | ASP | 0.761 | Plastic | 1.535 | 56.0 | 0.78 |
| 7 | | −0.495 | ASP | 0.291 | | | | |
| 8 | Lens 4 | −0.265 | ASP | 0.450 | Plastic | 1.634 | 20.4 | −5.90 |
| 9 | | −0.473 | ASP | 0.332 | | | | |
| 10 | Inside conjugation surface | Plano | | — | | | | |

Reference wavelength is 940.0 nm (infrared).

TABLE 14

Aspheric Coefficients

| Surface # | 1 | 2 | 4 | 5 |
|---|---|---|---|---|
| k= | −1.3761E+00 | 1.6592E+00 | −9.9000E+01 | 9.9000E+01 |
| A4= | 6.5989E−01 | 2.7647E+00 | −1.6249E+00 | −2.6771E+00 |
| A6= | −6.4370E+00 | 6.8964E+00 | −8.8115E+00 | 3.8759E+00 |
| A8= | 1.4955E+02 | 9.6189E+01 | 1.3752E+02 | −5.7846E+01 |
| A10= | −1.0531E+03 | 4.6540E+02 | −1.4706E+03 | 4.7604E+02 |
| A12= | | | 5.0724E+03 | −2.0102E+03 |
| A14= | | | | 3.1394E+03 |

| Surface # | 6 | 7 | 8 | 9 |
|---|---|---|---|---|
| k= | −2.8533E+00 | −9.3807E−01 | −2.0089E+00 | −2.0885E+00 |
| A4= | −9.0858E−01 | 1.4421E+00 | −5.2268E−02 | 6.5638E−02 |
| A6= | −2.2636E+00 | −5.6041E+00 | −2.5868E+00 | −1.0486E+00 |
| A8= | 1.6018E+01 | 1.1300E+01 | 1.2805E+01 | 2.5689E+00 |
| A10= | −1.3028E+02 | −1.6558E+01 | −2.1913E+01 | −1.4661E+00 |
| A12= | 3.7396E+02 | 1.2510E+01 | 1.7169E+01 | −2.5967E+00 |
| A14= | −3.2618E+02 | −9.3235E−02 | −5.1966E+00 | 4.0194E+00 |
| A16= | | | | −1.5646E+00 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.24 | TL/YI | 3.38 |
| Fno | 2.80 | R7/Y41 | −0.29 |
| HFOV [deg.] | 42.8 | R8/f | −0.38 |
| (Vd2 + Vd3)/Vd4 | 5.49 | R8/Y42 | −0.48 |
| Vd4 | 20.4 | |f/f1| | 0.03 |
| CT1/CT4 | 0.27 | |f/f1| + |f/f2| | 0.07 |
| CT1/R1 | −0.24 | |f/f2| | 0.03 |
| CT1/R2 | −0.22 | |f/f3| | 1.59 |
| Dr5r8/Dr1r4 | 2.40 | |f/f4| | 0.21 |
| SL/TL | 0.97 | |f1/R1| | 78.75 |
| T34/CT4 | 0.65 | |f3/f1| + |f3/f2| + |f3/f4| | 0.17 |
| TD [mm] | 2.38 | Y42/Y11 | 3.59 |
| TD/BL | 7.17 | YI/Y42 | 0.82 |
| TD/(T23 + T34) | 4.42 | | |

8th Embodiment

Figure 15:
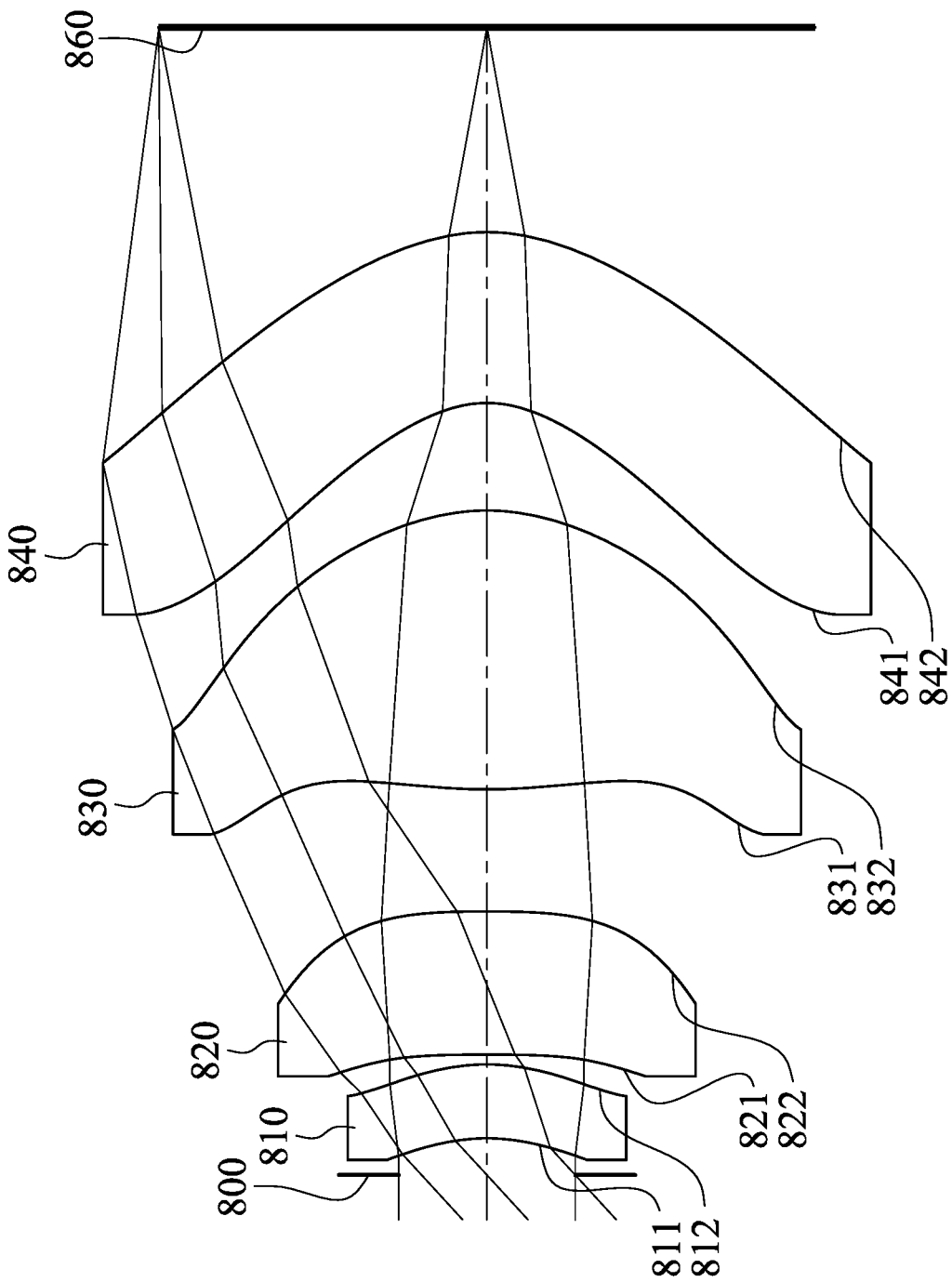
FIG. 15 is a schematic view of an electronic device according to the 8th embodiment of the present disclosure.
Figure 16:
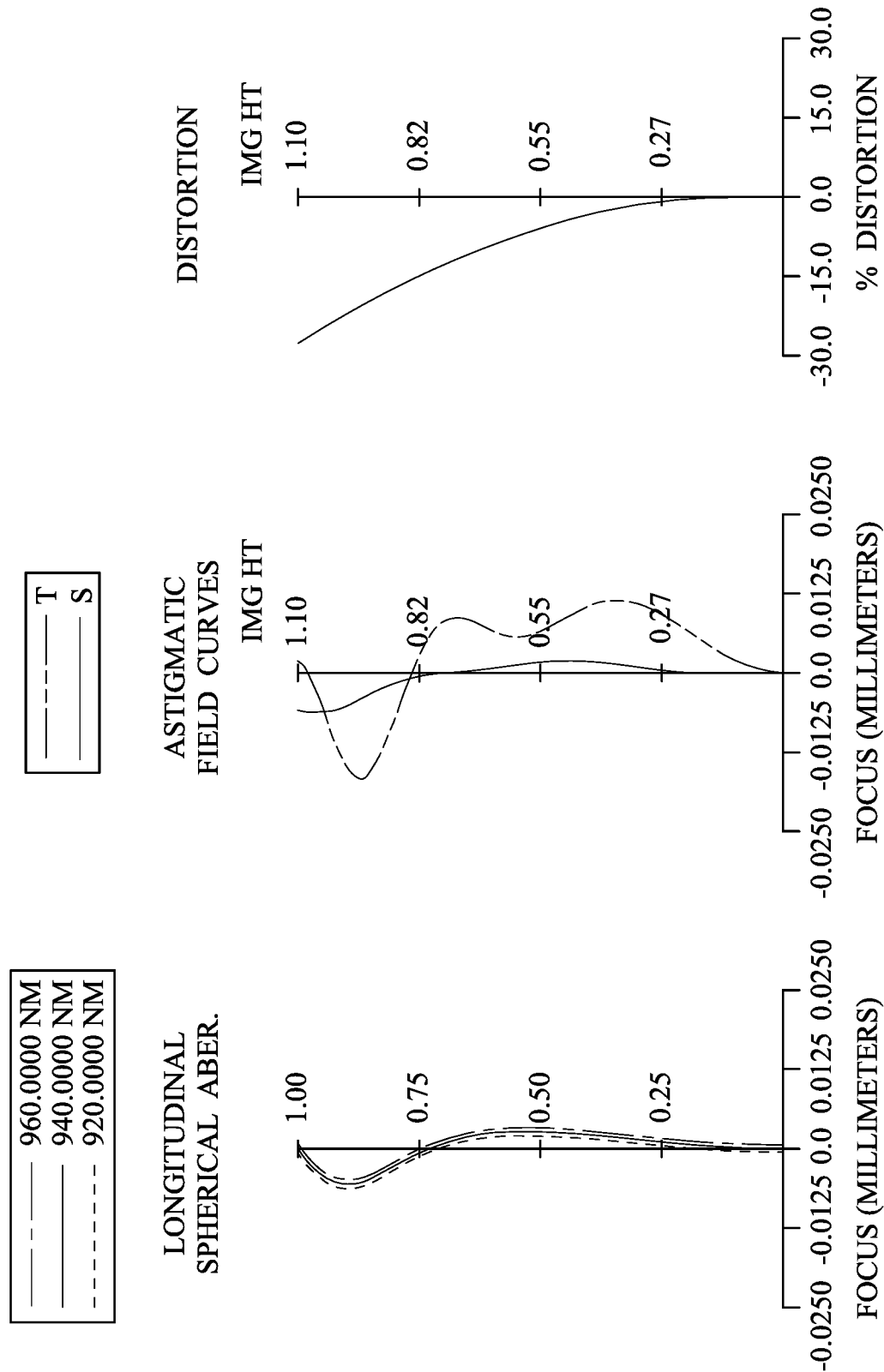
FIG. 16 shows spherical aberration curves, astigmatic field curves and a distortion curve of the electronic device according to the 8th embodiment.

FIG. 15 is a schematic view of an electronic device according to the 8th embodiment of the present disclosure. FIG. 16 shows spherical aberration curves, astigmatic field curves and a distortion curve of the electronic device according to the 8th embodiment. In FIG. 15, the electronic device includes an optical lens assembly (its reference numeral is omitted), wherein the optical lens assembly includes, in order from an outside to an inside, an aperture stop 800, a first lens element 810, a second lens element 820, a third lens element 830, a fourth lens element 840 and an inside conjugation surface 860. The optical lens assembly includes four lens elements (810, 820, 830 and 840) without additional one or more lens elements inserted between the first lens element 810 and the fourth lens element 840, and there is an air gap between optical effective regions of every adjacent lens elements of the first lens element 810 to the fourth lens element 840.

The first lens element 810 with positive refractive power has an outside surface 811 being concave in a paraxial region thereof and an inside surface 812 being convex in a paraxial region thereof. The first lens element 810 is made of a plastic material, and has the outside surface 811 and the inside surface 812 being both aspheric. Furthermore, the inside surface 812 of the first lens element 810 includes an inflection point.

The second lens element 820 with positive refractive power has an outside surface 821 being concave in a paraxial region thereof and an inside surface 822 being convex in a paraxial region thereof. The second lens element 820 is made of a plastic material, and has the outside surface 821 and the inside surface 822 being both aspheric. Furthermore, the outside surface 821 of the second lens element 820 includes an inflection point.

The third lens element 830 with positive refractive power has an outside surface 831 being convex in a paraxial region thereof and an inside surface 832 being convex in a paraxial region thereof. The third lens element 830 is made to of a plastic material, and has the outside surface 831 and the inside surface 832 being both aspheric. Furthermore, the outside surface 831 of the third lens element 830 includes two inflection points, and the inside surface 832 of the third lens element 830 includes an inflection point. Moreover, the outside surface 831 of the third lens element 830 includes at least one concave shape from the paraxial region thereof to an off-axis region thereof.

The fourth lens element 840 with negative refractive power has an outside surface 841 being concave in a paraxial region thereof and an inside surface 842 being convex in a paraxial region thereof. The fourth lens element 840 is made of a plastic material, and has the outside surface 841 and the inside surface 842 being both aspheric. Furthermore, the outside surface 841 of the fourth lens element 840 includes an inflection point, and the inside surface 842 of the fourth lens element 840 includes an inflection point.

The detailed optical data of the 8th embodiment are shown in Table 15 and the aspheric surface data are shown in Table 16 below.

TABLE 15

8th Embodiment
f = 1.66 mm, Fno = 2.80, HFOV = 42.6 deg.

| Surface # | | Curvature Radius | | Thickness | Material | Index | Abbe # | Focal Length |
|---|---|---|---|---|---|---|---|---|
| 0 | Outside conjugation surface | Plano | | 400.000 | | | | |
| 1 | Ape. Stop | Plano | | 0.123 | | | | |
| 2 | Lens 1 | −0.673 | ASP | 0.248 | Plastic | 1.536 | 56.1 | 17.33 |
| 3 | | −0.709 | ASP | 0.033 | | | | |
| 4 | Lens 2 | −9.102 | ASP | 0.480 | Plastic | 1.535 | 56.0 | 27.18 |
| 5 | | −5.701 | ASP | 0.410 | | | | |
| 6 | Lens 3 | 1.976 | ASP | 0.935 | Plastic | 1.535 | 56.0 | 1.14 |
| 7 | | −0.735 | ASP | 0.361 | | | | |
| 8 | Lens 4 | −0.386 | ASP | 0.573 | Plastic | 1.634 | 20.4 | −6.72 |
| 9 | | −0.668 | ASP | 0.687 | | | | |
| 10 | Inside conjugation surface | Plano | | — | | | | |

Reference wavelength is 940.0 nm (infrared).
Effective radius of Surface 9 is 1.287 mm.

TABLE 16

| Aspheric Coefficients | | | | |
|---|---|---|---|---|
| Surface # | 2 | 3 | 4 | 5 |
| k= | −1.5733E+00 | 4.6718E−01 | 5.1118E+01 | −3.9143E+00 |
| A4= | 8.9419E−01 | 1.1130E+00 | −1.2375E+00 | −1.5365E+00 |
| A6= | −7.6170E+00 | 8.0609E−01 | 3.8213E+00 | 2.8499E+00 |
| A8= | 9.3082E+01 | 1.4739E+01 | −2.3031E+01 | −1.1785E+01 |
| A10= | −4.0173E+02 | −1.8985E+01 | 8.3471E+01 | 3.5627E+01 |
| A12= | | | −9.2333E+01 | −6.3672E+01 |
| A14= | | | | 4.7213E+01 |
| Surface # | 6 | 7 | 8 | 9 |
| k= | −1.1099E+01 | −8.5594E−01 | −2.0641E+00 | −2.2303E+00 |
| A4= | −4.2057E−01 | 4.4052E−01 | −2.1988E−02 | 9.2279E−02 |
| A6= | 1.4388E−01 | −9.7826E−01 | −5.6397E−01 | −4.1230E−01 |
| A8= | −1.6438E+00 | 8.4167E−01 | 1.4949E+00 | 6.0090E−01 |
| A10= | 1.6975E+00 | −1.9725E−01 | −1.3949E+00 | −4.4888E−01 |
| A12= | 9.1417E−01 | −2.9976E−01 | 6.0703E−01 | 1.7762E−01 |
| A14= | −1.0267E+00 | 2.3869E−01 | −1.0351E−01 | −3.2011E−02 |
| A16= | | | | 1.4948E−03 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.66 | TL/YI | 3.39 |
| Fno | 2.80 | R7/Y41 | −0.33 |
| HFOV [deg.] | 42.6 | R8/f | −0.40 |
| (Vd2 + Vd3)/Vd4 | 5.49 | R8/Y42 | −0.52 |
| Vd4 | 20.4 | $|f/f1|$ | 0.10 |
| CT1/CT4 | 0.43 | $|f/f1| + |f/f2|$ | 0.16 |
| CT1/R1 | −0.37 | $|f/f2|$ | 0.06 |
| CT1/R2 | −0.35 | $|f/f3|$ | 1.46 |
| Dr5r8/Dr1r4 | 2.46 | $|f/f4|$ | 0.25 |
| SL/TL | 1.03 | $|f1/R1|$ | 25.73 |
| T34/CT4 | 0.63 | $|f3/f1| + |f3/f2| + |f3/f4|$ | 0.28 |
| TD [mm] | 3.04 | Y42/Y11 | 3.84 |
| TD/BL | 4.42 | YI/Y42 | 0.85 |
| TD/(T23 + T34) | 3.94 | | |

9th Embodiment

Figure 17:
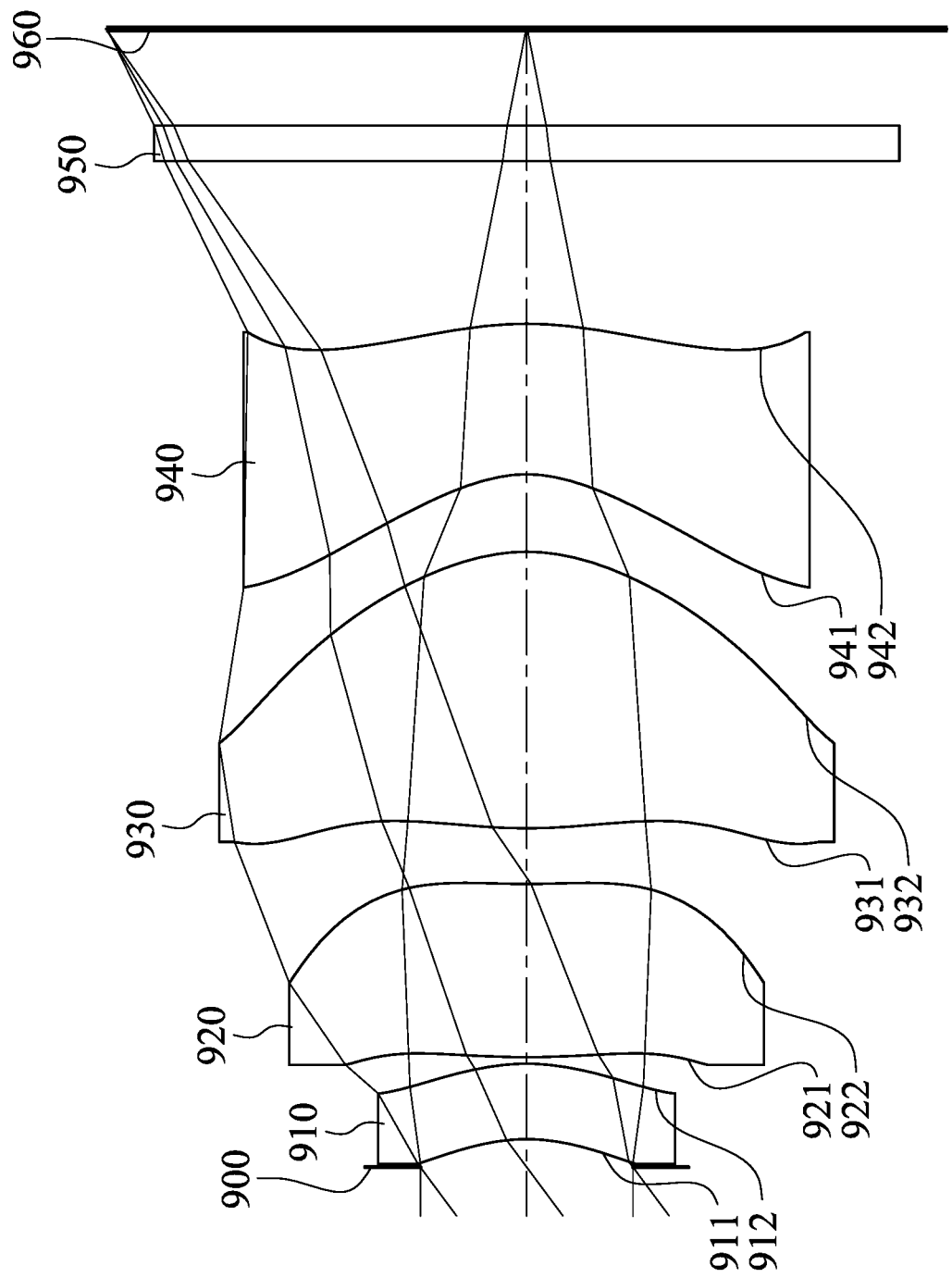
FIG. 17 is a schematic view of an electronic device according to the 9th embodiment of the present disclosure.
Figure 18:
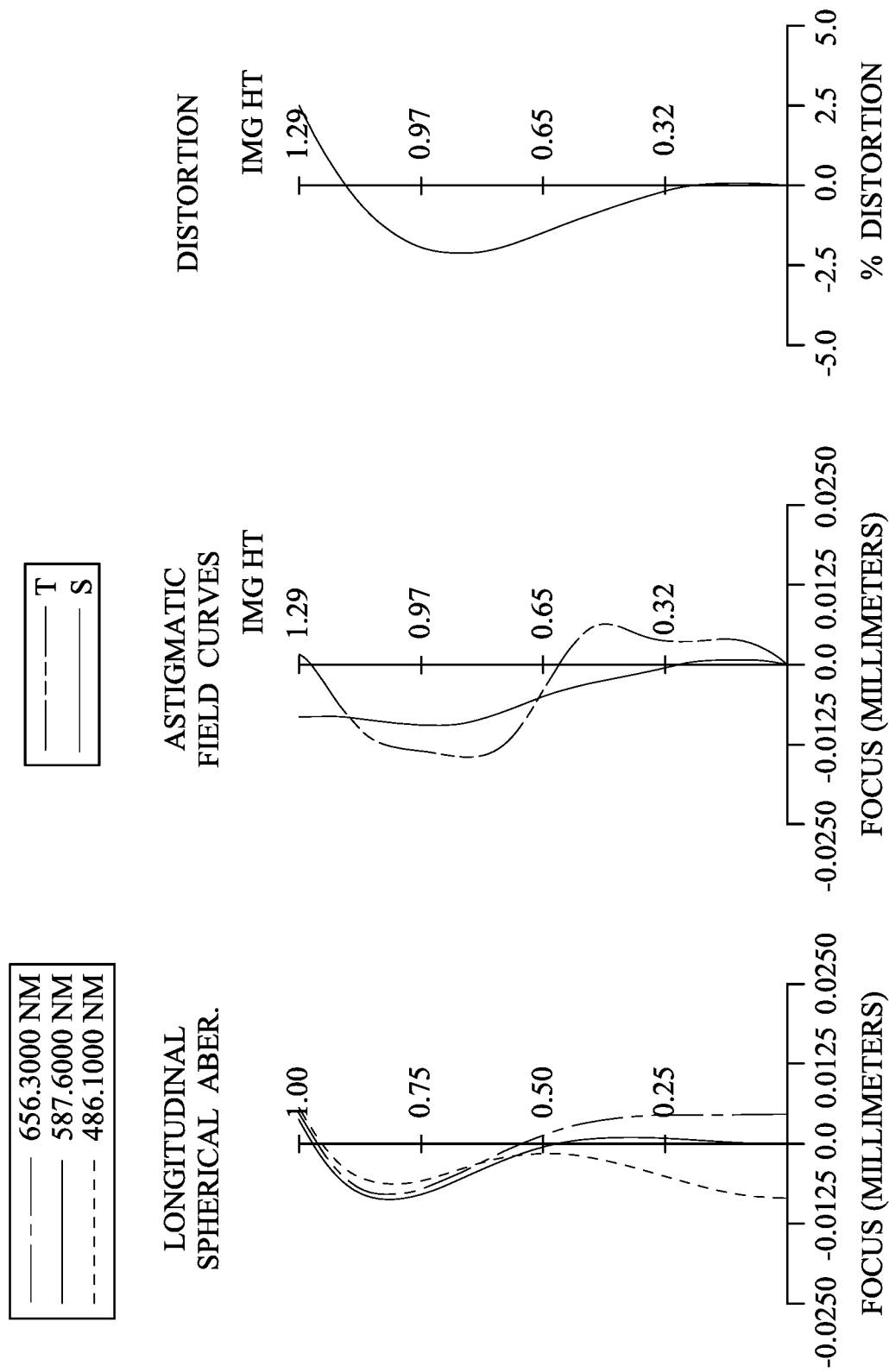
FIG. 18 shows spherical aberration curves, astigmatic field curves and a distortion curve of the electronic device according to the 9th embodiment.

FIG. 17 is a schematic view of an electronic device according to the 9th embodiment of the present disclosure. FIG. 18 shows spherical aberration curves, astigmatic field curves and a distortion curve of the electronic device according to the 9th embodiment. In FIG. 17, the electronic device includes an optical lens assembly (its reference numeral is omitted), wherein the optical lens assembly includes, in order from an outside to an inside, an aperture stop 900, a first lens element 910, a second lens element 920, a third lens element 930, a fourth lens element 940, a filter 950 and an inside conjugation surface 960. The optical lens assembly includes four lens elements (910, 920, 930 and 940) without additional one or more lens elements inserted between the first lens element 910 and the fourth lens element 940, and there is an air gap between optical effective regions of every adjacent lens elements of the first lens element 910 to the fourth lens element 940.

The first lens element 910 with negative refractive power has an outside surface 911 being concave in a paraxial region thereof and an inside surface 912 being convex in a paraxial region thereof. The first lens element 910 is made of a plastic material, and has the outside surface 911 and the inside surface 912 being both aspheric. Furthermore, the outside surface 911 of the first lens element 910 includes an inflection point, and the inside surface 912 of the first lens element 910 includes an inflection point.

The second lens element 920 with positive refractive power has an outside surface 921 being convex in a paraxial region thereof and an inside surface 922 being concave in a paraxial region thereof. The second lens element 920 is made of a plastic material, and has the outside surface 921 and the inside surface 922 being both aspheric. Furthermore, the outside surface 921 of the second lens element 920 includes two inflection points, and the inside surface 922 of the second lens element 920 includes an inflection point.

The third lens element 930 with positive refractive power has an outside surface 931 being convex in a paraxial region thereof and an inside surface 932 being convex in a paraxial region thereof. The third lens element 930 is made of a plastic material, and has the outside surface 931 and the inside surface 932 being both aspheric. Furthermore, the outside surface 931 of the third lens element 930 includes two inflection points, and the inside surface 932 of the third lens element 930 includes an inflection point. Moreover, the outside surface 931 of the third lens element 930 includes at least one concave shape from the paraxial region thereof to an off-axis region thereof.

The fourth lens element 940 with negative refractive power has an outside surface 941 being concave in a paraxial region thereof and an inside surface 942 being convex in a paraxial region thereof. The fourth lens element 940 is made of a plastic material, and has the outside surface 941 and the inside surface 942 being both aspheric. Furthermore, the outside surface 941 of the fourth lens element 940 includes an inflection point, and the inside surface 942 of the fourth lens element 940 includes an inflection point.

The filter 950 is made of a glass material and located between the fourth lens element 940 and the inside conjugation surface 960, and will not affect the focal length of the optical lens assembly.

The detailed optical data of the 9th embodiment are shown in Table 17 and the aspheric surface data are shown in Table 18 below.

TABLE 17

9th Embodiment
f = 1.70 mm, Fno = 2.60, HFOV = 36.6 deg.

| Surface # | | Curvature Radius | | Thickness | Material | Index | Abbe # | Focal Length |
|---|---|---|---|---|---|---|---|---|
| 0 | Outside conjugation surface | Plano | | infinity | | | | |
| 1 | Ape. Stop | Plano | | 0.086 | | | | |
| 2 | Lens 1 | -0.567 | ASP | 0.232 | Plastic | 1.669 | 19.5 | -32.19 |
| 3 | | -0.678 | ASP | 0.020 | | | | |
| 4 | Lens 2 | 2.504 | ASP | 0.533 | Plastic | 1.544 | 56.0 | 22.54 |
| 5 | | 2.911 | ASP | 0.171 | | | | |
| 6 | Lens 3 | 1.635 | ASP | 0.850 | Plastic | 1.544 | 56.0 | 0.92 |
| 7 | | -0.589 | ASP | 0.238 | | | | |
| 8 | Lens 4 | -0.438 | ASP | 0.463 | Plastic | 1.669 | 19.5 | -1.47 |
| 9 | | -1.123 | ASP | 0.500 | | | | |
| 10 | Filter | Plano | | 0.110 | Glass | 1.510 | 64.2 | — |
| 11 | | Plano | | 0.297 | | | | |
| 12 | Inside conjugation surface | Plano | | — | | | | |

Reference wavelength is 587.6 nm (d-line, visible light).

TABLE 18

Aspheric Coefficients

| Surface # | 2 | 3 | 4 | 5 |
|---|---|---|---|---|
| k= | -2.1349E+00 | 4.7595E-01 | -3.4466E+00 | -2.9151E+01 |
| A4= | 1.4521E+00 | 2.1900E+00 | -7.4696E-01 | -2.5782E+00 |
| A6= | -3.3236E+00 | -1.7778E-01 | -7.3955E-01 | 7.3283E+00 |
| A8= | 4.9817E+00 | -6.7776E+00 | 1.2963E+00 | -2.4390E+01 |
| A10= | 6.2797E+00 | 5.7411E+01 | -1.9886E+01 | 5.6723E+01 |
| A12= | | | 6.2348E+01 | -7.7040E+01 |
| A14= | | | | 4.4431E+01 |

| Surface # | 6 | 7 | 8 | 9 |
|---|---|---|---|---|
| k= | -4.5735E+00 | -1.0759E+00 | -2.6944E+00 | -1.4682E+01 |
| A4= | -1.1460E+00 | 9.3847E-01 | 6.5084E-01 | -1.5991E-01 |
| A6= | 1.7896E+00 | -2.7674E+00 | -2.9001E+00 | 2.8759E+00 |
| A8= | -4.2283E+00 | 4.6444E+00 | 6.9259E+00 | -1.2415E+01 |
| A10= | 8.4164E+00 | -5.0031E+00 | -8.1235E+00 | 3.1694E+01 |
| A12= | -7.3912E+00 | 3.0871E+00 | 4.9178E+00 | -4.6794E+01 |
| A14= | 2.3153E+00 | -7.0620E-01 | -1.2991E+00 | 3.7969E+01 |
| A16= | | | | -1.3089E+01 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.70 | TL/YI | 2.64 |
| Fno | 2.60 | R7/Y41 | -0.50 |
| HFOV [deg.] | 36.6 | R8/f | -0.66 |
| (Vd2 + Vd3)/Vd4 | 5.76 | R8/Y42 | -1.31 |
| Vd4 | 19.5 | |f/f1| | 0.05 |
| CT1/CT4 | 0.50 | |f/f1| + |f/f2| | 0.13 |
| CT1/R1 | -0.41 | |f/f2| | 0.08 |
| CT1/R2 | -0.34 | |f/f3| | 1.85 |
| Dr5r8/Dr1r4 | 1.98 | |f/f4| | 1.16 |
| SL/TL | 1.03 | |f1/R1| | 56.72 |
| T34/CT4 | 0.51 | |f3/f1| + |f3/f2| + |f3/f4| | 0.69 |
| TD [mm] | 2.51 | Y42/Y11 | 2.57 |
| TD/BL | 2.77 | YI/Y42 | 1.51 |
| TD/(T23 + T34) | 6.13 | | |

10th Embodiment

Figure 19:
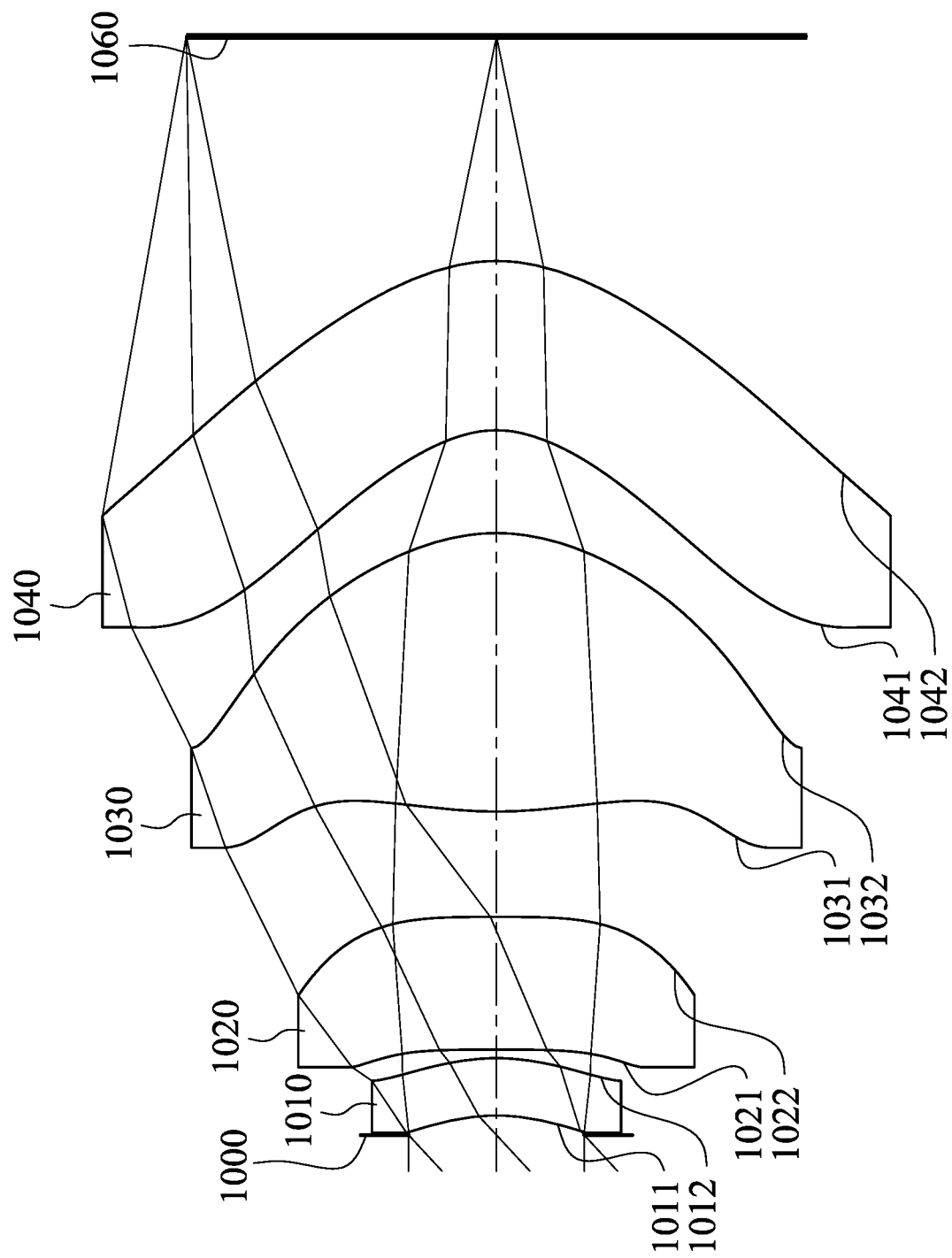
FIG. 19 is a schematic view of an electronic device according to the 10th embodiment of the present disclosure.
Figure 20:
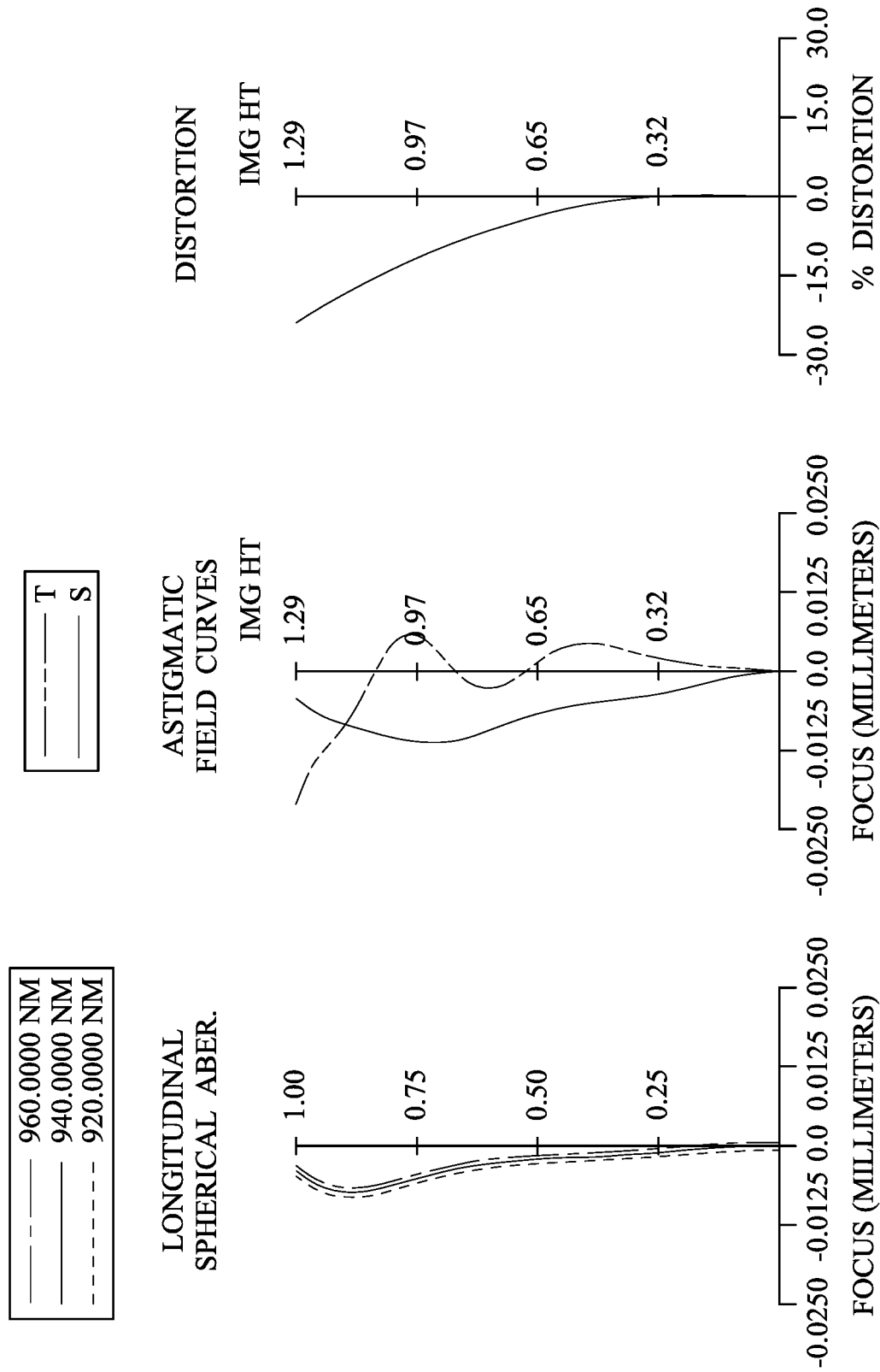
FIG. 20 shows spherical aberration curves, astigmatic field curves and a distortion curve of the electronic device according to the 10th embodiment.

FIG. 19 is a schematic view of an electronic device according to the 10th embodiment of the present disclosure. FIG. 20 shows spherical aberration curves, astigmatic field curves and a distortion curve of the electronic device according to the 10th embodiment. In FIG. 19, the electronic device includes an optical lens assembly (its reference numeral is omitted), wherein the optical lens assembly includes, in order from an outside to an inside, an aperture stop 1000, a first lens element 1010, a second lens element 1020, a third lens element 1030, a fourth lens element 1040 and an inside conjugation surface 1060. The optical lens assembly includes four lens elements (1010, 1020, 1030 and 1040) without additional one or more lens elements inserted between the first lens element 1010 and the fourth lens element 1040, and there is an air gap between optical effective regions of every adjacent lens elements of the first lens element 1010 to the fourth lens element 1040.

The first lens element 1010 with negative refractive power has an outside surface 1011 being concave in a paraxial region thereof and an inside surface 1012 being convex in a paraxial region thereof. The first lens element 1010 is made of a plastic material, and has the outside surface 1011 and the inside surface 1012 being both aspheric. Furthermore, the inside surface 1012 of the first lens element 1010 includes an inflection point.

The second lens element 1020 with negative refractive power has an outside surface 1021 being concave in a paraxial region thereof and an inside surface 1022 being convex in a paraxial region thereof. The second lens element 1020 is made of a plastic material, and has the outside surface 1021 and the inside surface 1022 being both aspheric. Furthermore, the outside surface 1021 of the second lens element 1020 includes an inflection point.

The third lens element 1030 with positive refractive power has an outside surface 1031 being convex in a paraxial region thereof and an inside surface 1032 being convex in a paraxial region thereof. The third lens element 1030 is made of a plastic material, and has the outside surface 1031 and the inside surface 1032 being both aspheric. Furthermore, the outside surface 1031 of the third lens element 1030 includes two inflection points, and the inside surface 1032 of the third lens element 1030 includes an inflection point. Moreover, the outside surface 1031 of the third lens element 1030 includes at least one concave shape from the paraxial region thereof to an off-axis region thereof.

The fourth lens element 1040 with negative refractive power has an outside surface 1041 being concave in a paraxial region thereof and an inside surface 1042 being convex in a paraxial region thereof. The fourth lens element 1040 is made of a plastic material, and has the outside surface 1041 and the inside surface 1042 being both aspheric. Furthermore, the outside surface 1041 of the fourth lens element 1040 includes two inflection points, and the inside surface 1042 of the fourth lens element 1040 includes two inflection points.

The detailed optical data of the 10th embodiment are shown in Table 19 and the aspheric surface data are shown in Table 20 below.

TABLE 19

10th Embodiment
f = 1.83 mm, Fno = 2.50, HFOV = 42.9 deg.

| Surface # | | Curvature Radius | | Thickness | Material | Index | Abbe # | Focal Length |
|---|---|---|---|---|---|---|---|---|
| 0 | Outside conjugation surface | Plano | | 400.00 | | | | |
| 1 | Ape. Stop | Plano | | 0.082 | | | | |
| 2 | Lens 1 | −0.796 | ASP | 0.239 | Plastic | 1.536 | 56.1 | −58.40 |
| 3 | | −0.902 | ASP | 0.036 | | | | |
| 4 | Lens 2 | −21.848 | ASP | 0.553 | Plastic | 1.535 | 56.0 | −59.45 |
| 5 | | −70.337 | ASP | 0.440 | | | | |
| 6 | Lens 3 | 1.990 | ASP | 1.161 | Plastic | 1.535 | 56.0 | 1.27 |
| 7 | | −0.824 | ASP | 0.429 | | | | |
| 8 | Lens 4 | −0.466 | ASP | 0.706 | Plastic | 1.641 | 19.5 | −73.37 |
| 9 | | −0.750 | ASP | 0.937 | | | | |
| 10 | Inside conjugation surface | Plano | | — | | | | |

Reference wavelength is 940.0 nm (infrared).

TABLE 20

Aspheric Coefficients

| Surface # | 2 | 3 | 4 | 5 |
|---|---|---|---|---|
| k= | −2.0596E+00 | 4.3075E−01 | 9.9000E+01 | 9.9000E+01 |
| A4= | 7.5305E−01 | 1.0058E+00 | −6.3512E−01 | −9.7949E−01 |
| A6= | −1.5210E+00 | 1.9270E−01 | 6.4212E−01 | 1.4516E+00 |
| A8= | 3.0399E+00 | −5.7916E+00 | −4.1628E+00 | −4.0285E+00 |
| A10= | −8.6984E−01 | 2.2768E+01 | 4.8426E+00 | 7.9359E+00 |
| A12= | | | 1.3024E+01 | −9.5981E+00 |
| A14= | | | | 4.9403E+00 |

| Surface # | 6 | 7 | 8 | 9 |
|---|---|---|---|---|
| k= | −2.8915E+00 | −9.0835E−01 | −2.1659E+00 | −2.1405E+00 |
| A4= | −3.1786E−01 | 3.2093E−01 | −3.2352E−02 | 2.3604E−02 |
| A6= | 2.6786E−02 | −5.4348E−01 | −1.7156E−01 | −8.0987E−02 |
| A8= | −6.7924E−02 | 4.5296E−01 | 3.5531E−01 | 6.3378E−02 |
| A10= | −4.7259E−01 | −2.1780E−01 | −2.3322E−01 | −1.3510E−02 |
| A12= | 7.8124E−01 | 2.6593E−02 | 7.0004E−02 | −7.2503E−03 |
| A14= | −2.8424E−01 | 1.5174E−02 | −8.2173E−03 | 4.4047E−03 |
| A16= | | | | −6.5667E−04 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.83 | TL/YI | 3.48 |
| Fno | 2.50 | R7/Y41 | −0.31 |
| HFOV [deg.] | 42.9 | R8/f | −0.41 |
| (Vd2 + Vd3)/Vd4 | 5.76 | R8/Y42 | −0.46 |
| Vd4 | 19.5 | |f/f1| | 0.03 |
| CT1/CT4 | 0.34 | |f/f1| + |f/f2| | 0.06 |
| CT1/R1 | −0.30 | |f/f2| | 0.03 |
| CT1/R2 | −0.26 | |f/f3| | 1.44 |
| Dr5r8/Dr1r4 | 2.77 | |f/f4| | 0.02 |
| SL/TL | 1.02 | |f1/R1| | 73.39 |
| T34/CT4 | 0.61 | |f3/f1| + |f3/f2| + |f3/f4| | 0.06 |
| TD [mm] | 3.56 | Y42/Y11 | 4.38 |
| TD/BL | 3.81 | YI/Y42 | 0.79 |
| TD/(T23 + T34) | 4.10 | | |

11th Embodiment

Figure 21:
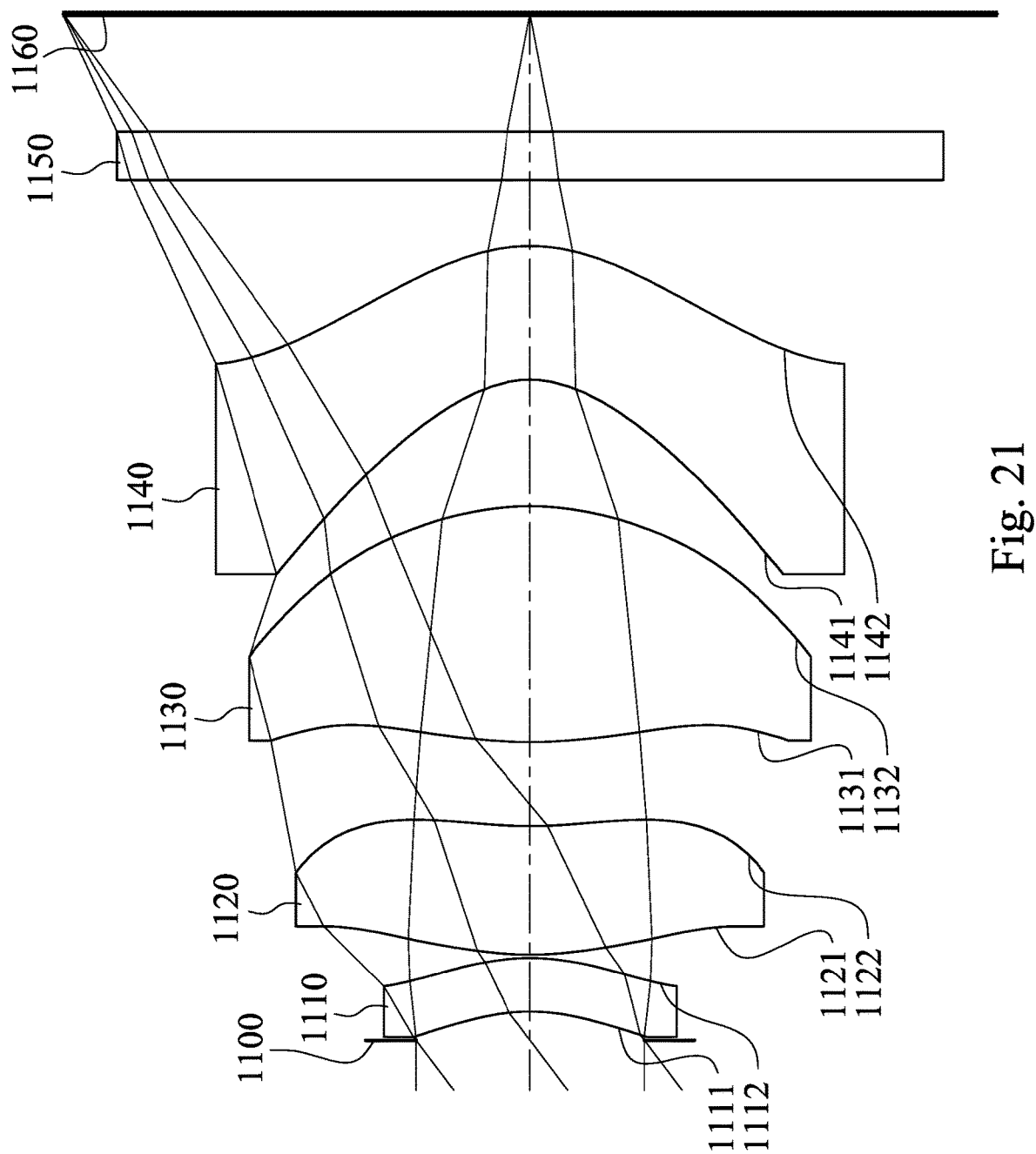
FIG. 21 is a schematic view of an electronic device according to the 11th embodiment of the present disclosure.
Figure 22:
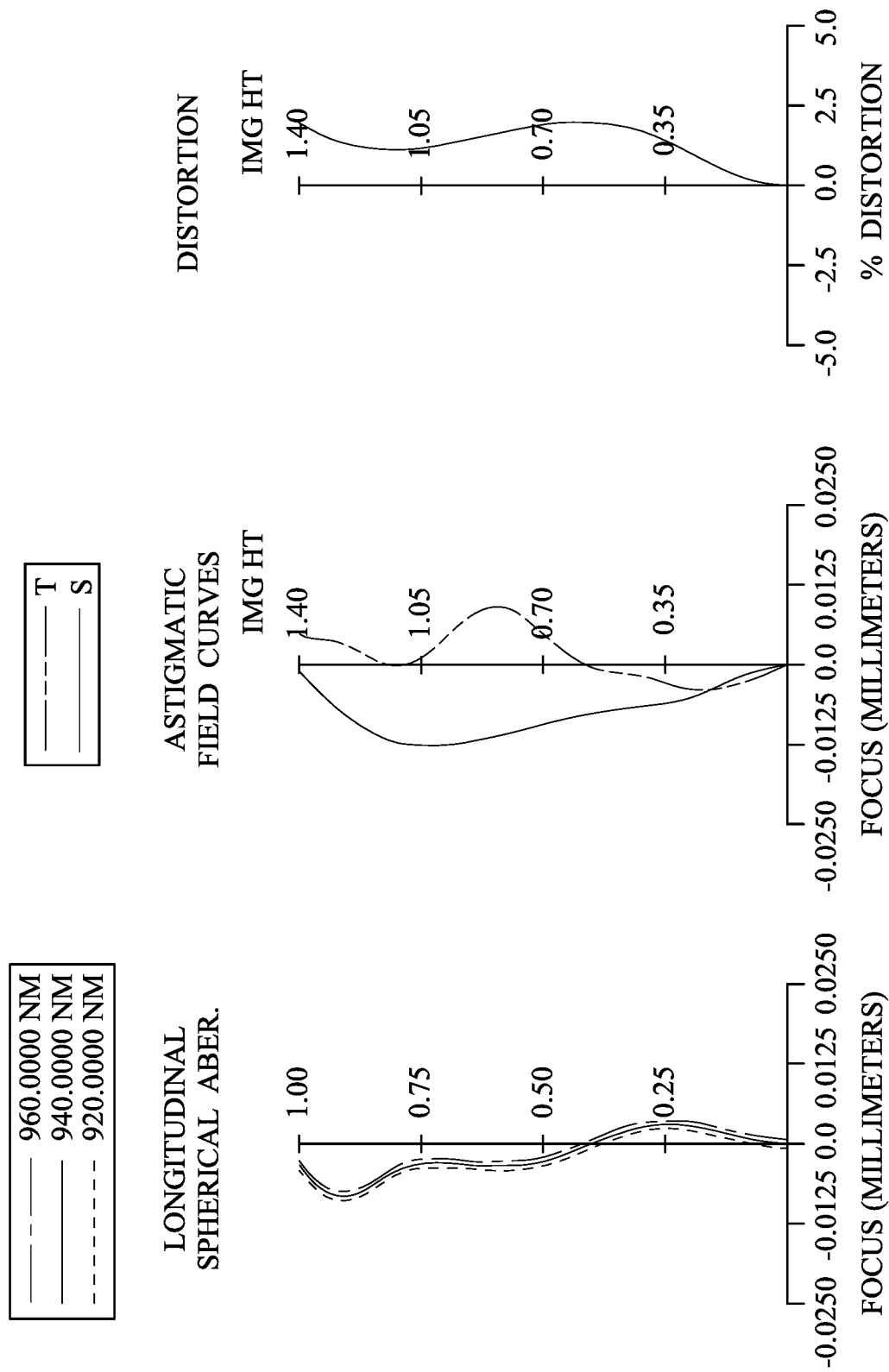
FIG. 22 shows spherical aberration curves, astigmatic field curves and a distortion curve of the electronic device according to the 11th embodiment.

FIG. 21 is a schematic view of an electronic device according to the 11th embodiment of the present disclosure. FIG. 22 shows spherical aberration curves, astigmatic field curves and a distortion curve of the electronic device according to the 11th embodiment. In FIG. 21, the electronic device includes an optical lens assembly (its reference numeral is omitted), wherein the optical lens assembly includes, in order from an outside to an inside, an aperture stop 1100, a first lens element 1110, a second lens element 1120, a third lens element 1130, a fourth lens element 1140, a filter 1150 and an inside conjugation surface 1160. The optical lens assembly includes four lens elements (1110, 1120, 1130 and 1140) without additional one or more lens elements inserted between the first lens element 1110 and the fourth lens element 1140, and there is an air gap between optical effective regions of every adjacent lens elements of the first lens element 1110 to the fourth lens element 1140.

The first lens element 1110 with negative refractive power has an outside surface 1111 being concave in a paraxial region thereof and an inside surface 1112 being convex in a paraxial region thereof. The first lens element 1110 is made of a plastic material, and has the outside surface 1111 and the inside surface 1112 being both aspheric. Furthermore, the outside surface 1111 of the first lens element 1110 includes an inflection point, and the inside surface 1112 of the first lens element 1110 includes an inflection point.

The second lens element 1120 with positive refractive power has an outside surface 1121 being convex in a paraxial region thereof and an inside surface 1122 being concave in a paraxial region thereof. The second lens element 1120 is made of a plastic material, and has the outside surface 1121 and the inside surface 1122 being both aspheric. Furthermore, the outside surface 1121 of the second lens element 1120 includes an inflection point, and the inside surface 1122 of the second lens element 1120 includes an inflection point.

The third lens element 1130 with positive refractive power has an outside surface 1131 being convex in a paraxial region thereof and an inside surface 1132 being convex in a paraxial region thereof. The third lens element 1130 is made of a plastic material, and has the outside surface 1131 and the inside surface 1132 being both aspheric. Furthermore, the outside surface 1131 of the third lens element 1130 includes an inflection point. Moreover, the outside surface 1131 of the third lens element 1130 includes at least one concave shape from the paraxial region thereof to an off-axis region thereof.

The fourth lens element 1140 with negative refractive power has an outside surface 1141 being concave in a paraxial region thereof and an inside surface 1142 being convex in a paraxial region thereof. The fourth lens element 1140 is made of a plastic material, and has the outside surface 1141 and the inside surface 1142 being both aspheric. Furthermore, the inside surface 1142 of the fourth lens element 1140 includes an inflection point.

The filter 1150 is made of a glass material and located between the fourth lens element 1140 and the inside conjugation surface 1160, and will not affect the focal length of the optical lens assembly.

The detailed optical data of the 11th embodiment are shown in Table 21 and the aspheric surface data are shown in Table 22 below.

TABLE 21

11th Embodiment
f = 1.81 mm, Fno = 2.65, HFOV = 37.1 deg.

| Surface # | | Curvature Radius | | Thickness | Material | Index | Abbe # | Focal Length |
|---|---|---|---|---|---|---|---|---|
| 0 | Outside conjugation surface | Plano | | 400.00 | | | | |
| 1 | Ape. Stop | Plano | | 0.086 | | | | |
| 2 | Lens 1 | −0.594 | ASP | 0.162 | Plastic | 1.536 | 56.1 | −25.93 |
| 3 | | −0.679 | ASP | 0.010 | | | | |
| 4 | Lens 2 | 1.068 | ASP | 0.386 | Plastic | 1.535 | 56.0 | 6.02 |
| 5 | | 1.395 | ASP | 0.252 | | | | |
| 6 | Lens 3 | 1.515 | ASP | 0.709 | Plastic | 1.507 | 56.4 | 1.21 |
| 7 | | −0.865 | ASP | 0.381 | | | | |
| 8 | Lens 4 | −0.335 | ASP | 0.401 | Plastic | 1.641 | 19.5 | −5.53 |
| 9 | | −0.543 | ASP | 0.200 | | | | |
| 10 | Filter | Plano | | 0.145 | Glass | 1.508 | 64.2 | — |
| 11 | | Plano | | 0.353 | | | | |
| 12 | Inside conjugation surface | Plano | | — | | | | |

Reference wavelength is 940.0 nm (infrared).

TABLE 22

| Aspheric Coefficients | | | | |
|---|---|---|---|---|
| Surface # | 2 | 3 | 4 | 5 |
| k= | −2.1775E+00 | 2.4745E−01 | −2.1885E+01 | −2.8059E+01 |
| A4= | 1.8666E+00 | 1.9132E+00 | 5.1965E−01 | −1.0459E+00 |
| A6= | −1.0941E+01 | 2.5737E+00 | −3.4174E+00 | 1.2095E+00 |
| A8= | 6.5651E+01 | −1.4153E+01 | 1.2647E+01 | −4.1050E+00 |
| A10= | −1.6890E+02 | 4.6668E+01 | −3.1192E+01 | 7.7627E+00 |
| A12= | | | 2.9290E+01 | −7.8168E+00 |
| A14= | | | | 7.5984E−01 |
| Surface # | 6 | 7 | 8 | 9 |
| k= | −6.5887E−01 | −6.9600E−01 | −1.6472E+00 | −1.3038E+00 |
| A4= | −4.9772E−01 | 3.4437E−01 | −2.6430E−01 | 5.4982E−01 |
| A6= | −3.7584E−02 | −4.6030E−01 | 4.2745E+00 | 8.7275E−01 |
| A8= | 1.1644E+00 | −1.4706E+00 | −2.5923E+01 | −4.6129E+00 |
| A10= | −1.2425E+01 | 1.8243E+00 | 6.8189E+01 | 8.2569E+00 |
| A12= | 2.9713E+01 | 2.3583E+00 | −8.3066E+01 | −7.0119E+00 |
| A14= | −2.0779E+01 | −2.9939E+00 | 3.8507E+01 | 2.5548E+00 |
| A16= | | | | −2.0006E−01 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 1.81 | TL/YI | 2.14 |
| Fno | 2.65 | R7/Y41 | −0.44 |
| HFOV [deg.] | 37.1 | R8/f | −0.30 |
| (Vd2 + Vd3)/Vd4 | 5.78 | R8/Y42 | −0.58 |
| Vd4 | 19.5 | |f1/f1| | 0.07 |
| CT1/CT4 | 0.40 | |f/f1| + |f/f2| | 0.37 |
| CT1/R1 | −0.27 | |f/f2| | 0.30 |
| CT1/R2 | −0.24 | |f/f3| | 1.50 |
| Dr5r8/Dr1r4 | 2.67 | |f/f4| | 0.33 |
| SL/TL | 1.03 | |f1/R1| | 43.68 |
| T34/CT4 | 0.95 | |f3/f1| + |f3/f2| + |f3/f4| | 0.47 |
| TD [mm] | 2.30 | Y42/Y11 | 2.69 |
| TD/BL | 3.30 | YI/Y42 | 1.48 |
| TD/(T23 + T34) | 3.64 | | |

12th Embodiment

Figure 24A:
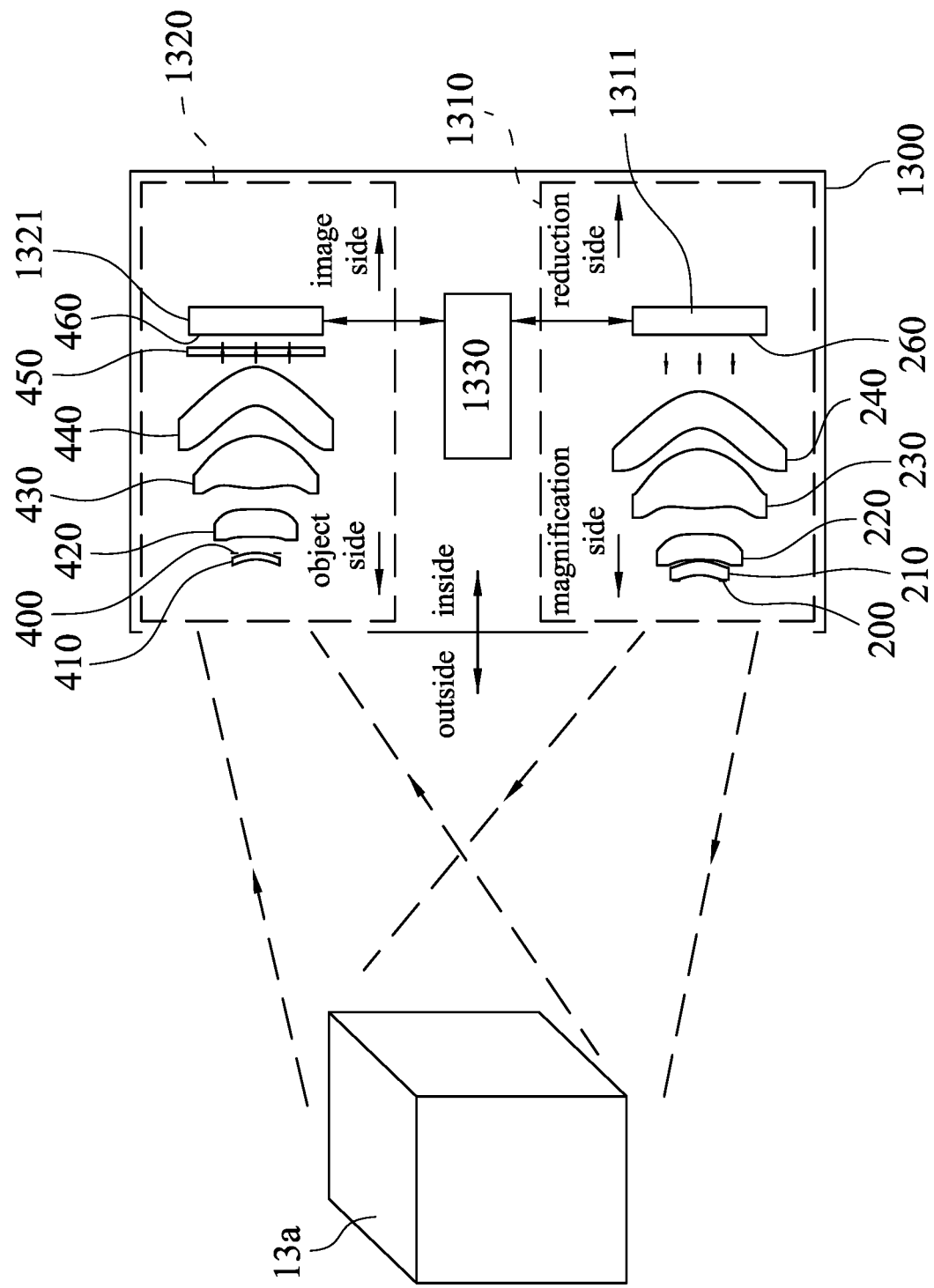
FIG. 24A is a schematic view of a sensing module of an electronic device according to the 12th embodiment of the present disclosure.
Figure 24C:
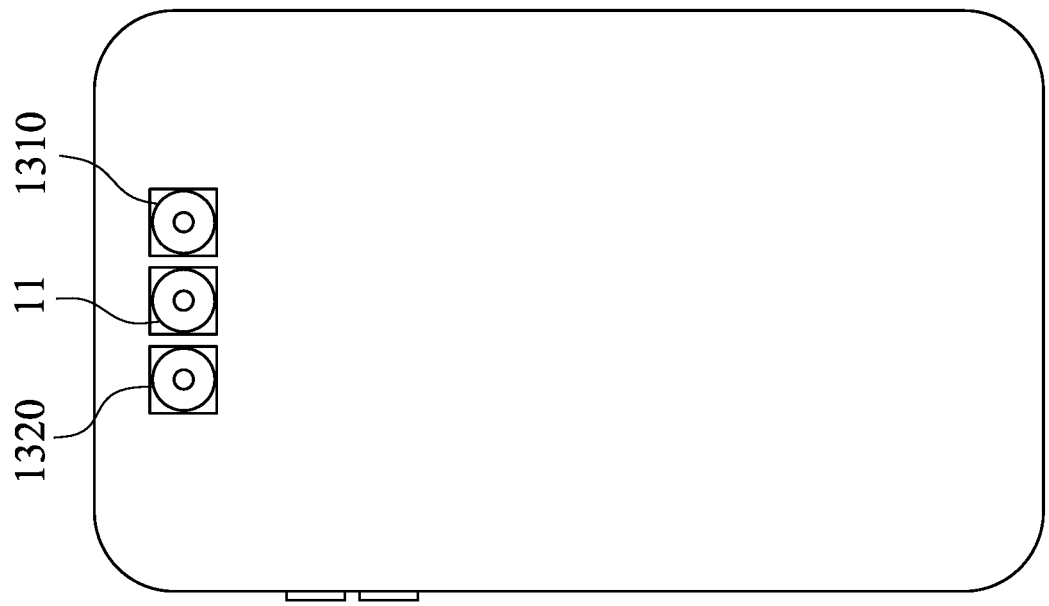
FIG. 24C is a schematic view of an appearance of the other side of the electronic device according to the 12th embodiment of the present disclosure.
Figure 24B:
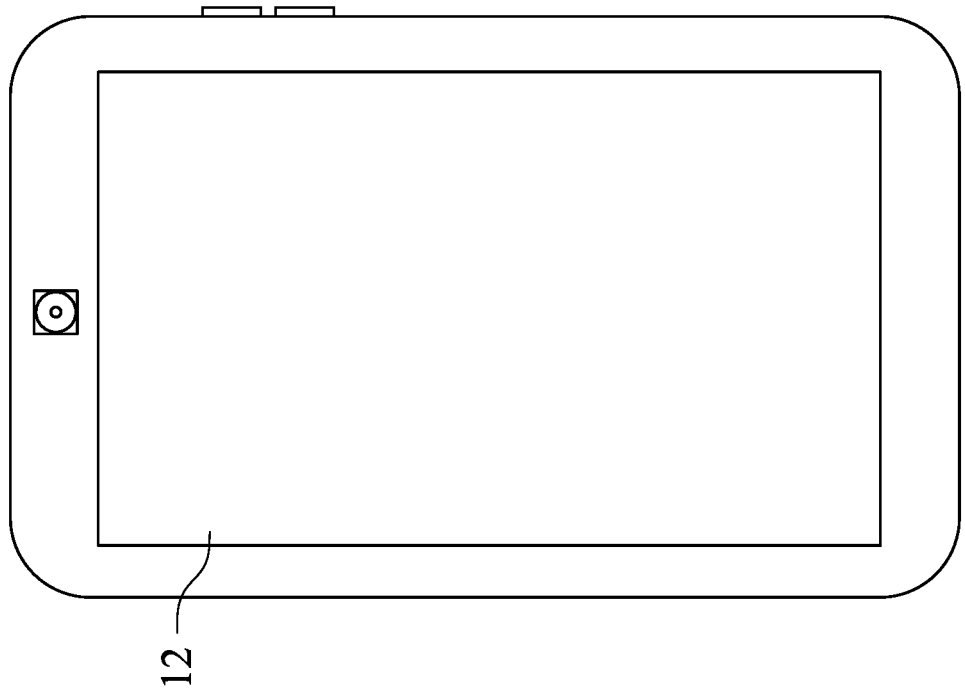
FIG. 24B is a schematic view of an appearance of one side of the electronic device according to the 12th embodiment of the present disclosure.

FIG. 24A is a schematic view of a sensing module 1300 of an electronic device 10 according to the 12th embodiment of the present disclosure. FIG. 24B is a schematic view of an appearance of one side of the electronic device 10 according to the 12th embodiment of the present disclosure. FIG. 24C is a schematic view of an appearance of the other side of the electronic device 10 according to the 12th embodiment of the present disclosure. In FIGS. 24A, 24B and 24C, the electronic device 10 according to the 12th embodiment is a tablet, which includes the sensing module 1300, an image capturing apparatus 11 and a display apparatus 12.

The sensing module 1300 includes a projection apparatus 1310, a receiving apparatus 1320 and a processor 1330, wherein the projection apparatus 1310 and the receiving apparatus 1320 are connected to the processor 1330. The projection apparatus 1310 includes a projecting lens system (its reference numeral is omitted) and at least one light source 1311. The projecting lens system is the optical lens assembly according to the aforementioned 2nd embodiment, wherein the optical lens assembly includes, in order from an outside to an inside (that is, from a magnification side to a reduction side of the projection apparatus 1310), the aperture stop 200, the first lens element 210, the second lens element 220, the third lens element 230, the fourth lens element 240 and the inside conjugation surface 260, and the light source 1311 can be composed by a laser array, and can be a VCSEL, which is disposed on the inside conjugation surface 260 of the optical lens assembly. The receiving apparatus 1320 includes an imaging lens system (its reference numeral is omitted) and an image sensor 1321. The imaging lens system is the optical lens assembly according to the aforementioned 4th embodiment, wherein the optical lens assembly includes, in order from an outside to an inside (that is, from an object side to an image side of the receiving apparatus 1320), the first lens element 410, the aperture stop 400, the second lens element 420, the third lens element 430, the fourth lens element 440, the filter 450 and the inside conjugation surface 460, and the image sensor 1321 is disposed on the inside conjugation surface 460 of the optical lens assembly.

The light of the light source 1311 of the projection apparatus 1310 passes through the optical lens assembly thereof so as to form into a structured light and project on a sensed object 13a. The receiving apparatus 1320 to receives the reflective light from the sensed object 13a, images on the image sensor 1321, and the received information can be calculated by the processor 1330 so as to obtain the relative distance of each portion of the sensed object 13a, further obtain the 3D-shaped variation on the surface of the sensed object 13a.

In the 12th embodiment, the projection apparatus 1310 and the receiving apparatus 1320 (including the optical lens assemblies, the light source 1311 and the image sensor 1321) can be applied to the infrared band (750 nm-1500 nm) so as to decrease the interference from the visible light and enhance the sensing precision.

The image capturing apparatus 11 includes an image capturing lens assembly (not shown) and an image sensor (not shown), wherein the image sensor disposed on an inside conjugation surface (not shown) of the image capturing lens assembly. The image capturing lens assembly is the optical lens assembly according to the aforementioned 9th embodiment. The image capturing apparatus 11 can be utilized to photographing, and can be matched to the sensing module 1300, wherein the obtained information of the receiving apparatus 1320 and the image capturing apparatus 11 can be shown on the display apparatus 12 after processing.

The sensed object 13a can include the surrounding, the sensing module 1300 can be matched with the image capturing apparatus 11 and the display apparatus 12 so as to apply but not limited to the augmented reality function, so that users can interact with the surrounding.

Furthermore, in the 12th embodiment, the projection apparatus 1310 includes the optical lens assembly according to the aforementioned 2nd embodiment, the receiving apparatus 1320 includes the optical lens assembly according to the aforementioned 4th embodiment, and the image capturing apparatus 11 includes the optical lens assembly according to the aforementioned 9th embodiment, which are only exemplary and the present disclosure will not be limited thereto. For example, the projecting lens system of the projection apparatus 1310, the imaging lens system of the receiving apparatus 1320 and the image capturing lens assembly of the image capturing apparatus 11 can be other optical lens assemblies according to the present disclosure. Alternatively, at least one of the projecting lens system of the projection apparatus 1310, the imaging lens system of the receiving apparatus 1320 and the image capturing lens assembly of the image capturing apparatus 11 can be the optical lens assembly according to the present disclosure, and the other of the projecting lens system of the projection apparatus 1310, the imaging lens system of the receiving apparatus 1320 and the image capturing lens assembly of the image capturing apparatus 11 can be different from the optical lens assembly according to the present disclosure based on practically demands.

13th Embodiment

Figure 25A:
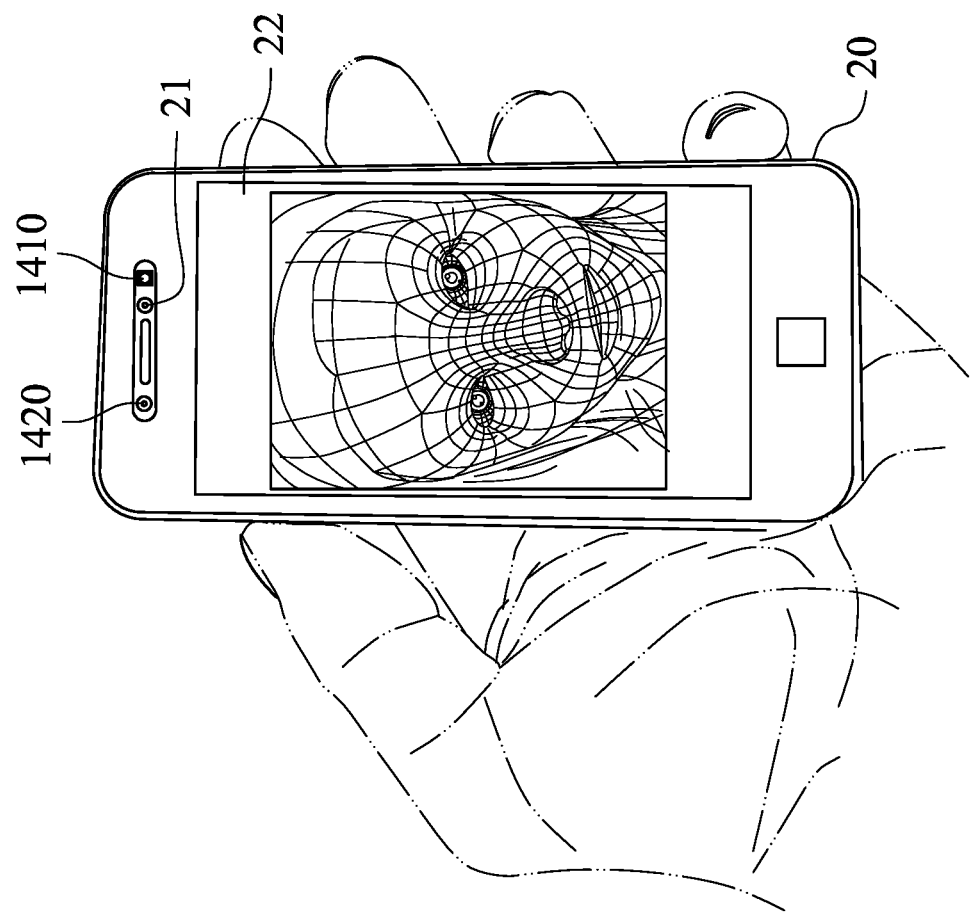
FIG. 25A is a schematic view of an appearance of the using state of an electronic device according to the 13th embodiment of the present disclosure.
Figure 25B:
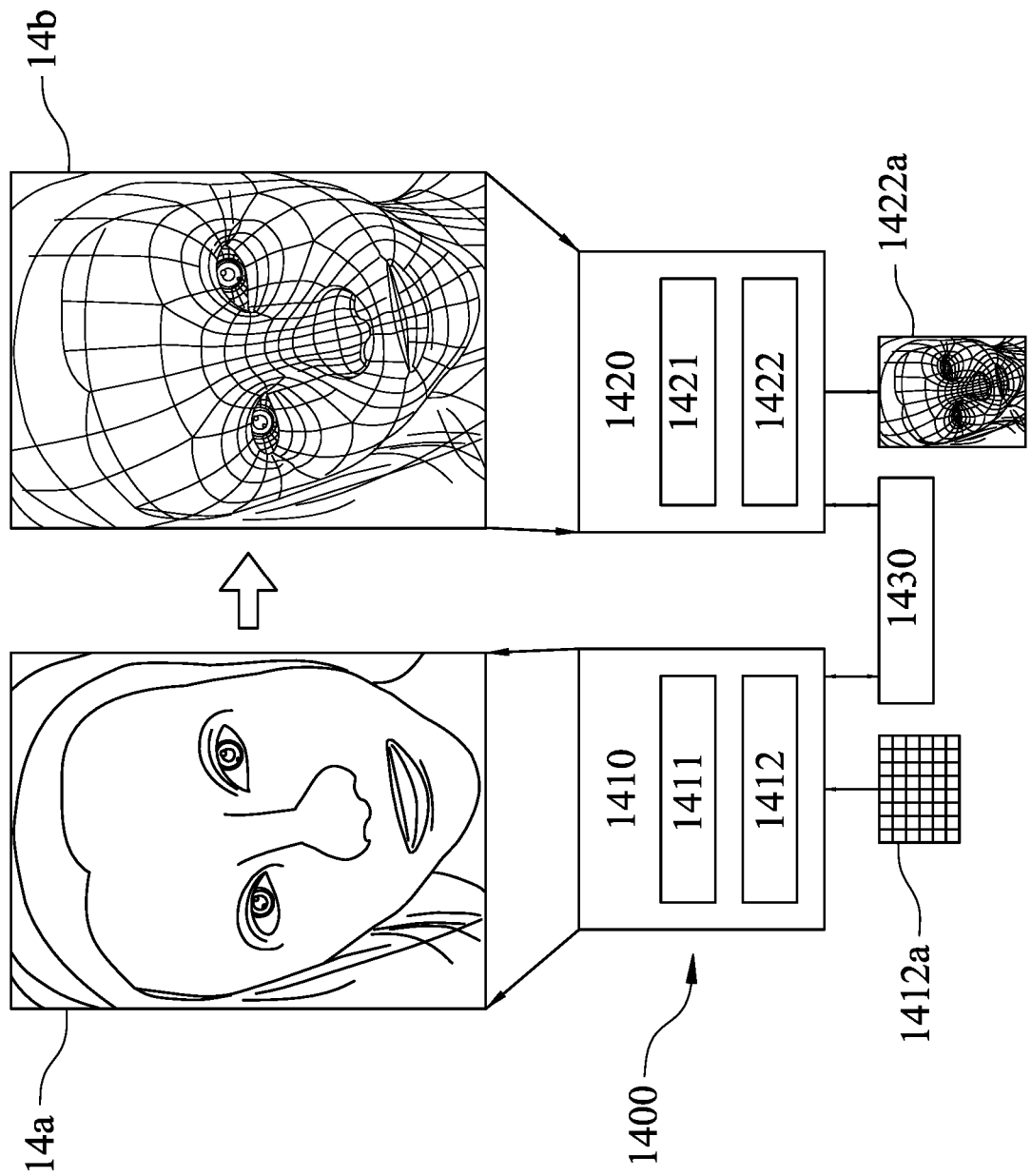
FIG. 25B is a schematic view of a sensing module of the electronic device according to the 13th embodiment of the present disclosure.

FIG. 25A is a schematic view of an appearance of the using state of an electronic device 20 according to the 13th embodiment of the present disclosure. FIG. 25B is a schematic view of a sensing module 1400 of the electronic device 20 according to the 13th embodiment of the present disclosure. According to the 13th embodiment, the electronic device 20 is a smartphone, which includes the sensing module 1400, an image capturing apparatus 21 and a display apparatus 22.

The sensing module 1400 includes a projection apparatus 1410, a receiving apparatus 1420 and a processor 1430, wherein the projection apparatus 1410 and the receiving apparatus 1420 are connected to the is processor 1430. According to the 13th embodiment, the projection apparatus 1410 includes an projecting lens system 1411 and a light source 1412, the receiving apparatus 1420 includes an imaging lens system 1421 and an image sensor 1422, wherein the connecting relationship and functions of the image capturing apparatus 21, the projection apparatus 1410, the receiving apparatus 1420 and the processor 1430 can be the same with the image capturing apparatus 11, the projection apparatus 1310, the receiving apparatus 1320 and the processor 1330 stated in the 12th embodiment, and will not describe again herein.

The sensing module 1400 can be applied to face recognition function, in FIG. 25B, the light source 1412 can be composed by a laser array 1412a, which can form structured light with the projecting lens system 1411 of the projection apparatus 1410, and project on an sensed object 14a, wherein the sensed object 14a is shown without an array image of projection, and the sensed object 14b is shown with an array image of projection. The imaging lens system 1421 of the receiving apparatus 1420 receives the reflective light from the sensed object 14b, images on the image sensor 1422, and the received image 1422a can be calculated by the processor 1430 so as to obtain the relative distance of each portion of the sensed object 14b, further obtain the 3D-shaped variation on the surface of the sensed object 14b. Therefore, the security of the electronic device 20 in usage can be enhanced, but is not limited thereto. The image capturing apparatus 21 can be utilized to photographing, and can be matched to the sensing module 1400, wherein the obtained information of the receiving apparatus 1420 and the image capturing apparatus 21 can be shown on the display apparatus 22 after processing.

14th Embodiment

FIG. 26 is a schematic view of an electronic device 30 according to the 14th embodiment of the present disclosure. In the 14th embodiment, the electronic device 30 includes a sensing module (its reference numeral is omitted), an image capturing apparatus 31 and a display apparatus 32.

The sensing module includes a projection apparatus 1510, a receiving apparatus 1520 and a processor 1530, wherein the projection apparatus 1510 and the receiving apparatus 1520 are connected to the processor 1530. According to the 14th embodiment, the connecting relationship and functions of image capturing apparatus 31, the projection apparatus 1510, the receiving apparatus 1520 and the processor 1530 can be the same with the image capturing apparatus 11, the projection apparatus 1310, the receiving apparatus 1320 and the processor 1330 stated in the 12th embodiment, and will not describe again herein.

According to the 14th embodiment, the sensing module can be utilized to capture the dynamic variation of the sensed object 33 so as to implement human-computer interaction, but is not limited thereto. The image capturing apparatus 31 can be utilized to photographing, and can be matched to the sensing module, wherein the obtained information of the receiving apparatus 1520 and the image capturing apparatus 31 can be shown on the display apparatus 32 after processing.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An electronic device, comprising at least one optical lens assembly, which comprises four lens elements, the four lens elements being in order from an outside to an inside:
   a first lens element having an outside surface being concave in a paraxial region thereof and an inside surface being convex in a paraxial region thereof;
   a second lens element;

a third lens element; and a fourth lens element having an inside surface being convex in a paraxial region thereof;

wherein a central thickness of the first lens element is CT1, a central thickness of the fourth lens element is CT4, a focal length of the first lens element is f1, a focal length of the second lens element is f2, a focal length of the third lens element is f3, a focal length of the fourth lens element is f4, and the following conditions are satisfied:

0<CT1/CT4<2.7; and

|f3/f1|+|f3/f2|+|f3/f4|<0.85.

2. The electronic device of claim 1, wherein the central thickness of the first lens element is CT1, the central thickness of the fourth lens element is CT4, and the following condition is satisfied:

0<CT1/CT4<1.0.

3. The electronic device of claim 1, wherein when a measurement is made in accordance with a reference wavelength as a d-line, an Abbe number of the second lens element is Vd2, an Abbe number of the third lens element is Vd3, an Abbe number of the fourth lens element is Vd4, and the following condition is satisfied:

3.0<(Vd2+Vd3)/Vd4<10.

4. The electronic device of claim 1, wherein when a measurement is made in accordance with a reference wavelength as a d-line, an Abbe number of the fourth lens element is Vd4, an axial distance between the outside surface of the first lens element and an inside surface of the second lens element is Dr1r4, an axial distance between an outside surface of the third lens element and the inside surface of the fourth lens element is Dr5r8, and the following conditions are satisfied:

10.0<Vd4<23.0; and 1.35<Dr5r8/Dr1r4<10.0.

5. The electronic device of claim 1, wherein an axial distance between the second lens element and the third lens element is T23, an axial distance between the third lens element and the fourth lens element is T34, the central thickness of the fourth lens element is CT4, an axial distance between the outside surface of the first lens element and the inside surface of the fourth lens element is TD, and the following conditions are satisfied:

0.35<T34/CT4<1.1; and 1.75<TD/(T23+T34)<15.0.

6. The electronic device of claim 1, wherein an axial distance between the outside surface of the first lens element and the inside surface of the fourth lens element is TD, an axial distance between the inside surface of the fourth lens element and an inside conjugation surface of the optical lens assembly is BL, and the following condition is satisfied:

2.5<TD/BL<9.0.

7. The electronic device of claim 1, wherein a curvature radius of the inside surface of the fourth lens element is R8, a focal length of the optical lens assembly is f, and the following condition is satisfied:

−0.74<R8/f<0.

8. The electronic device of claim 1, wherein the focal length of the first lens element is f1, a curvature radius of the outside surface of the first lens element is R1, and the following condition is satisfied:

5.7<|f1/R1|.

9. The electronic device of claim 1, wherein a focal length of the optical lens assembly is f, the focal length of the first lens element is f1, the focal length of the second lens element is f2, the focal length of the third lens element is f3, the focal length of the fourth lens element is f4, a focal length of i-th lens element is fi, and at least one of the lens elements satisfies the following condition:

|f/fi|<0.15, wherein i=1,2,3 or 4; and wherein an axial distance between the outside surface of the first lens element and an inside conjugation surface of the optical lens assembly is TL, a maximum radius of an optical effective region of the inside conjugation surface of the optical lens assembly is YI, an f-number of the optical lens assembly is Fno, a maximum radius of an optical effective region of the outside surface of the first lens element is Y11, a maximum radius of an optical effective region of the inside surface of the fourth lens element is Y42, and the following conditions are satisfied:

1.0<TL/YI<4.0;

1.0<Fno<3.0; and 2.0<Y42/Y11<5.0.

10. The electronic device of claim 1, wherein the optical lens assembly is applied to an infrared band within a wavelength ranged from 750 nm to 1500 nm.

11. The electronic device of claim 1, wherein the third lens element with positive refractive power has an inside surface being convex in a paraxial region thereof, and the fourth lens element has an outside surface being concave in a paraxial region thereof;

wherein a curvature radius of the inside surface of the fourth lens element is R8, a maximum radius of an optical effective region of the inside surface of the fourth lens element is Y42, and the following condition is satisfied:

−1.0<R8/Y42<0.

12. The electronic device of claim 1, wherein an outside surface of the third lens element comprises at least one concave shape from a paraxial region thereof to an off-axis region thereof.

13. The electronic device of claim 1, wherein at least one of the lens elements is made of a plastic material and has at least one surface comprising at least one inflection point;

wherein a maximum radius of an optical effective region of an inside conjugation surface of the optical lens assembly is YI, a maximum radius of an optical effective region of the inside surface of the fourth lens element is Y42, and the following condition is satisfied:

0.50<YI/Y42<1.1.

14. The electronic device of claim 1, further comprising:

a projection apparatus comprising the optical lens assembly and at least one light source, wherein the light source is disposed on an inside conjugation surface of the optical lens assembly.

15. The electronic device of claim 1, further comprising:

a sensing module comprising:

a projection apparatus comprising the optical lens assembly and at least one light source, wherein the light source is disposed on an inside conjugation surface of the optical lens assembly; and a receiving apparatus comprising an imaging lens system and an image sensor, wherein the image sensor is disposed on an inside conjugation surface of the imaging lens system;

wherein the light source of the projection apparatus is projected on a sensed object and is received by the receiving apparatus after a reflection, and is imaged on the image sensor.

16. An electronic device, comprising at least one optical lens assembly, which comprises four lens elements, the four lens elements being in order from an outside to an inside:
a first lens element having an outside surface being concave in a paraxial region thereof and an inside surface being convex in a paraxial region thereof;
a second lens element;
a third lens element; and
a fourth lens element having an outside surface being concave in a paraxial region thereof;
wherein a central thickness of the first lens element is CT1, a central thickness of the fourth lens element is CT4, a focal length of the optical lens assembly is f, a focal length of the first lens element is f1, a focal length of the second lens element is f2, and the following conditions are satisfied:

0<CT1/CT4<0.62; and

|f/f1|+|f/f2|<1.25.

17. The electronic device of claim 16, wherein there is an air gap between optical effective regions of every adjacent lens elements of the four lens elements;
wherein the focal length of the optical lens assembly is f, the focal length of the first lens element is f1, the focal length of the second lens element is f2, and the following condition is satisfied:

|f/f1|+|f/f2|<1.00.

18. The electronic device of claim 16, wherein when a measurement is made in accordance with a reference wavelength as a d-line, an Abbe number of the second lens element is Vd2, an Abbe number of the third lens element is Vd3, an Abbe number of the fourth lens element is Vd4, and the following condition is satisfied:

3.0<(Vd2+Vd3)/Vd4<10.

19. The electronic device of claim 16, wherein an axial distance between the third lens element and the fourth lens element is T34, the central thickness of the fourth lens element is CT4, and the following condition is satisfied:

0.10<T34/CT4<4.0.

20. The electronic device of claim 16, wherein an axial distance between the outside surface of the first lens element and an inside surface of the fourth lens element is TD, an axial distance between the inside surface of the fourth lens element and an inside conjugation surface of the optical lens assembly is BL, and the following condition is satisfied:

2.5<TD/BL<9.0.

21. The electronic device of claim 16, wherein an axial distance between the second lens element and the third lens element is T23, an axial distance between the third lens element and the fourth lens element is T34, an axial distance between the outside surface of the first lens element and an inside surface of the fourth lens element is TD, and the following condition is satisfied:

1.75<TD/(T23+T34)<15.0.

22. The electronic device of claim 16, wherein a half of a maximum field of view of the optical lens assembly is HFOV, an axial distance between the outside surface of the first lens element and an inside surface of the fourth lens element is TD, a maximum radius of an optical effective region of an inside conjugation surface of the optical lens assembly is YI, a maximum radius of an optical effective region of the inside surface of the fourth lens element is Y42, and the following conditions are satisfied:

15.0 degrees<HFOV<60.0 degrees;

1.0 mm<TD<5.0 mm; and 0.50<YI/Y42<1.1.

23. The electronic device of claim 16, wherein the optical lens assembly further comprises an aperture stop disposed at an outside of the second lens element;
wherein an axial distance between the aperture stop and an inside conjugation surface of the optical lens assembly is SL, an axial distance between the outside surface of the first lens element and the inside conjugation surface of the optical lens assembly is TL, a curvature radius of the outside surface of the fourth lens element is R7, a maximum radius of an optical effective region of the outside surface of the fourth lens element is Y41, and the following conditions are satisfied:

0.70<SL/TL<1.1; and

−1.0<R7/Y41<0.

24. The electronic device of claim 16, wherein an outside surface of the third lens element comprises at least one concave shape from a paraxial region thereof to an off-axis region thereof;
wherein the central thickness of the first lens element is CT1, a curvature radius of the outside surface of the first lens element is R1, a curvature radius of the inside surface of the first lens element is R2, and the following conditions are satisfied:

−1.0<CT1/R1≤0; and

−1.0<CT1/R2≤0.

25. An electronic device, comprising at least one optical lens assembly, which comprises four lens elements, the four lens elements being in order from an outside to an inside:
a first lens element having an outside surface being concave in a paraxial region thereof and an inside surface being convex in a paraxial region thereof;
a second lens element;
a third lens element having positive refractive power; and
a fourth lens element;
wherein a focal length of the first lens element is f1, a focal length of the second lens element is f2, a focal length of the third lens element is f3, a focal length of the fourth lens element is f4, an f-number of the optical lens assembly is Fno, and the following conditions are satisfied:

|f3/f1|+|f3/f2|~|f3/f4|≤0.69; and 1.0<Fno<3.0.

26. The electronic device of claim 25, wherein an axial distance between the outside surface of the first lens element and an inside surface of the second lens element is Dr1r4, an axial distance between an outside surface of the third lens element and an inside surface of the fourth lens element is Dr5r8, and the following condition is satisfied:

$$1.35 < Dr5r8/Dr1r4 < 10.0.$$

27. The electronic device of claim 25, wherein at least one of the lens elements is made of a plastic material and has at least one surface comprising at least one inflection point;
    wherein an axial distance between the second lens element and the third lens element is T23, an axial distance between the third lens element and the fourth lens element is T34, an axial distance between the outside surface of the first lens element and an inside surface of the fourth lens element is TD, and the following condition is satisfied:

$$1.75 < TD/(T23+T34) < 15.0.$$

28. The electronic device of claim 25, wherein an outside surface of the third lens element comprises at least one concave shape from a paraxial region thereof to an off-axis region thereof.

* * * * *